United States Patent
Haga et al.

(10) Patent No.: US 10,088,905 B2
(45) Date of Patent: Oct. 2, 2018

(54) TACTILE SENSE PRESENTATION DEVICE, MOBILE UNIT INCLUDING SAME, AND TACTILE SENSE PRESENTATION METHOD

(71) Applicant: NLT Technologies, Ltd., Kanagawa (JP)

(72) Inventors: Hiroshi Haga, Kanagawa (JP); Jiro Yanase, Kanagawa (JP); Daisuke Sugimoto, Kanagawa (JP)

(73) Assignee: TIANMA JAPAN, LTD., Kanagawa (JP)

( * ) Notice: Subject to any disclaimer, the term of this patent is extended or adjusted under 35 U.S.C. 154(b) by 0 days.

(21) Appl. No.: 15/160,370

(22) Filed: May 20, 2016

(65) Prior Publication Data
US 2016/0266685 A1 Sep. 15, 2016

Related U.S. Application Data

(62) Division of application No. 14/511,194, filed on Oct. 10, 2014, now Pat. No. 9,513,708.

(30) Foreign Application Priority Data

Oct. 10, 2013 (JP) ................. 2013-213009
Jul. 29, 2014 (JP) ................. 2014-153540

(51) Int. Cl.
*G06F 3/01* (2006.01)
*G09G 5/18* (2006.01)
*G06F 3/044* (2006.01)

(52) U.S. Cl.
CPC .............. *G06F 3/016* (2013.01); *G06F 3/044* (2013.01); *G09G 5/18* (2013.01); *G06F 2203/04101* (2013.01); *G06F 2203/04112* (2013.01)

(58) Field of Classification Search
None
See application file for complete search history.

(56) References Cited

U.S. PATENT DOCUMENTS 5,709,219 A * 1/1998 Chen ................. A63F 13/06
345/156
8,330,590 B2 12/2012 Poupyrev et al.
(Continued)

FOREIGN PATENT DOCUMENTS

CN 102099769 6/2011
CN 102271755 12/2011
(Continued)

OTHER PUBLICATIONS

Sato Hitoshi, "The Dangers of Texting while Walking", Jun. 25, 2013, InfoCom, Inc., [searched on Sep. 5, 2013], Internet <URL:http://www.icr.co.jp/newsletter/global_perspective/2013/Gpre201365.html>.

(Continued)

*Primary Examiner* — David Donald Davis
(74) *Attorney, Agent, or Firm* — Young & Thompson

(57) ABSTRACT

The tactile sense presentation device, capable of effectively presenting a tactile sense (a sense of texture) on a touch panel, includes: a supporting substrate; a plurality of X-electrodes and Y-electrodes extended in parallel to each other on the supporting substrate; and driving circuits (X-electrode driving circuit, Y-electrode driving circuit) which apply a first-frequency voltage signal to the X-electrode corresponding to information regarding a target region inputted from outside among the plurality of X-electrodes, and applies a second-frequency voltage signal to the Y-electrode corresponding to information regarding the target region inputted from outside among the plurality of Y-electrodes to generate electric beat oscillation in the target region by an absolute value of a difference between the first and second frequencies.

10 Claims, 31 Drawing Sheets

(56) References Cited

U.S. PATENT DOCUMENTS

| | | |
|---|---|---|
| 8,805,517 B2 | 8/2014 | Radivojevic et al. |
| 9,123,258 B2 | 9/2015 | Makinen et al. |
| 2002/0030663 A1 | 3/2002 | Tierling et al. |
| 2005/0024342 A1* | 2/2005 | Young ................ B60K 35/00 345/173 |
| 2007/0236450 A1* | 10/2007 | Colgate ............... G06F 3/016 345/156 |
| 2009/0079550 A1* | 3/2009 | Makinen .............. G06F 3/016 340/407.2 |
| 2010/0152794 A1* | 6/2010 | Radivojevic ........ A61N 1/0452 607/2 |
| 2010/0207895 A1* | 8/2010 | Joung ................. G06F 3/016 345/173 |
| 2010/0309141 A1* | 12/2010 | Cruz-Hernandez ..... G06F 3/016 345/173 |
| 2010/0321315 A1* | 12/2010 | Oda .................. G06F 3/044 345/173 |
| 2011/0109584 A1* | 5/2011 | Linjama .............. G06F 3/016 345/174 |
| 2011/0248962 A1* | 10/2011 | Poupyrev ............. G06F 3/016 345/175 |
| 2011/0279250 A1* | 11/2011 | Ryhanen ............ G06F 3/03547 340/407.2 |
| 2011/0285667 A1* | 11/2011 | Poupyrev ............. G06F 3/045 345/174 |
| 2012/0075243 A1* | 3/2012 | Doi .................. G06F 3/044 345/174 |
| 2012/0327006 A1* | 12/2012 | Israr ................. G06F 3/044 345/173 |
| 2013/0285910 A1* | 10/2013 | Adachi ............. G06F 3/03547 345/159 |
| 2013/0307789 A1* | 11/2013 | Karamath ............ G06F 3/016 345/173 |
| 2014/0071088 A1* | 3/2014 | Hong ................ G06F 3/0416 345/174 |
| 2014/0192005 A1* | 7/2014 | Wakuda .............. G06F 3/041 345/173 |
| 2014/0225844 A1* | 8/2014 | Tada ................. G06F 3/044 345/173 |
| 2014/0375580 A1* | 12/2014 | Peshkin ............. G06F 3/016 345/173 |

FOREIGN PATENT DOCUMENTS

| | | |
|---|---|---|
| CN | 101714026 | 3/2013 |
| JP | 2011-248884 | 12/2011 |
| JP | 20130307789 | 11/2013 |

OTHER PUBLICATIONS

Yuko Matono, Jan. 10, 2011, [searched on Sep. 5, 2013, NPO greenz, Internet<URL:http://greenz.ip/2011/01/10/braille_smartphone_voim/>.

Chinese Official Action—201410532558.4—dated Jan. 4, 2018.

* cited by examiner

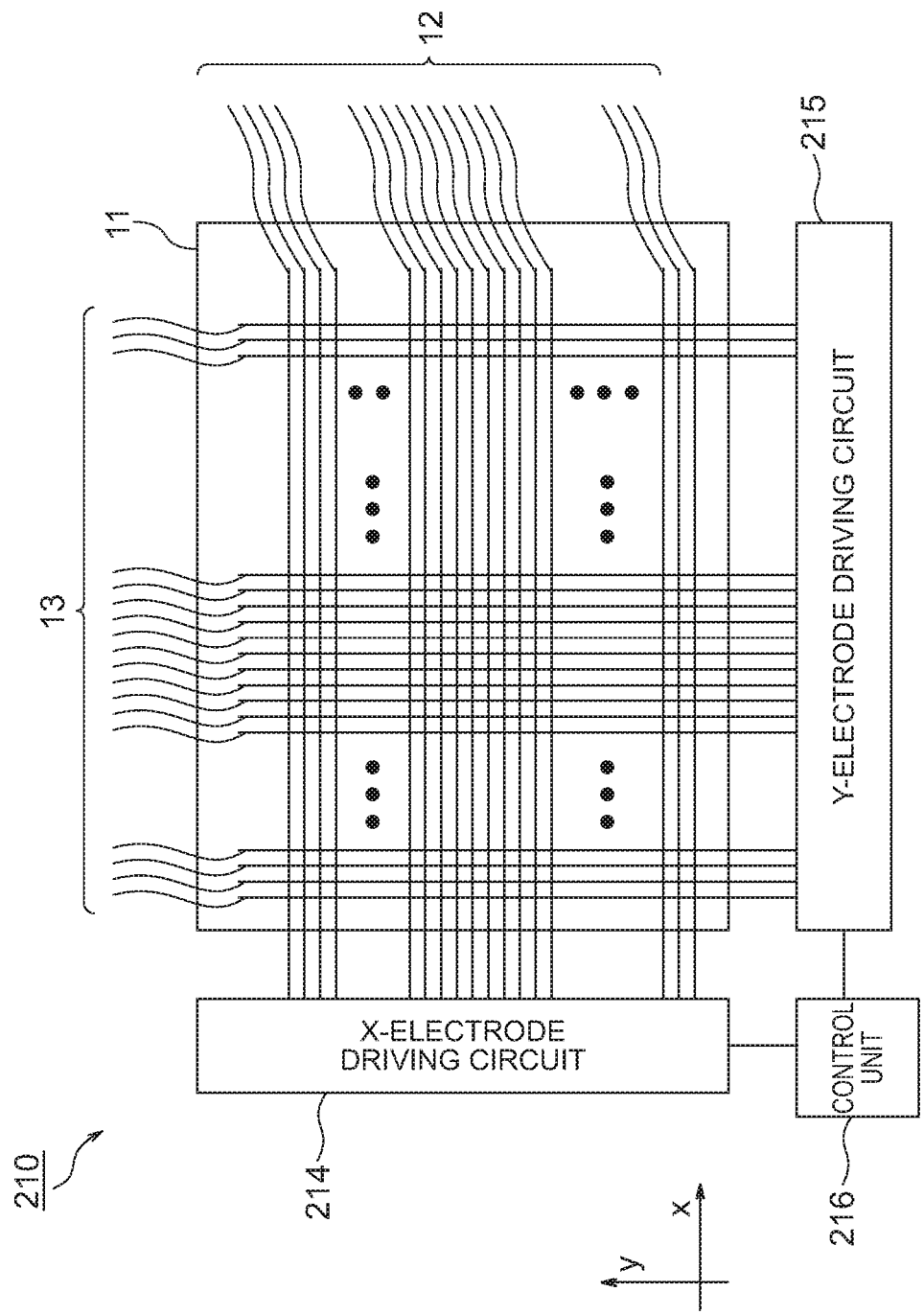

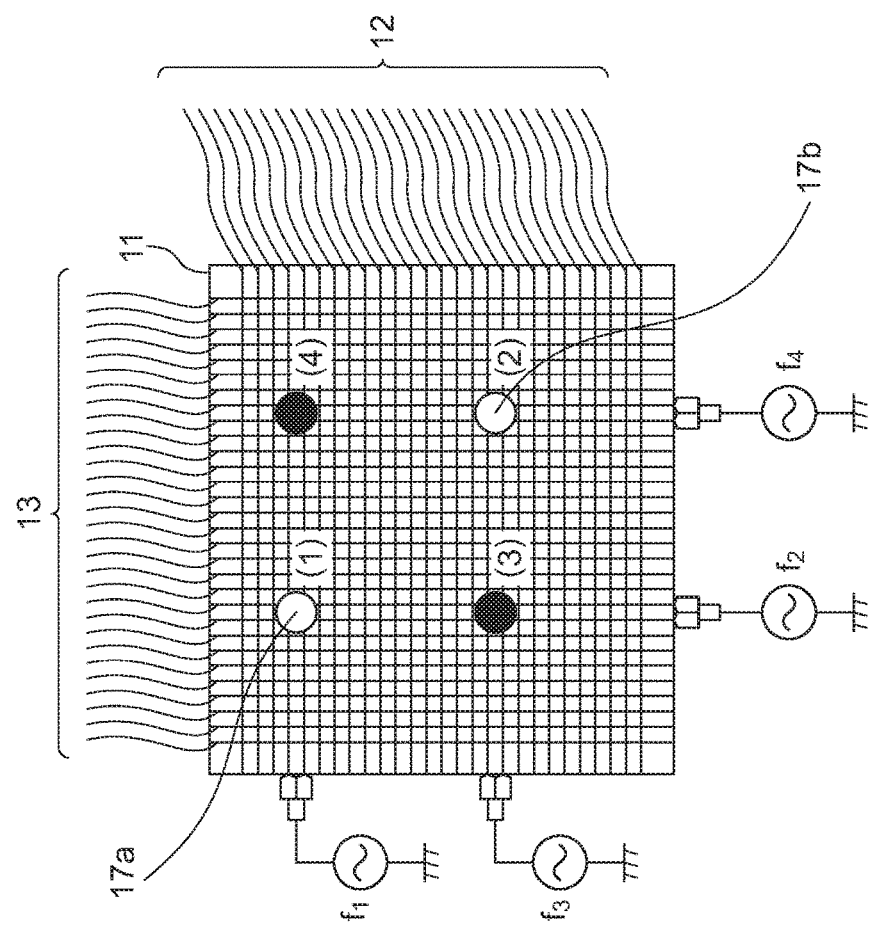

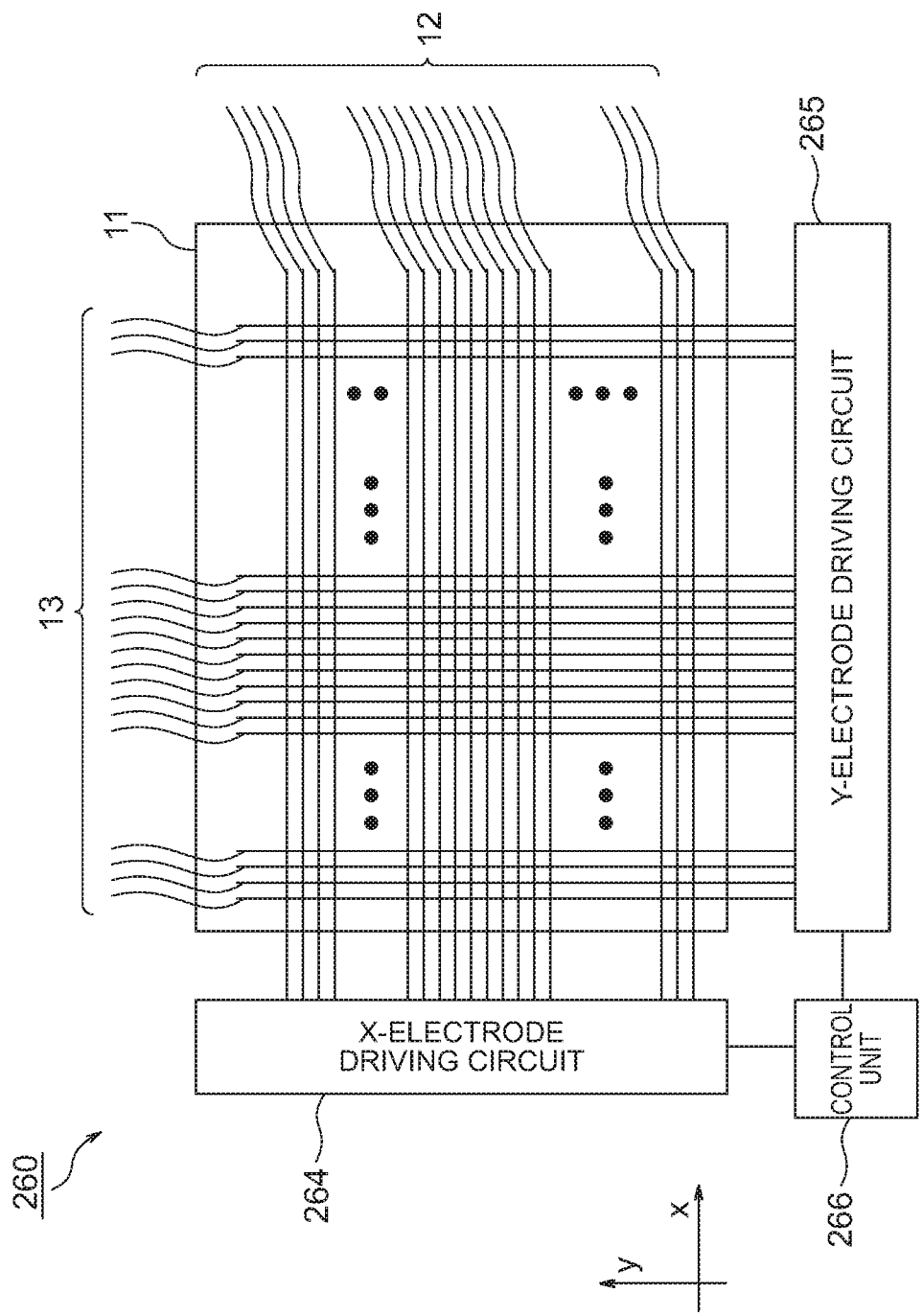

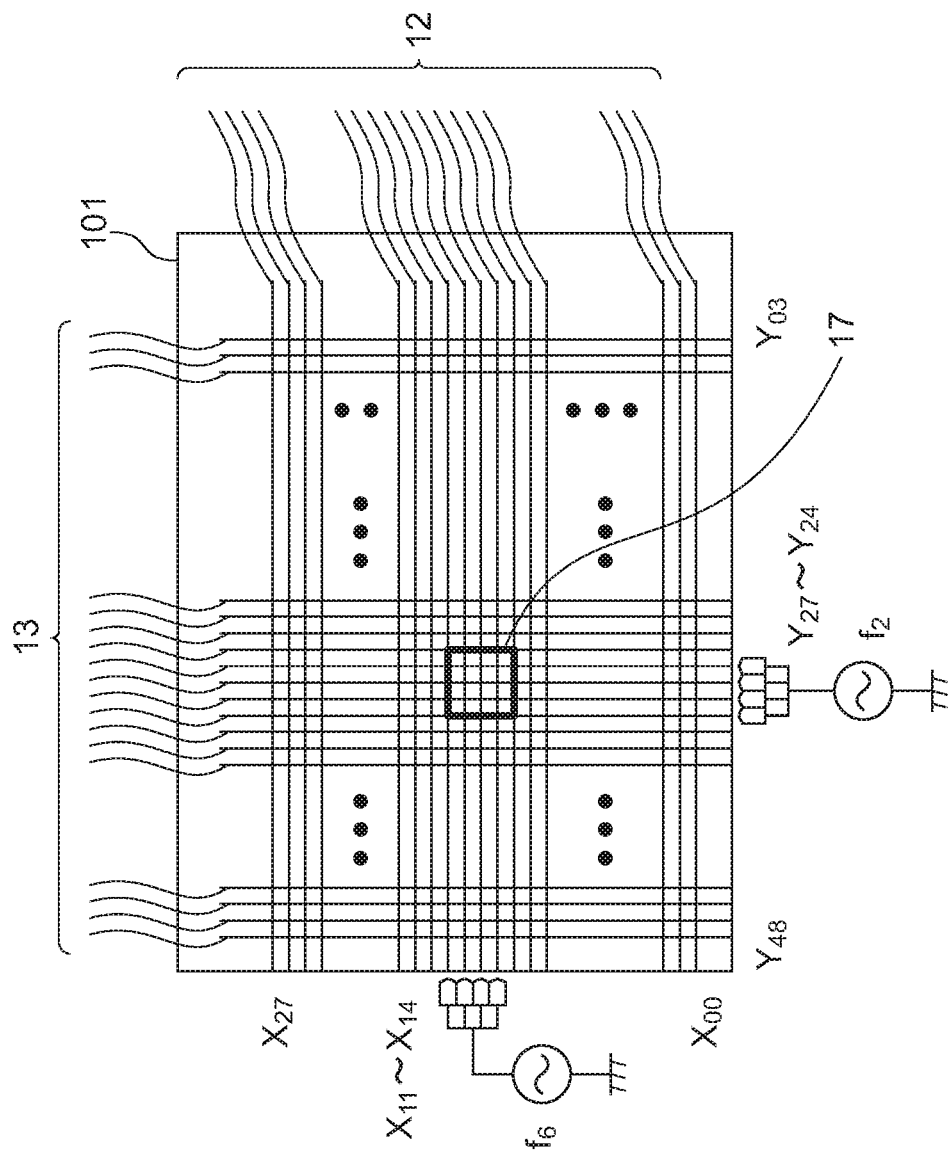

FREQUENCY OF VOLTAGE SIGNAL APPLIED TO X-ELECTRODE

VOLTAGE OF VOLTAGE SIGNAL APPLIED TO X-ELECTRODE

VOLTAGE OF VOLTAGE SIGNAL APPLIED TO Y-ELECTRODE

ATTRACTION F GENERATED IN TARGET REGION
AND ENVELOPE CURVES THEREOF

ATTRACTION F GENERATED IN TARGET REGION
AND ENVELOPE CURVES THEREOF

RELATION BETWEEN VALUE OF D[1:0] AND
OUTPUT 00→$f_1$,01→$f_2$,10→$f_5$,11→NOT USED

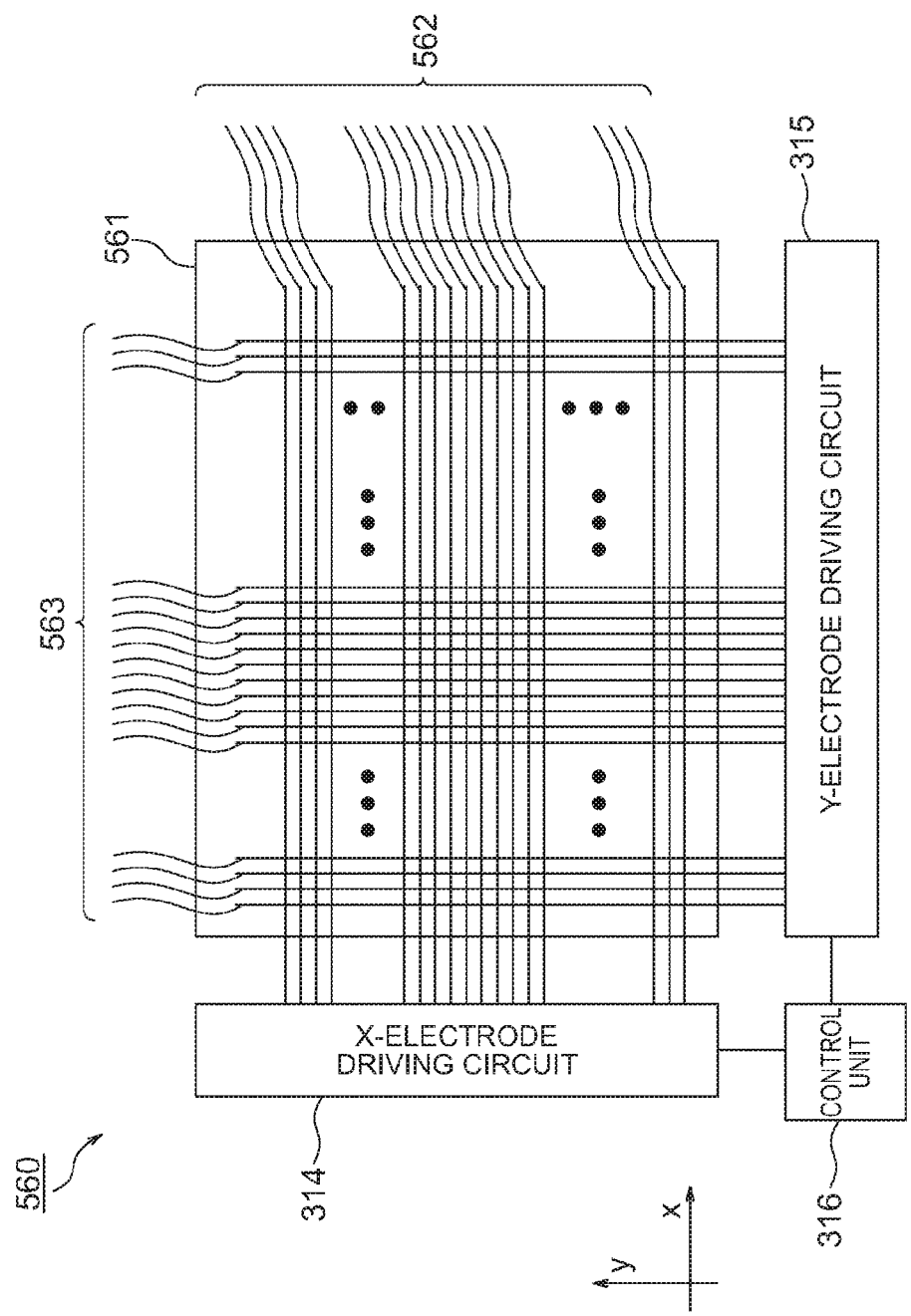

563 Y-ELECTRODE

TACTILE SENSE PRESENTATION DEVICE, MOBILE UNIT INCLUDING SAME, AND TACTILE SENSE PRESENTATION METHOD

BACKGROUND OF THE INVENTION

1. Field of the Invention

The present invention relates to a tactile sense presentation device, an electronic apparatus, and a tactile sense presentation method. More specifically, the present invention relates to a tactile sense presentation device and the like which make it possible to execute operations only with a tactile sense without looking at the hands.

2. Description of the Related Art

A display device with a touch panel to which an input can be done with a finger contributes to achieving a user-friendly interactive operability by being mounted to a system which controls display content and operations of an apparatus according to the input. Therefore, information apparatuses to which a touch panels is mounted are rapidly spread. More specifically, such apparatuses are smartphones, tablet terminals, notebook-type personal computers, and the like.

In the meantime, the surface of the display device on which the touch panel is loaded is uniformly hard, and a same tactile sense is felt when touching at any parts displayed on the screen. Thus, it is practically impossible to know which of the parts of the touch panel to touch for making an effective input or to know whether or not an effective input is made without looking at the panel. Therefore, it is difficult to operate those devices only with a tactile sense without looking at the screen of the display device.

Meanwhile, remote controllers of television set receivers, conventional-type mobile phones, keyboards of personal computers, and the like include operation keys that are independent from each other. Thus, places of the operation keys can be sensed only with a tactile sense, and it is possible to know that when pressing those operation keys through the tactile sense. Therefore, it is not so difficult to perform operations only with the tactile sense without looking at the hands by simply remembering the positions and the layout of the operations keys.

Recently, smartphones have become rapidly spread in the mobile phone terminal field, and about a half of the currently used mobile phone terminals have already been replaced with the smartphones. Accordingly, as depicted in "The Dangers of Texting while Walking", Jun. 25, 2013, Sato Hitoshi, InfoCom, Inc., [searched on Sep. 5, 2013], Internet <URL: http://www.icr.co.jp/newsletter/global_perspective/2013/Gpre201365.html> (Non-Patent Document 1), an action executed while using smartphones, the so-called "smartphoning while walking", has become a social problem.

It is practically impossible to operate the display device on which the touch panel is loaded only by a tactile sense without looking at the hands, so that it is necessary to operate the device while carefully looking at the screen. Therefore, to operate an electronic apparatus having such display device while walking (or while riding a bicycle, while driving/operating an automobile or the like, for example) has a high risk of causing serious injuries and accidents. Actually, there are many injuries and accidents occurred due to such actions.

Therefore, railway companies, mobile communication companies, electronic apparatus manufactures, and the like are announcing warnings for the action called "smartphoning while walking". However, it is only a warning for bringing the attention of the users to such actions in terms of morals. A physical countermeasure for preventing such action which can be taken is only to "provide a home door on the platform of trains for preventing fall of passengers", for example. It is currently a fact that there is no definite countermeasure taken for the smartphone itself in terms of the technical aspect for preventing "smartphoning while walking".

Smartphones can provide comfort in the operation itself by using a touch screen when browsing Websites and video contents or when using the so-called SNS (Social Network Services). Thereby, the smartphones exhibit convenience with which a vast amount of information can be handled easily. However, there is no effective technique for making it possible to operate the smartphones only by a tactile sense without looking at the hands while maintaining the convenience. Those points described above are not only for the case of the smartphones but also for the case of tablet terminals and the like.

That is, for the information apparatuses such as smartphones, socially desired is a technique which makes it possible to present a tactile sense for the user in association with display of a touch screen for making it possible to operate only with the tactile sense without looking at the hands. Such techniques do not simply make it possible to lighten danger caused due to the action of "smartphoning while walking" but also are effective for those who are suffering from impaired vision to use such devices, for example.

As the tactile sense presenting technique for giving a tactile sense to the display device, there are following three types: a type which mechanically oscillates the display device by using a piezoelectric element, an eccentric motor, or the like; a type that uses the so-called electric oscillation phenomenon, which changes friction between a finger of the user and a tactile sense presentation device by static electricity to present a tactile sense (a sense of texture) when tracing the tactile sense presentation device with a finger; and a type which drives an axon of a skin mechanoreceptor of a finger of the user by flowing an electric current to the finger.

"Smartphones for those who are visually impaired are fantastic in the designs and functions", Yuko Matono, Jan. 10, 2011, [searched on Sep. 5, 2013, NPO greenz, Internet <URL: http://greenz.jp/2011/01/10/braille_smartphone_voim/> (Non-Patent Document 2) describes "a smartphone for those who are visually impaired". This smartphone does not have a normal liquid crystal display device. Instead, this smartphone has a silicone panel which presents information to the user by having protrusions appeared on the surface of the device (also has a sound information input/output module and the like). The silicone panel can present only information of low spatial resolution such as braille. Further, this technique is not for presenting information that is "associated with display on the touch screen".

Japanese Unexamined Patent Publication 2011-248884 (Patent Document 1) describes "electric oscillation for a touch-surface" which uses the electric oscillation phenomenon. As the feature thereof, it is described as "a device which includes: a conductive surface; an insulating surface disposed on the conductive surface; and a controller which is constituted in such a manner that a signal is coupled to a user who touches the device and a tactile sense is felt thereby at least by one finger of the user sliding on the insulating surface (claims 1 of Patent Document 1), wherein "each of a plurality of electrodes is controlled by independent wirings" (paragraph 0074 in Description of Patent Document 1 and FIG. 10A).

That is, the technique depicted in Patent Document 1 intends to make it possible to present a sense of texture on the touch screen with the above-described structure.

BRIEF DESCRIPTION

Patent Document 1 discloses a tactile sense presentation device using electric oscillation, in which segmented electrodes and independent wirings are provided for each of the electrodes as depicted as "each of a plurality of electrodes is controlled by independent wirings" (paragraph 0074 in Description of Patent Document 1). However, there are following issues with the tactile sense presentation device depicted in Patent Document 1.

With the technique depicted in Patent Document 1, a space for drawing around the wirings provided independently for each of the plurality of electrodes is required. As a result, the gap between the electrodes for presenting a sense of texture becomes widened, so that the spatial resolution of the tactile sense presentation device becomes low. In Patent Document 1, it is mentioned as a shortcoming of the technique itself that "there is a possibility that the use of a great number of wirings makes it unscalable as the number of electrodes is increased" (paragraph 0074 in Description of Patent Document 1). That is, the applicants of that patent acknowledge the issue of the own technique.

Further, since a plurality of wirings are drawn around between the electrodes for presenting a sense of texture, the shapes of the drawn wirings or the shapes of the electrodes used for presenting a sense of texture are visually felt by the user when the tactile sense presentation device of such structure and the display device are used in a superimposed manner. This deteriorates the original display quality of the display device.

Further, signals for presenting a sense of texture to each electrode are also applied to the drawn wirings naturally. Thus, a sense of texture that is not required originally is presented also in the region where the wirings are drawn around.

Further, this technique can only present a sense of texture to the areas where the electrodes are embedded in advance. It is necessary to rearrange the electrodes for changing the positions and the number of the areas for presenting a sense of texture. That is, it is practically impossible to change the positions and the number of the areas for presenting a sense of texture by corresponding to the displayed objects on the touch screen.

A technique that can overcome each of the above-described points is not depicted in Non-Patent Documents 1 and 2. That is, there is no technique which makes it possible to perform operations only by a tactile sense by effectively presenting a sense of texture on the touch screen.

It is an exemplary object of the present invention to provide a tactile sense presentation device, an electronic apparatus, and a tactile sense presentation method, which make it possible to present a tactile sense (a sense of texture) at a position corresponding to a displayed object, to suppress deterioration of the display quality when the tactile sense presentation device is superimposed on a display device, and not to present a sense of texture to an originally unrequired position.

In order to achieve the foregoing object, the tactile sense presentation device according to the present invention is characterized to include: a supporting substrate; a plurality of X-electrodes extended in parallel to each other along a first direction on the supporting substrate; a plurality of Y-electrodes extended in parallel to each other along a second direction on the supporting substrate by being insulated from the X-electrodes; and a driving circuit which applies a first-frequency voltage signal to the X-electrode corresponding to information regarding a target region inputted from outside among the plurality of X-electrodes, and applies a second-frequency voltage signal to the Y-electrode corresponding to information regarding the target region inputted from outside among the plurality of Y-electrodes to generate electric beat oscillation in the target region by an absolute value of a difference between the first and second frequencies.

In order to achieve the foregoing object, the electronic apparatus according to the present invention is characterized to include: a touch-panel type display device which displays a processing result executed by a processor provided therein and accepts an operation input which corresponds to the processing result; and the tactile sense presentation device according to the present invention (having the above-described feature), which presents a sense of texture corresponding to the display of the processing result. Further, a mobile unit which includes the electronic apparatus loaded thereto as an on-vehicle device is also a scope of the present invention.

In order to achieve the foregoing object, the present invention provides the tactile sense presentation method used with the tactile sense presentation device which includes: a supporting substrate; a plurality of X-electrodes extended in parallel to each other along a first direction on the supporting substrate; and a plurality of Y-electrodes extended in parallel to each other along a second direction on the supporting substrate by being insulated from the X-electrodes, wherein: a control unit gives information regarding a target region inputted from outside to a driving circuit; and the driving circuit applies a first-frequency voltage signal to the X-electrodes corresponding to the target region; and applies a second-frequency voltage signal to the Y-electrodes corresponding to the target region to generate electric beat oscillation in the target region by an absolute value of a difference between the first and second frequencies.

BRIEF DESCRIPTION OF THE DRAWINGS

FIG. 9 is an explanatory chart showing the structure of a tactile sense presentation device according to a third basic embodiment of the present invention;

FIG. 10 is an explanatory chart showing a driving method of the tactile sense presentation device shown in FIG. 9;

FIG. 11 is an explanatory chart showing the structure of a tactile sense presentation device according to a fourth basic embodiment of the present invention;

FIG. 12 is an explanatory chart showing a driving method of the tactile sense presentation device shown in FIG. 11;

FIGS. 13A to 13C show explanatory charts showing voltage signals generated by an X-electrode driving circuit and a Y-electrode driving circuit in the tactile sense presentation device shown in FIG. 11 and FIG. 12, in which FIG. 13A shows frequency $f_6$ of the voltage signals generated by the X-electrode driving circuit and applied to the X-electrode, FIG. 13B shows a waveform of the voltage signal generated by the X-electrode driving circuit and applied to the X-electrode, and FIG. 13C shows a waveform of the voltage signal generated by the Y-electrode driving circuit and applied to the Y-electrode, respectively;

FIGS. 16A to 16C show explanatory charts showing voltage signals generated by an X-electrode driving circuit and a Y-electrode driving circuit in the tactile sense presentation device shown in FIG. 15, in which FIG. 16A shows frequency $f_7$ of the voltage signals generated by the X-electrode driving circuit and applied to the X-electrode, FIG. 16B shows a waveform of the voltage signal generated by the X-electrode driving circuit and applied to the X-electrode, and FIG. 16C shows a waveform of the voltage signal generated by the Y-electrode driving circuit and applied to the Y-electrode, respectively;

FIGS. 20A and 20B show explanatory charts showing enlarged views of the structure of a connection part of the X-electrode and a connection part of the Y-electrode shown in FIG. 19, in which FIG. 20A is a plan view showing a connection part of the X-electrode and a connection part of the Y-electrode shown as a block A in FIG. 19, and FIG. 20B is a sectional view taken along a line A-A' of FIG. 20A;

FIGS. 27A and 27B show explanatory charts showing enlarged views of the structure of a connection part of the X-electrode and a connection part of the Y-electrode shown in FIG. 26, in which FIG. 27A is a plan view showing a connection part of the X-electrode and a connection part of the Y-electrode, and FIG. 27B is a sectional view taken along a line B-B' of FIG. 27A;

FIG. 28 is an explanatory chart showing the structure of a tactile sense presentation device according to a fourth exemplary embodiment of the preset invention;

FIGS. 29A and 29B show explanatory charts showing enlarged views of the structure of a connection part of the X-electrode and a connection part of the Y-electrode shown in FIG. 28, in which FIG. 29A is a plan view showing a connection part of the X-electrode and a connection part of the Y-electrode, and FIG. 29B is a sectional view taken along a line C-C' of FIG. 29A;

DETAILED DESCRIPTION OF THE PREFERRED EMBODIMENTS

First Basic Embodiment

Figure 1:
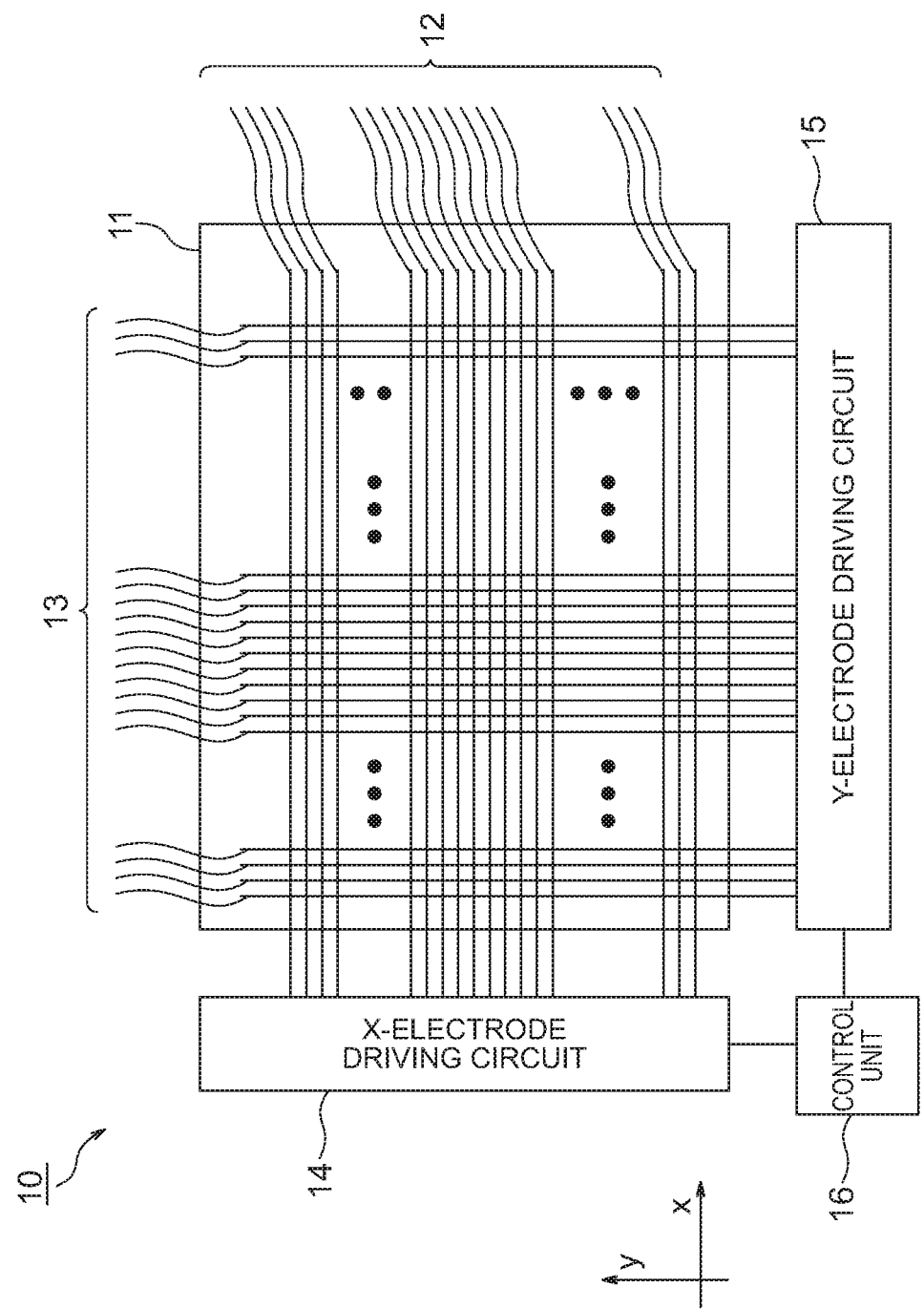
FIG. 1 is an explanatory chart showing the structure of a tactile sense presentation device according to a first basic embodiment of the present invention.

Hereinafter, the structure of a first basic embodiment will be described by referring to accompanying drawing FIG. 1.

A tactile sense presentation device 10 according to the first basic embodiment includes: a supporting substrate 11; a plurality of X-electrodes 12 extended in parallel to each other along a first direction on the supporting substrate; a plurality of Y-electrodes 13 extended in parallel to each other along a second direction on the supporting substrate by being insulated from the X-electrodes; and driving circuits (an X-electrode driving circuit 14, a Y-electrode driving circuit 15) which apply a first-frequency voltage signal to the X-electrode corresponding to information regarding the target region inputted from outside among the plurality of X-electrodes, apply a second-frequency voltage signal to the Y-electrode corresponding to information regarding the target region inputted from outside among the plurality of Y-electrodes, and generate electric beat oscillation in the target region by an absolute value of a difference between the first and second frequencies.

Note here that the first and second frequencies are 500 Hz or more, and the absolute value of the difference between the first and second frequencies is larger than 10 Hz and less than 1000 Hz. Further, the driving circuits have a function which ground the electrodes to which the first-frequency voltage signal is not applied among the plurality of X-electrodes and the electrodes to which the second-frequency voltage signal is not applied among the plurality of Y-electrodes or apply a direct-current voltage to those electrodes.

The above-described structure enables the tactile sense presentation device 10 to effectively present a sense of texture to the target region on the tactile sense presentation device 10 without presenting a tactile sense (a sense of texture) to the irrelevant part.

Hereinafter, this will be described in more details.

FIG. 1 is an explanatory chart showing the structure of the tactile sense presentation device 10 according to the first base embodiment of the present invention. In the tactile sense presentation device 10, formed are a plurality of X-electrodes 12 extended on the planar supporting substrate 11 along the x direction and a plurality of Y-electrodes 13 extended on the supporting substrate 11 along the y direction that is orthogonal to the X-electrodes 12.

The X-electrodes 12 and the Y-electrodes 13 intersect with each other at the intersection parts via an insulating film, and electric insulation between the both is maintained. Further, an insulating film (not shown) is formed on the X-electrodes 12 and the Y-electrodes 13 to electrically insulate between the X-electrodes 12 and the finger and between the Y-electrodes 13 and the finger when the user touches the tactile sense presentation device 10 from the above. The sectional structure of the tactile sense presentation device 10 will be described later.

The X-electrode driving circuit 14 is connected to each of the X-electrodes 12, the Y-electrode driving circuit 15 is connected to each of the Y-electrodes 13, and the X-electrode driving circuit 14 and the Y-electrode driving circuit 15 are connected to a control unit 16. The control unit 16 controls the X-electrode driving circuit 14 and the Y-electrode driving circuit 15 based on the information regarding the target region inputted from outside (e.g., a processor which controls actions of the electronic apparatus), to which a sense of texture is to be presented.

This structure enables the tactile sense presentation device 10 to present a sense of texture in a whole region including all the intersection parts between the X-electrodes 12 and the Y-electrodes 13 and in a prescribed part of region.

Figure 2:
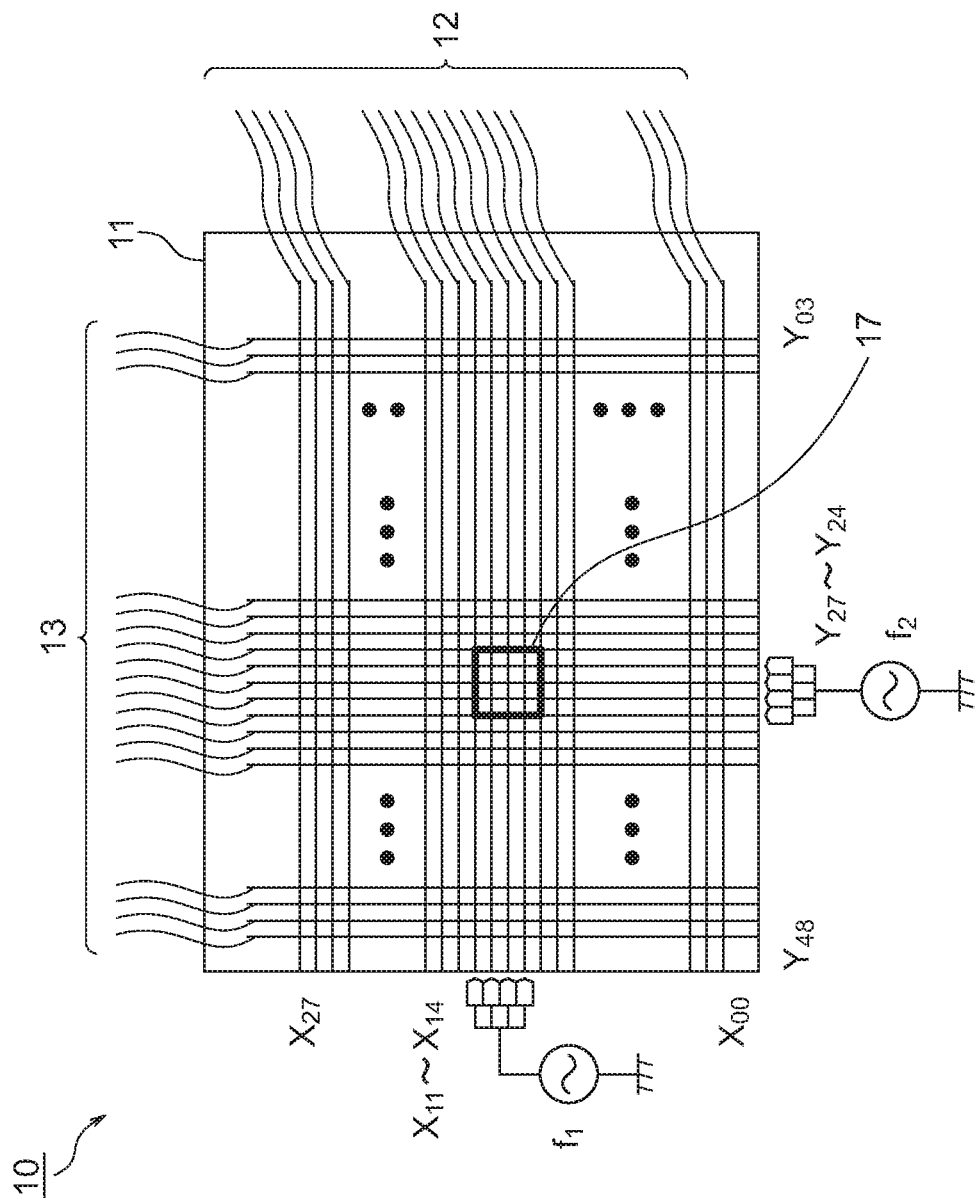
FIG. 2 is an explanatory chart showing a driving method of the tactile sense presentation device shown in FIG. 1.

FIG. 2 is an explanatory chart showing a driving method of the tactile sense presentation device 10 shown in FIG. 1. Note here that each of the X-electrodes 12 and the Y-electrodes 13 is discriminated with different reference codes that are applied to each of the electrodes. That is, in a case shown in FIG. 2, twenty-eight X-electrodes 12 and forty-six Y-electrodes 13 are formed on the supporting substrate 11. Each of those X-electrodes 12 is referred to as $X_{00}$ to $X_{27}$ from the bottom to the top, and each of those Y-electrodes 13 is referred to as $Y_{03}$ to $Y_{48}$ from the right towards the left direction.

Further, the region to which a sense of texture is to be presented is referred to as a target region 17. The target region 17 is a range of $X_{11}$ to $X_{14}$ regarding the X-electrodes 12 and a range of $Y_{24}$ to $Y_{27}$ regarding the Y-electrodes 13. The control unit 16 supplies control signals to the X-electrode driving circuit 14 and the Y-electrode driving circuit 15 based on the information regarding the target region 17 given from outside.

Upon receiving the control signals, the X-electrode driving circuit 14 applies a voltage signal of frequency $f_1=1000$ Hz to $X_{11}$ to $X_{14}$ and the Y-electrode driving circuit 15 applies a voltage signal of frequency $f_2=1240$ Hz to $Y_{24}$ to $Y_{27}$. Regarding the X-electrodes 12 and the Y-electrodes 13 which do not correspond to those ranges, the X-electrode driving circuit 14 and the Y-electrode driving circuit 15 ground those electrodes in the case shown in FIG. 2 in order to prevent the voltages from being induced by capacitance coupling of the electrodes. Alternatively, a direct-current voltage may be applied instead of grounding.

By applying the above-described signals to the X-electrodes 12 and the Y-electrodes 13 and the surface of the tactile sense presentation device 10 is traced by a finger, a sense of texture is felt only in the target region 17 where $X_{11}$ to $X_{14}$ and $Y_{24}$ to $Y_{27}$ intersect with each other.

By arbitrarily selecting the electrodes to apply the voltage signals, a sense of texture can be presented to an arbitrary prescribed region. Further, through selecting all the X-electrodes and all the Y-electrodes, it is also possible to present a sense of texture to the whole region including all the intersection parts between the X-electrodes and the Y-electrodes.

The inventors of the present invention have verified by experiments that a sense of texture is not presented in the region acquired by excluding the target region 17 from the region on the electrodes of $X_{11}$ to $X_{14}$ as well as in the region acquired by excluding the target region 17 from the region on the electrodes of $Y_{24}$ to $Y_{27}$. That is, the inventors of the present invention have verified that fingers of the human beings do not feel a sense of texture in a case where the frequency of the voltage signals applied to the electrodes is 1000 Hz or 1240 Hz.

Meanwhile, in the target region 17, the X-electrode to which the voltage signals of $f_1=1000$ Hz are applied and the Y-electrode to which the voltage signals of $f_2=1240$ Hz are applied are neighboring to each other so that beat known in the field of wave motions is generated. Hereinafter, a mechanism with which a sense of texture is presented by the beat will be described.

Figure 3:
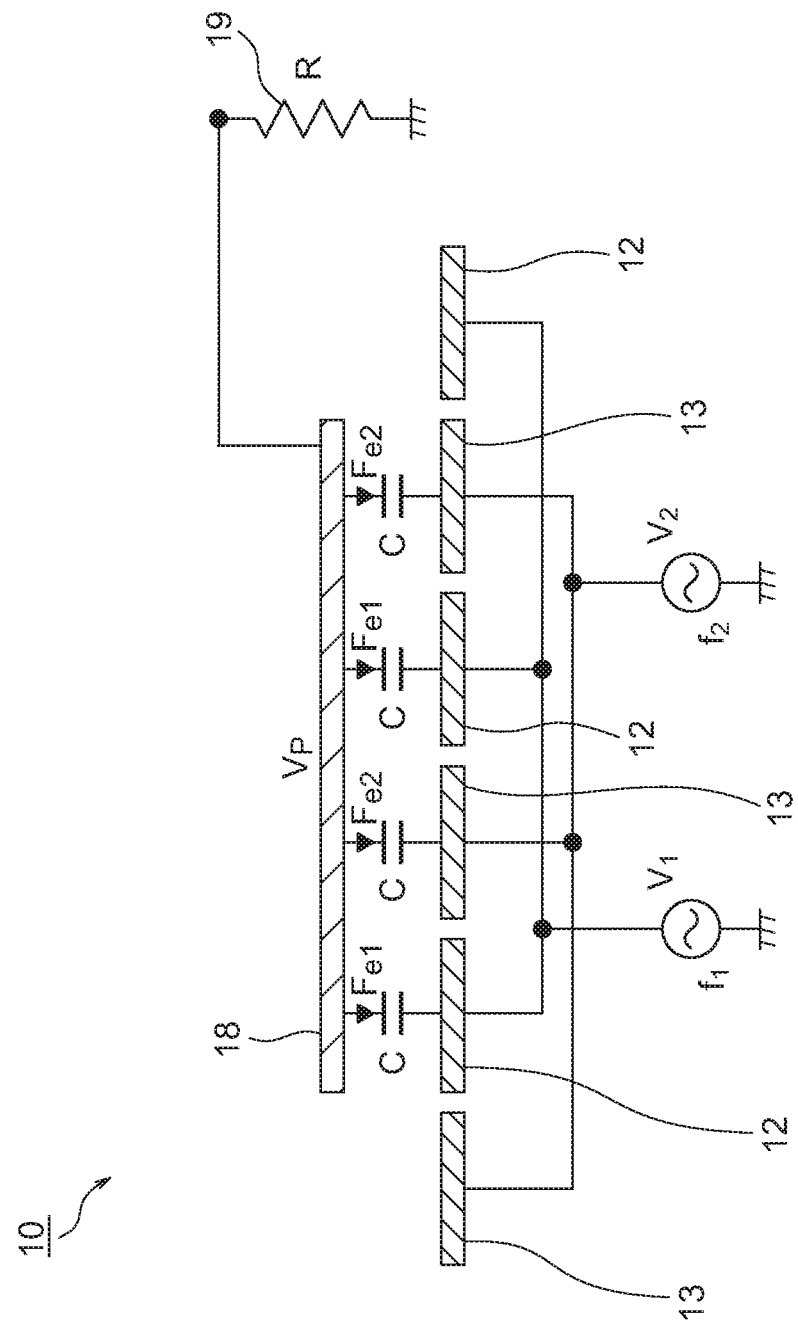
FIG. 3 is an explanatory chart showing a sectional-view model of the tactile sense presentation device shown in FIG. 1 and FIG. 2.

FIG. 3 is an explanatory chart showing a sectional-view model of the tactile sense presentation device 10 shown in FIG. 1 and FIG. 2. As described above, a plurality of X-electrodes 12 and a plurality of X-electrodes 13 are disposed on the flat supporting substrate 11 (not shown in FIG. 3) to be neighboring to each other. A single finger-modeled electrode 18 is disposed at a position opposing to the two X-electrodes 12 and the two Y-electrodes 13 disposed within the target region 17 among the X-electrodes 12 and the Y-electrodes 13. A human body exhibits a grounding effect, so that the electrode 18 can be modeled to be grounded via a resistance 19 having a resistance value R.

Now, a voltage signal $V_1$ expressed as $V_1=A\cos(2\pi_1 t)$ is applied to the X-electrodes 12 within the target region 17. The amplitude of the voltage signal $V_1$ is A, the frequency is $f_1$, and t shows the time. Further, a voltage signal $V_2$ expressed as $V_2=A\cos(2\pi_2 t)$ is applied to the Y-electrodes 13 within the target region 17. The amplitude of the voltage signal $V_2$ is A that is equivalent to the amplitude of the voltage signal $V_1$, and the frequency is $f_2$.

It is possible to have a parallel flat plate capacitor having capacitance C modeled between the electrode 18 and each of the X-electrodes 12 within the target region 17 and to have a parallel flat plate capacitor having capacitance C modeled between the electrode 18 and each of the Y-electrodes 13 within the target region 17.

At this time, a voltage $V_P$ appeared in the electrode 18 becomes $V_P=(V_1+V_2)/2$ when the resistance value R is sufficiently high.

A static electricity force working between a single X-electrode 12 and the finger-modeled electrode 18 is expressed as $F_{e1}$ as shown in FIG. 3. $F_{e1}$ can be acquired as follows when employing a formula known as expressing a force working between the electrodes of the parallel flat plate capacitor.

Note here that c is a permittivity, and S is an electrode area of the parallel flat plate capacitor.

$$F_{e1} = \frac{1}{2\varepsilon S}\left(C\frac{V_2 - V_1}{2}\right)^2 \quad \text{(Expression 1)}$$

Similarly, $F_{e2}$ can be acquired as follows when a static electricity force working between a single Y-electrode 13 and the finger-modeled electrode 18 is expressed as $F_{e2}$ as shown in FIG. 3.

$$F_{e2} = \frac{1}{2\varepsilon S}\left(C\frac{V_1 - V_2}{2}\right)^2 \quad \text{(Expression 2)}$$

When the pitch between the electrodes is so minute that the electric static force $F_{e2}$ and the electric static force $F_{e1}$ cannot be distinguished by a finger, it can be considered that the total force which is the sum of the individual forces $F_{e1}$ and $F_{e2}$ works on the finger in a macroscopic manner. The total force F of all the forces working on the finger-modeled electrode 18 is $F=2(F_{e1}+F_{e2})$ from FIG. 3. Thus, it can be acquired as follows by using $V_1$, $V_2$ described above and values of Expression 1 and Expression 2.

$$F = \frac{A^2 C^2}{2\varepsilon S}\{1 - \cos 2\pi(f_1 + f_2)t\}\{1 - \cos 2\pi(f_1 - f_2)t\} \quad \text{(Expression 3)}$$

From Expression 3, it can be seen that the total force F as the sum of the individual forces working on the modeled electrode 18 is acquired by multiplying a periodic function whose value range is [0, 2] and the frequency is the absolute value of $(f_1-f_2)$ and a periodic function whose value range is $[0, A^2C^2/(\varepsilon S)]$ and the frequency is $(f_1+f_2)$ together. The frequency of the envelope curve is the absolute value of $(f_1-f_2)$.

In the basic embodiment, it is defined as the frequency $f_1=1000$ Hz and the frequency $f_2=1240$ Hz, so that the absolute value of the difference therebetween is 240 Hz. Thus, the attraction F working on the finger changes at 240 Hz as shown in Expression 3. Therefore, when a person traces the surface of the tactile sense presentation device 10 with a finger, there is a change in the friction force at the frequency of 240 Hz. 240 Hz is a frequency at which the mechanoreceptor of the skin of human beings exhibits sensitivity, so that a sense of texture can be presented thereto.

Further, the inventors of the present invention have verified the existence of a sense of texture for the frequency of the voltage signal. A same voltage signal was applied to all the X-electrodes 12 and Y-electrodes 13 on the supporting substrate 11 and the existence of a sense of texture was checked. As a result, it was verified that a sense of texture is felt when the frequency of the voltage signal is larger than 5 Hz and less than 500 Hz, and that a sense of texture is not felt in a case where the frequency of the voltage signals is out of this range.

Further, existence of a sense of texture for the absolute value of the difference between $f_1$ and $f_2$ was experimentally checked by applying the voltage signal of the frequency $f_1$ to all the X-electrodes 12 on the supporting substrate 11 and applying the voltage signal of the frequency $f_2$ to all the Y-electrodes 13. As a result, it was verified that a sense of texture was felt when the absolute value of the difference between $f_1$ and $f_2$ was larger than 10 Hz and less than 1000 Hz and that a sense of texture was not felt when the absolute value of the difference between $f_1$ and $f_2$ was 10 Hz or less or 1000 Hz or more.

Based on those results, it is found to be possible to achieve the tactile sense presentation device 10 which presents a sense of texture to the region where the X-electrode to which the voltage signal of the frequency $f_1$ is applied and the Y-electrode to which the voltage signal of the frequency $f_2$ is applied intersect with each other and does not present a sense of texture to other regions through setting $f_1$ and $f_2$ both as 500 Hz or more and setting $f_1$ and $f_2$ such that the absolute value of the difference between $f_1$ and $f_2$ becomes larger than 10 Hz and less than 1000 Hz, provided that the frequency of the voltage signal to be applied to the X-electrode is $f_1$ and the frequency of the voltage signal to be applied to the Y-electrode is $f_2$.

Figure 4:
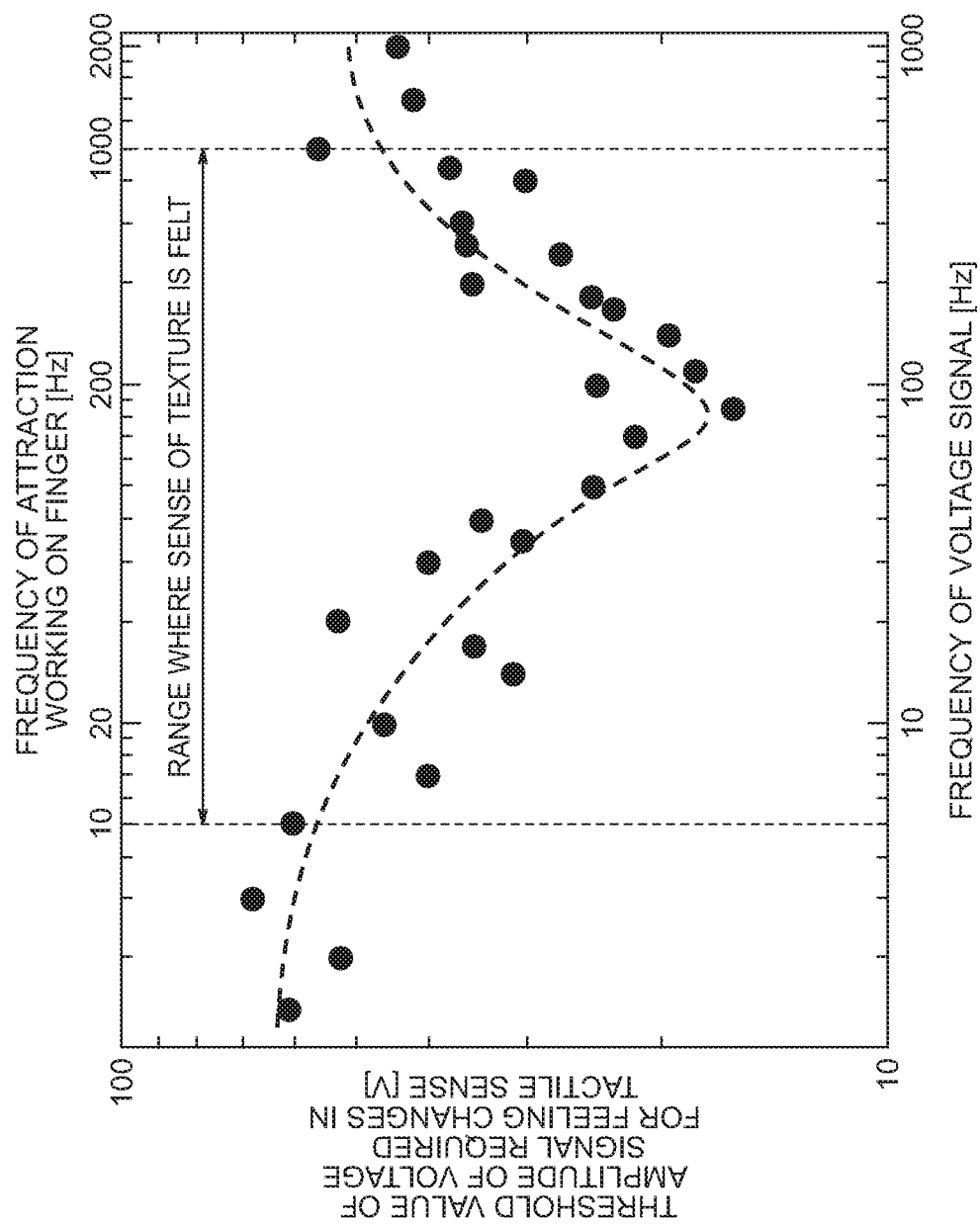
FIG. 4 is a graph acquired by measuring the relation between the threshold values of the amplitudes of the voltage signals required for the user to sense the changes in the tactile sensation and the frequencies of the attraction worked on a finger in the tactile sense presentation device shown in FIG. 1 and FIG. 2.

Further, it is considered that the frequency of the attraction working on the finger affects for feeling a sense of texture from Expression 3 and the facts depicted in the inquiry thereof, so that the inventors of the present invention conducted experiments for checking the relation between the frequency of the attraction working on the finger and feeling of a tactile sense. FIG. 4 is a graph showing measured relations between the threshold values of the amplitudes of the voltage signals required for the user to feel the changes in the tactile sense and the frequencies of the attraction working on the finger with the tactile sense presentation device 10 shown in FIG. 1 and FIG. 2.

The graph of FIG. 4 shows the result acquired by measuring the threshold values of the amplitudes required for feeling changes in the tactile sense by applying a same voltage signal to all the X-electrodes 12 and all the Y-electrodes 13 on the supporting substrate 11 while changing the frequency. The bottom axis shows the frequencies of the voltage signals applied to all the X-electrodes 12 and all the Y-electrodes 13, and the left axis shows the threshold values of the amplitudes of the voltage signal required for feeling the changes in the tactile sense.

In the experiments, the frequency of the attraction working on the finger of the operator is twice the frequency $f_1$ of the applied voltage signal. For deriving that relation, a static electric force F may be acquired by setting the resistance value of the resistance 19 shown in FIG. 3 as a finite value excluding infinity, extremely "0", and setting both of the frequencies of the voltage signals applied to the X-electrodes 12 and the Y-electrodes 13 as $f_1$. In FIG. 4, the frequencies of the attraction working on the finger are shown in the top axis. That is, the relation between the frequency of the attraction working on the finger and the threshold value of the amplitude required for feeling is expressed by the top axis and the left axis of FIG. 4.

From the graph shown in FIG. 4, it can be found that the threshold value takes the minimum value when the frequency of the attraction working on the finger is near 200 Hz. That is, it can be said that the receptor of the skin of the human beings feels a sense of texture with the highest sensitivity when the frequency of the attraction working on the finger is near 200 Hz. Further, not only the fact that the bottom of a valley in the graph regarding the relation between the threshold value and the frequency is where the frequency of the attraction working on the finger is near 200 Hz, it can also be found from the graph of FIG. 4 that the start and end of a valley is near 10 Hz and 1000 Hz, respectively.

That is, a sense of texture is felt when the frequency of the attraction is within a range of 10 to 1000 Hz. A sense of texture is not felt at the frequency out of this range, and a sense of friction is felt.

The working effect of the basic embodiment can be described as follows. When a voltage signal of the frequency $f_1$ is applied to a prescribed X-electrode 12 on the supporting substrate 11 and a voltage signal of the frequency $f_2$ that is different from the frequency $f_1$ is applied to a prescribed Y-electrode 13, the attraction of the absolute value of the frequency $(f_1-f_2)$ works on the finger in the target region 17 containing the intersection part between the X-electrode and the Y-electrode.

Therefore, through setting the absolute value of the frequency $(f_1-f_2)$ to be larger than 10 Hz and less than 1000 Hz, it is possible to present a sense of texture to the target region 17 constituted by containing the intersection part between the prescribed X-electrode 12 and the prescribed Y-electrode 13.

The attraction of the frequency that is twice the frequency $f_1$ works on the finger in the region on the X-electrode excluding the target region 17 constituted by containing the intersection part, and the attraction of the frequency that is twice the frequency $f_2$ works on the finger in the region on the Y-electrode excluding the target region 17 constituted by containing the intersection part based on a formula of the force working between the electrodes of the parallel flat plate capacitor.

Therefore, through setting both $f_1$ and $f_2$ to be 500 Hz or more, the attraction of 1000 Hz or more works on the finger both in the region on the prescribed X-electrode and in the region on the Y-electrode excluding the target region 17 constituted by containing the intersection part between the prescribed X-electrode and the prescribed Y-electrode. Thus, a sense of texture is not presented.

Through the above-described working effect, following issues can be overcome. With an existing tactile sense presentation device, a space for drawing around a plurality of independent wirings for each electrode for presenting a sense of texture is required. As a result, the gap between the electrodes for presenting a sense of texture becomes wide so that the spatial resolution of the tactile sense presentation device becomes low. In the basic embodiment, the electrodes for presenting a sense of texture also functions as the wirings, so that the spatial resolution can be increased.

Further, the first basic embodiment makes it possible for the shape of the electrodes to be hardly recognized. Thus, when it is used by superimposed with a display device such as a liquid crystal display device, deterioration in the original display quality of the display device can be suppressed. Further, while the existing tactile sense presentation device has such an issue that an originally unnecessary sense of texture is presented in the regions where the wirings are drawn around, the basic embodiment makes it possible to overcome such issue as well.

Second Basic Embodiment

Instead of the structure of the first basic embodiment described above, in a second basic embodiment of the present invention, the driving circuits (an X-electrode driving circuit 114, a Y-electrode driving circuit 115) have a function which applies a third-frequency voltage signal to the electrodes on which the first-frequency voltage signal is not applied among a plurality of X-electrodes and to the electrodes on which the second-frequency voltage signal is not applied among a plurality of Y-electrodes. The third frequency is 2.5 Hz or more and 5 Hz or less, or 500 Hz or higher. The absolute value of the difference between the third frequency and the first frequency and the absolute value of the difference between the third frequency and the second frequency are both 10 Hz or less, or 1000 Hz or more.

Not only making it possible to acquire the same effects as those of the first basic embodiment, this structure also makes it possible to prevent a phenomenon with which a tactile sense presented outside of the target region forms a shape called cross hairs having the target region as the center.

This will be described in more details hereinafter.

Figure 5:
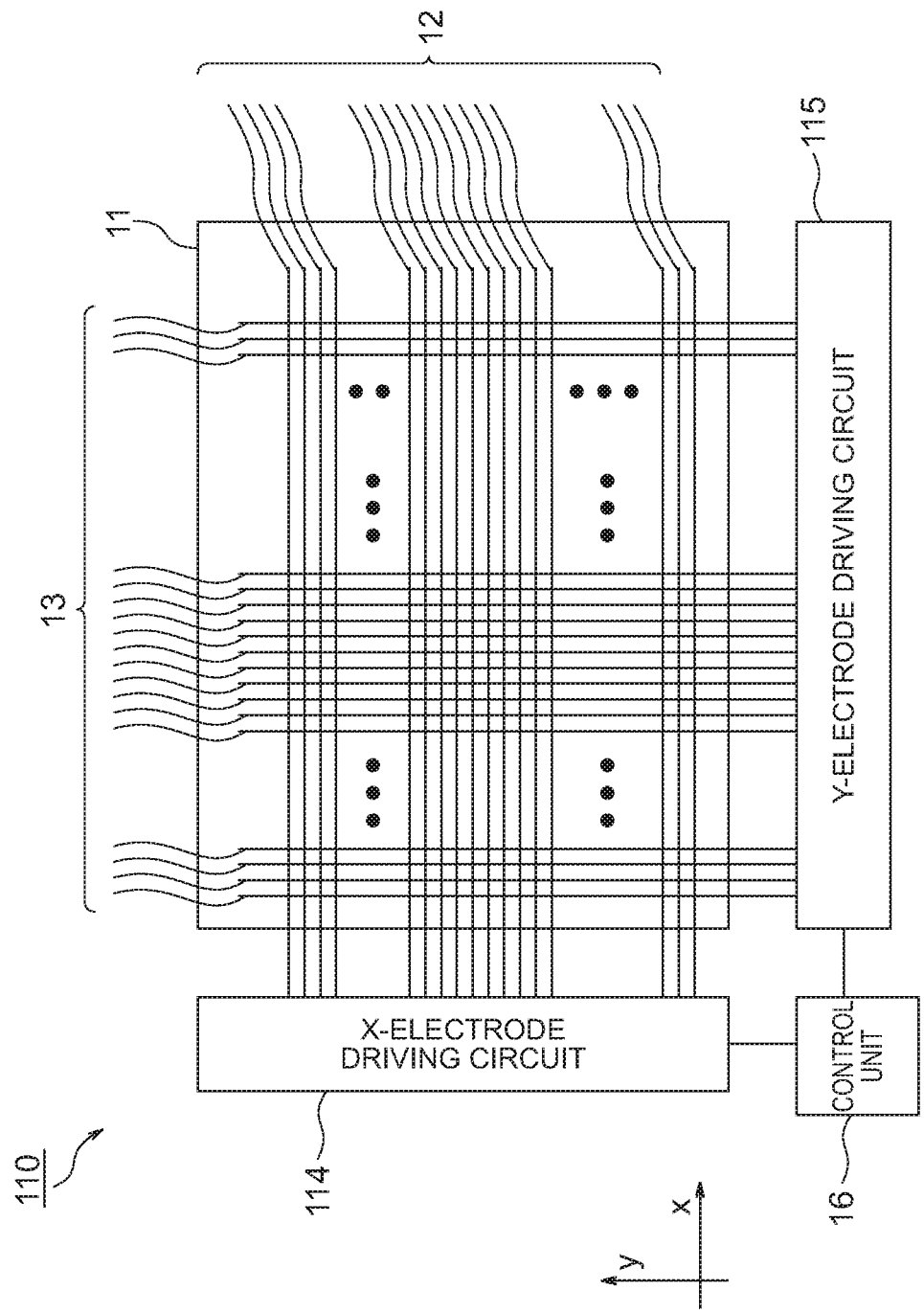
FIG. 5 is an explanatory chart showing the structure of a tactile sense presentation device according to a second basic embodiment of the present invention.

FIG. 5 is an explanatory chart showing the structure of a tactile sense presentation device 110 according to the second basic embodiment of the present invention. The tactile sense presentation device 110 includes many of the same structures as those of the first basic embodiment. Therefore, same names and reference numerals as those of the first basic embodiment are applied to the same components, and explanations thereof are to be omitted.

In the tactile sense presentation device 110, the supporting substrate 11, the X-electrodes 12, the Y-electrodes 13, and the control unit 16 are the same as those of the first basic embodiment. Further, an X-electrode driving circuit 114 different from that of the first basic embodiment is connected to each of the X-electrodes 12, and a Y-electrode driving circuit 115 different from that of the first basic embodiment is connected to each of the Y-electrodes 13.

The tactile sense presentation device 10 according to the first basic embodiment implements the tactile sense presentation device which presents a sense of texture to the target region 17 where the X-electrode 12 to which the voltage signal of the frequency $f_1$ is applied and the Y-electrode 13 to which the voltage signal of the frequency $f_2$ is applied intersect with each other and does not present a sense of texture to the other regions. However, with this tactile sense presentation device 10, the tactile sense in the region other than the target region 17 is not considered to be equivalent within that region.

Defining that the tactile sense in the region where the X-electrode and the Y-electrode are grounded as a reference tactile sense, a sense of friction is felt strongly with respect to the reference tactile sense in the region excluding the target region 17 from the region on the electrodes of $X_{11}$ to $X_{14}$ shown in FIG. 2, i.e., a sense of friction is presented. Similarly, a sense of friction is presented in the region excluding the target region 17 from the region on the electrodes of $Y_{24}$ to $Y_{27}$.

As a result, the tactile sense presentation device 10 according to the first basic embodiment presents cross hairs by having the target region 17 as the center. The cross hairs can be considered to have an effect as a guide for finding the target region 17. However, it can also be considered as an issue in view of the versatility for presenting a tactile sense.

A sense of texture is normally generated due to minute protrusions and dents on the surface of an object. For example, when a surface of each of the materials such as cloth, paper, shark skin, glass, and sandpaper is traced by a finger, differences in a sense of texture can be felt. Meanwhile, a sense of friction is normally generated due to a friction force between a finger and a surface of an object. For example, in a case where a surface of glass is traced by a dry finger and a case where the surface of glass is traced by a damp finger, a weak sense of friction is felt in the former case while a strong sense of friction is felt in the latter case.

There is no specific change in a sense of texture between the both cases, and it is possible to feel that the object is glass in both cases.

The second basic embodiment of the present invention overcomes such issue, and presents the tactile sense presentation device 10 which makes it possible to equalize a sense of friction in the region where a sense of texture is not presented and equalizes a tactile sense in the region where a sense of texture is not presented.

Figure 6:
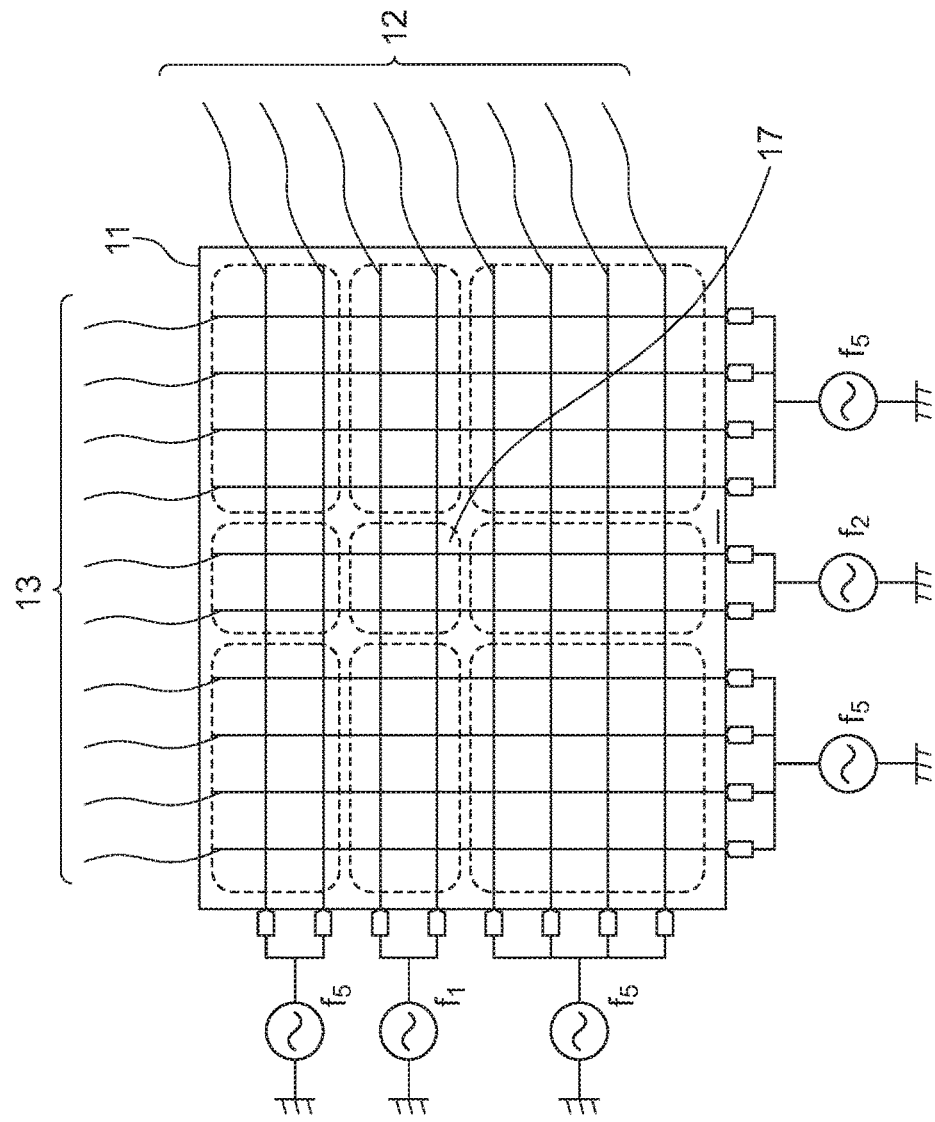
FIG. 6 is an explanatory chart showing a driving method of the tactile sense presentation device shown in FIG. 5.

FIG. 6 is an explanatory chart showing a driving method of a tactile sense presentation device 110 shown in FIG. 5. More specifically, it is for describing actions of the X-electrode driving circuit 114 and the Y-electrode driving circuit 115 according to the basic embodiment. Reference numerals of each of the electrodes are same as those shown in FIG. 2. The target region 17 to which a sense of texture is to be presented is the same as that of FIG. 2. It is the range of $X_{11}$ to $X_{14}$ for the X-electrodes 12 and the range of $Y_{24}$ to $Y_{27}$ for the Y-electrodes 13.

The X-electrode driving circuit 114 applies a voltage signal of the frequency $f_1=1000$ Hz to $X_{11}$ to $X_{14}$ which overlap with the target region 17 among a plurality of X-electrodes 12 and applies a voltage signal of the frequency $f_5=3000$ Hz to the other X-electrodes 12. The Y-electrode driving circuit 115 applies a voltage signal of the frequency $f_2=1240$ Hz to $Y_{24}$ to $Y_{27}$ which overlap with the target region 17 among a plurality of Y-electrodes 13 and applies a voltage signal of the frequency $f_5=3000$ Hz to the other Y-electrodes 13.

When the above-described signals are applied to the X-electrodes and the Y-electrodes, a sense of texture is felt only in the target region 17 when the surface of the tactile sense presentation device 110 is traced by a finger. Further, an equivalent sense of friction is presented to the regions other than the target region 17.

Figure 7:
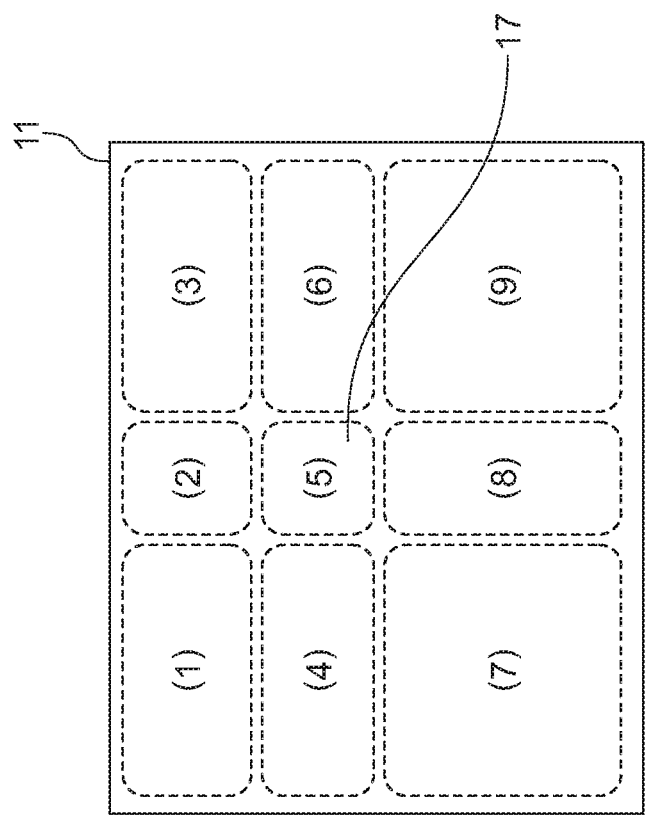
FIG. 7 is an explanatory chart showing each region on a display surface of the tactile sense presentation device shown in FIG. 5 and FIG. 6.

FIG. 7 is an explanatory chart showing each region on the tactile presenting surface of the tactile sense presentation device 110 shown in FIGS. 5 and 6. In FIG. 7, the tactile presenting surface of the tactile sense presentation device 110 is divided into nine regions of (1) to (9). The target region 17 corresponds to the region (5). In this region, the voltage signal of the frequency $f_1=1000$ Hz is applied to the X-electrodes 12 and the voltage signal of the frequency $f_2=1240$ Hz is applied to the Y-electrodes 13. Thus, as described in the first basic embodiment, beat of 240 Hz is generated so that a sense of texture is presented thereby.

In the regions (1), (3), (7), and (9), a signal voltage of the frequency $f_5=3000$ Hz is applied to the X-electrodes 12 and the Y-electrodes 13. As a result of the experiments, a sense of texture was not presented in those regions but a sense of friction was presented.

In the regions (2) and (8), a signal voltage of the frequency $f_5=3000$ Hz is applied to the X-electrodes 12 and a signal voltage of the frequency $f_2=1240$ Hz is applied to the Y-electrodes 13. The absolute value of the difference between $f_5$ and $f_2$ is 1760 Hz. As a result of the experiments, a sense of texture was not presented in those regions but a sense of friction was presented.

In the regions (4) and (6), a signal voltage of the frequency $f_1=1000$ Hz is applied to the X-electrodes 12 and a signal voltage of the frequency $f_5=3000$ Hz is applied to the Y-electrodes 13. The absolute value of the difference between $f_5$ and $f_1$ is 2000 Hz. As a result of the experiments, a sense of texture was not presented in those regions but a sense of friction was presented.

That is, a sense of texture was not presented in all the regions excluding the target region 17. Further, senses of friction presented in all the regions except for the target region 17 were equivalent to such an extent that it is not possible to discriminate those by a tactile sense.

Figure 8:
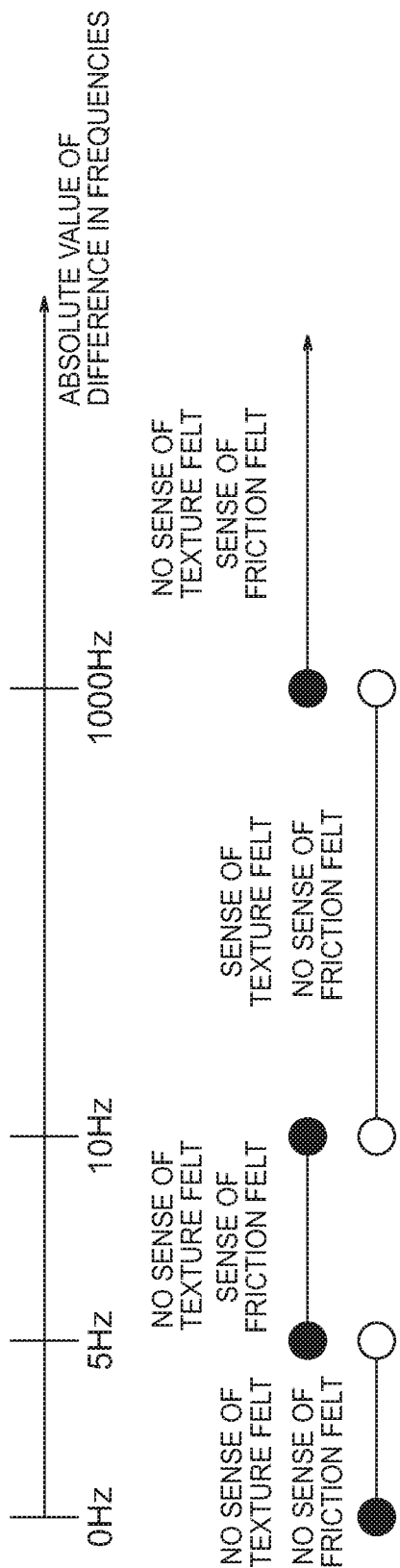
FIG. 8 is a graph showing the relation between the frequencies applied to the X-electrodes as well as the Y-electrodes and a tactile sense in the tactile sense presentation device shown in FIG. 1 and FIG. 2.

The inventors of the present invention checked existence of sensation by human beings regarding existence of sensation of a sense of texture and a sense of friction regarding the frequencies of voltage signals by experiments. FIG. 8 is a graph showing the relation between the frequencies applied to the X-electrodes 12 and the Y-electrodes 13 and a tactile sense in the tactile sense presentation device 110 shown in FIG. 5 to FIG. 7.

Two number lines are drawn in FIG. 8. Those lines show a case where signal voltages of different frequencies are applied to the X-electrodes 12 and the Y-electrodes 13 and a case where signal voltages of a same frequency are applied to those. Here, the relation between the frequencies and a tactile sense of human beings in each of the cases is checked by referring to the number line of the case drawn on the bottom side where signal voltages of a same frequency are applied.

First, in a case where the frequency is 0 to 2.5 Hz, human beings cannot feel a sense of texture and a sense of friction. In a case where the frequency is 2.5 to 5 Hz, human beings cannot feel a sense of texture but can feel a sense of friction. In a case where the frequency is 5 to 500 Hz, human beings can feel a sense of texture but cannot feel a sense of friction. Further, in a case where the frequency is 500 Hz or more, human beings cannot feel a sense of texture but can feel a sense of friction.

Subsequently, the relation between the absolute value of a difference between the frequencies of the both and a tactile sense of human beings in a case of applying signal voltages of different frequencies with which beat was generated in the X-electrodes 12 and the Y-electrodes 13 was checked. The result thereof is drawn as a number line on the upper side in FIG. 8.

In a case where the absolute value of the difference in the frequencies is 0 to 5 Hz, human beings cannot feel a sense of texture and a sense of friction. In a case where the absolute value of the difference in the frequencies is 5 to 10 Hz, human beings cannot feel a sense of texture but can feel a sense of friction. In a case where the absolute value of the difference in the frequencies is 10 to 1000 Hz, human beings can feel a sense of texture but cannot feel a sense of friction. Further, in a case where the absolute value of the difference in the frequencies is 1000 Hz or more, human beings cannot feel a sense of texture but can feel a sense of friction.

According to the results of the experiments described above, with the tactile sense presentation device 110 of the basic embodiment, each of $f_1$, $f_2$, and $f_5$ is defined to be a value satisfying each of following conditions provided that the frequency of the signal voltage supplied to the X-electrodes 12 that overlap with the target region 17 is $f_1$, the frequency of the signal voltage supplied to the Y-electrodes 13 that overlap with the target region 17 is $f_2$, and the frequency of the signal voltage supplied to the other X-electrodes 12 and Y-electrodes 13 is $f_5$.

$f_1$ an $f_2$ are both 500 Hz or more

Absolute value of the difference between $f_1$ and $f_2$ is larger than 10 Hz and less than 1000 Hz $f_5$ is between 2.5 and 5 Hz, both inclusive, or 500 Hz or more Absolute value of the difference between $f_5$ and $f_1$ is 10 Hz or less or 1000 Hz or more Absolute value of the difference between $f_5$ and $f_2$ is 10 Hz or less or 1000 Hz or more Through satisfying the above-described conditions, the tactile sense presentation device 110 can present a sense of texture to the target region 17 where the X-electrodes 12 to which the signal voltage of the frequency $f_1$ is applied and the Y-electrodes 13 to which the signal voltage of the frequency $f_2$ is applied intersect with each other, and can present an equivalent sense of friction to the other regions.

The tactile sense presentation device 110 according to the embodiment can present a sense of texture only to the target region 17 and present an equivalent sense of friction to the other regions. That is, it is possible to present a different tactile sense only to a prescribed region while a tactile sense on the background of the tactile sense presenting surface is equivalent. This makes it possible to increase the effect of presenting the tactile sense.

Third Basic Embodiment

Instead of the structure of the first basic embodiment described above, in a third basic embodiment of the present invention, the driving circuits (an X-electrode driving circuit 214, a Y-electrode driving circuit 215) have a function which applies a first-frequency voltage signal to the X-electrodes which correspond to a first target region while applying a second-frequency voltage signal to the Y-electrodes which correspond to the first target region and, at the same time, applies a third-frequency voltage signal to the X-electrodes which correspond to a second target region while applying a fourth-frequency voltage signal to the Y-electrodes which correspond to the second target region.

Regarding each of those frequencies, all of the first to fourth frequencies are 500 Hz or higher. The absolute value of the difference between the first and second frequencies and the absolute value of the difference between the third and fourth frequencies are both larger than 10 Hz and less than 1000 Hz, and the absolute value of the difference between the first and fourth frequencies and the absolute value of the difference between the second and third frequencies are both 10 Hz or less, or 1000 Hz or more.

Not only making it possible to acquire the same effects as those of the first basic embodiment, this structure also makes it possible to present a sense of texture to each of the target regions even when a plurality of target regions are designated.

This will be described in more details hereinafter.

FIG. 9 is an explanatory chart showing the structure of a tactile sense presentation device 210 according to the third basic embodiment of the present invention. The tactile sense presentation device 210 includes many of the same structures as those of the first basic embodiment. Therefore, same names and reference numerals as those of the first basic embodiment are applied to the same components, and explanations thereof are to be omitted.

In the tactile sense presentation device 210, the supporting substrate 11, the X-electrodes 12, and the Y-electrodes 13 are the same as those of the first basic embodiment. Further, an X-electrode driving circuit 214 different from that of the first basic embodiment is connected to each of the X-electrodes 12, and a Y-electrode driving circuit 215 different from that of the first basic embodiment is connected to each of the Y-electrodes 13. Furthermore, a control unit 216 different from that of the first basic embodiment is connected to the X-electrode driving circuit 214 and the Y-electrode driving circuit 215.

In the tactile sense presentation devices 10 and 110 according to the first and second basic embodiments, there is only one target region 17 to which a sense of texture is to be presented. However, the tactile sense presentation device 210 according to this basic embodiment presents a sense of texture to a plurality of individual regions on the surface. The control unit 216 supplies control signals to the X-electrode driving circuit 214 and the Y-electrode driving circuit 215 regarding each of the plurality of regions.

FIG. 10 is an explanatory chart showing a driving method of the tactile sense presentation device 210 shown in FIG. 9. More specifically, it is for describing actions of the X-electrode driving circuit 214 and the Y-electrode driving circuit 215 according to the basic embodiment. Note here that the regions for presenting a sense of texture are two individual regions 17a and 17b.

The X-electrode driving circuit 214 applies a signal voltage of the frequency $f_1$=1000 Hz to the X-electrodes that overlap with the region 17a on a plan view, and applies a signal voltage of the frequency $f_3$=2480 Hz to the X-electrodes that overlap with the region 17b on a plan view among a plurality of X-electrodes 12. The Y-electrode driving circuit 215 applies a signal voltage of the frequency $f_2$=1240 Hz to the Y-electrodes that overlap with the region 17a on a plan view, and applies a signal voltage of the frequency $f_4$=2240 Hz to the Y-electrodes that overlap with the region 17b on a plan view among a plurality of Y-electrodes 13.

When the above-described signals are applied to the X-electrodes 12 and the Y-electrodes 13, a sense of texture is felt only in the target regions 17a and 17b when the surface of the tactile sense presentation device 210 is traced by a finger. This can be described as follows based on the relation between the frequencies applied to the X-electrodes and the Y-electrodes and a tactile sense described by referring to FIG. 8.

Signal voltages of 1000 Hz and 1240 Hz are applied to the X-electrodes 12 and the Y-electrodes 13, respectively, which overlap with the target region 17a on a plan view, and the absolute value of the difference therebetween is 240 Hz. Thus, a sense of texture is presented to the target region 17a. Signal voltages of 2480 Hz and 2240 Hz are applied to the X-electrodes 12 and the Y-electrodes 13, respectively, which overlap with the target region 17b on a plan view, and the absolute value of the difference therebetween is 240 Hz. Therefore, a sense of texture is also presented to the target region 17b.

Meanwhile, in the region (the region shown as (3) in FIG. 10) where the X-electrodes 12 to which the signal voltage of the frequency $f_3$=2480 Hz is applied and the Y-electrodes 13 to which the signal voltage of the frequency $f_2$=1240 Hz is applied intersect with each other, the absolute value of the difference between the frequencies of both signal voltages is 1240 Hz.

Therefore, a sense of texture is not presented.

Further, in the region (the region shown as (4) in FIG. 10) where the X-electrodes 12 to which the signal voltage of the frequency $f_1$=1000 Hz is applied and the Y-electrodes 13 to which the signal voltage of the frequency $f_4$=2240 Hz is applied intersect with each other, the absolute value of the difference between the frequencies of both signal voltages is 1240 Hz.

Therefore, a sense of texture is not presented.

Further, all the frequencies $f_1$ to $f_4$ are 500 Hz or more, so that a sense of texture is not presented in the electrode alone to which those are applied. From those results described above, it is found that a sense of texture is presented limitedly to the target regions 17a and 17b with the tactile sense presentation device 210.

Based on the results, it is possible to achieve the tactile sense presentation device 210 which presents a sense of texture to a plurality of individual regions on the tactile sense presenting surface through supplying the voltage signals in such a manner that the absolute value of the difference between the frequencies of the voltage signals applied to the X-electrodes 12 and the Y-electrodes 13 forming the intersection is larger than 10 Hz and less than 1000 Hz in the intersections included in the target regions 17a and 17b to which a sense of texture is to be presented among the intersection parts of the X-electrodes 12 and the Y-electrodes 13 and that the absolute value of the difference between the frequencies of the voltage signals applied to the X-electrodes 12 and the Y-electrodes 13 is 10 Hz or less or 1000 Hz or more in the other intersection parts formed by the X-electrodes 12 and the Y-electrodes 13 which form those intersection parts.

That is, the tactile sense presentation device 210 according to this embodiment is capable of presenting a sense of texture to a plurality of target regions 17a and 17b isolated from each other on the tactile sense presenting surface, so that the versatility of presenting a tactile sense can be improved.

The electrode to which input of the voltage signals of the frequencies $f_1$ to $f_4$ is not designated in the third basic embodiment may be grounded or a direct-current voltage may be applied thereto as in the case of the first basic embodiment. Further, it is also possible to apply the voltage signals of the frequencies satisfying the conditions depicted in the second basic embodiment to the electrodes to which an input of the voltages signals of any of the frequencies $f_1$ to $f_4$ is not designated.

Generalization of Third Basic Embodiment

Actions described in the third basic embodiment will be generalized and described. The third basic embodiment is a case where there are two target regions, and two regions existing at diagonal angles of a square having the four regions (1) to (4) shown in FIG. 10 as the vertexes are taken as the target regions.

Even in a case where the number of target regions is an arbitrary number of 2 or more or the above-described condition of "existing at the diagonal angles" is excluded, it is also possible to present a sense of texture to each of a plurality of arbitrary target regions. In that case, the voltage signals may be applied to each of the X-electrodes and the Y-electrodes by determining the frequencies in such a manner that the absolute value of the difference between the frequencies of the voltage signals applied to the X-electrodes and the Y-electrodes contained in the target regions is larger than 10 Hz and less than 1000 Hz and that the absolute value of the difference between the frequencies of the voltage signals applied to the X-electrodes and the Y-electrodes forming the intersection is 10 Hz or less or 1000 Hz or more in the other intersection parts excluding the target regions which are formed by the X-electrodes and the Y-electrodes forming the target region.

Fourth Basic Embodiment

In addition to the structure of the first basic embodiment described above, in a fourth basic embodiment of the present invention, the driving circuits (an X-electrode driving circuit 264, a Y-electrode driving circuit 265) have a function which applies a first-frequency voltage signal of 500 Hz or more to the X-electrodes which correspond to information regarding a target region inputted from outside among the plurality of X-electrodes and applies a voltage signal of a second frequency of 500 Hz or more to the Y-electrodes which correspond to information regarding the target region among the plurality of Y-electrodes. Further, the driving circuits chronologically change at least either one of the frequencies out of the first and second frequencies within a range that is not lower than 500 Hz.

Note here that there are a first period where the absolute value of the difference between the first frequency and the second frequency is larger than 10 Hz and less than 1000 Hz and a second period where the absolute value of the difference between the first frequency and the second frequency is 10 Hz or less or 1000 Hz or more. Further, the first period and the second period are set alternately.

With this structure, it is possible to present various kinds of tactile senses that can be more easily felt in addition to achieving the same effects as those of the first basic embodiment. This will be described in more details hereinafter.

FIG. 11 is an explanatory chart showing the structure of a tactile sense presentation device 260 according to the fourth basic embodiment of the present invention. FIG. 12 is an explanatory chart showing a driving method of the tactile sense presentation device 260 shown in FIG. 11.

The tactile sense presentation device 260 includes many of the same structures as those of the first basic embodiment. Therefore, same names and reference numerals as those of the first basic embodiment are applied to the same components, and explanations thereof are to be omitted. More specifically, the tactile sense presentation device 260 makes it possible to present many kinds of tactile senses by changing the static electric force F generated in the target region 17 over the time.

It is the feature of the tactile sense presentation device 260 to: apply a first-frequency voltage signal of 500 Hz or more to the X-electrodes which correspond to information regarding the target region 17 inputted from outside among the plurality of X-electrodes 12; apply a second-frequency voltage signal of 500 Hz or more to the Y-electrodes which correspond to information regarding the target region 17 among the plurality of Y-electrodes 13; and chronologically change at least either one of both of the frequencies out of the first and second frequencies within a range that is not lower than 500 Hz.

With this feature, the tactile sense presentation device 260 according to this basic embodiment presents many kinds of tactile senses to the target region 17. Further, it is possible with this feature not to present an unnecessary tactile sense to the regions other than the target region while presenting many kinds of tactile senses within the target region 17.

Further, the tactile sense presentation device 260 according to this basic embodiment has both periods of the first period where the absolute value of the difference between the first frequency and the second frequency is larger than 10 Hz and less than 1000 Hz and the second period where the absolute value of the difference between the first frequency and the second frequency is 10 Hz or less or 1000 Hz or more, and the first period and the second period are alternately set.

This feature of the tactile sense presentation device 260 according to this basic embodiment makes it possible not to present an unnecessary tactile sense to the regions other than the target region while presenting a pulsating sense of texture within the target region 17.

In the tactile sense presentation device 260, the supporting substrate 11, the X-electrodes 12, and the Y-electrodes 13 are the same as those of the first basic embodiment.

Further, an X-electrode driving circuit 264 which generates voltage signals different from those of the first basic embodiment is connected to each of the X-electrodes 12, and a Y-electrode driving circuit 265 which generates voltage signals different from those of the first basic embodiment is connected to each of the Y-electrodes 13. Furthermore, a control unit 266 different from that of the first basic embodiment is connected to the X-electrode driving circuit 264 and the Y-electrode driving circuit 265.

FIG. 13 is an explanatory chart showing voltage signals generated by the X-electrode driving circuit 264 and the Y-electrode driving circuit 265 in the tactile sense presentation device 260 shown in FIG. 11 and FIG. 12. The target region 17 to which a sense of texture is to be presented is a range of $X_{11}$ to $X_{14}$ for the X-electrodes 12 and a range of $Y_{24}$ to $Y_{27}$ for the Y-electrodes 13. The control unit 266 supplies control signals to the X-electrode driving circuit 264 and the Y-electrode driving circuit 265 based on the information regarding the target region 17 supplied from outside.

The X-electrode driving circuit 264 upon receiving the control signals applies a voltage signal of the frequency $f_6$ to the X-electrodes that overlap with the target region 17 among a plurality of X-electrodes 12 on a plan view and the Y-electrode driving circuit 265 applies a voltage signal of the frequency $f_2$ to the Y-electrodes that overlap with the target region 17 among a plurality of Y-electrodes 13 on a plan view.

Figure 13A:
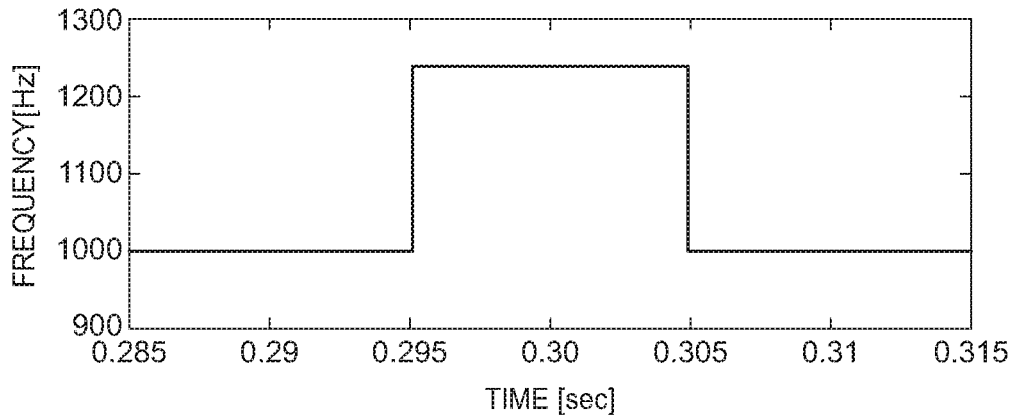

FIG. 13A shows the frequency $f_6$ of the voltage signal generated by the X-electrode driving circuit 264 and applied to the X-electrodes 12. The frequency $f_6$ changes in accordance with the time. It is $f_6$=1000 Hz in a period of time 0.285 to 0.295, $f_6$=1240 Hz in a period of time 0.295 to 0.305, and $f_6$=1000 Hz in a period of time 0.305 to 0.315.

Figure 13B:
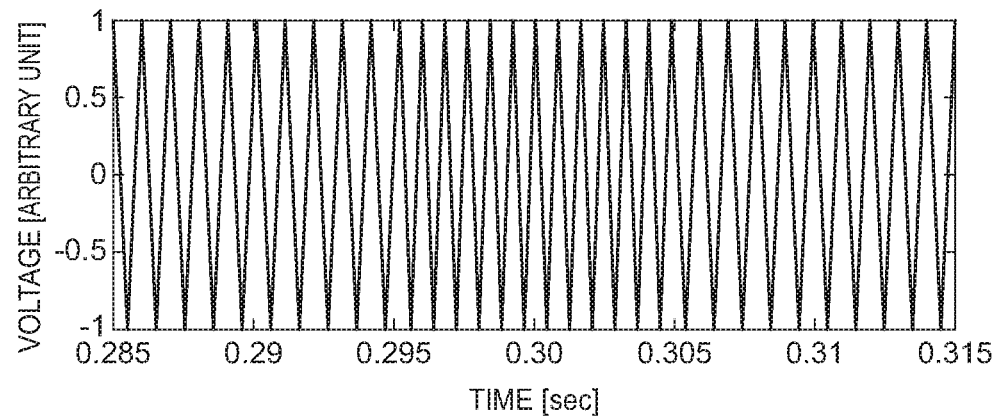

FIG. 13B shows a waveform of the voltage signal generated by the X-electrode driving circuit 264 and applied to the X-electrodes 12. It is a case where $f_6$=1000 Hz and 1240 Hz, and there is no specific change in the voltage value.

Figure 13C:
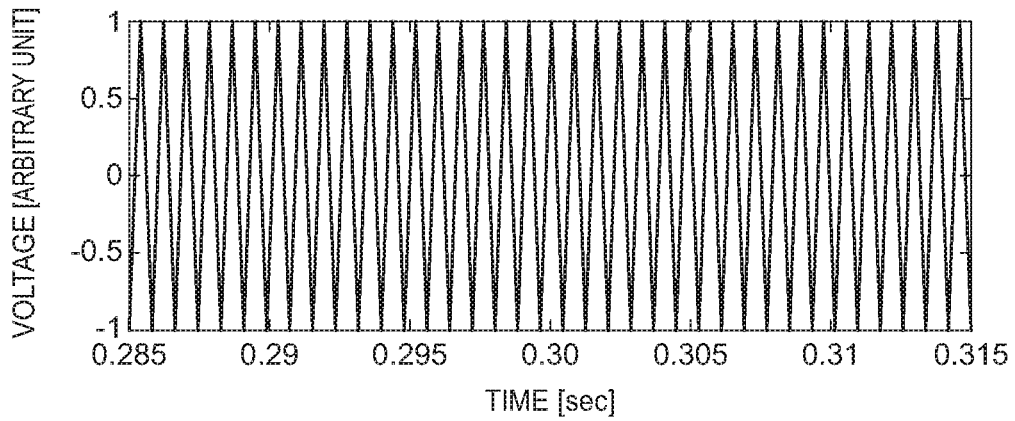

FIG. 13C shows the frequency $f_2$ of the voltage signal generated by the Y-electrode driving circuit 265 and applied to the Y-electrodes 13. The frequency $f_2$ does not change in accordance with the time, and $f_2$=1240 Hz.

Figure 14:
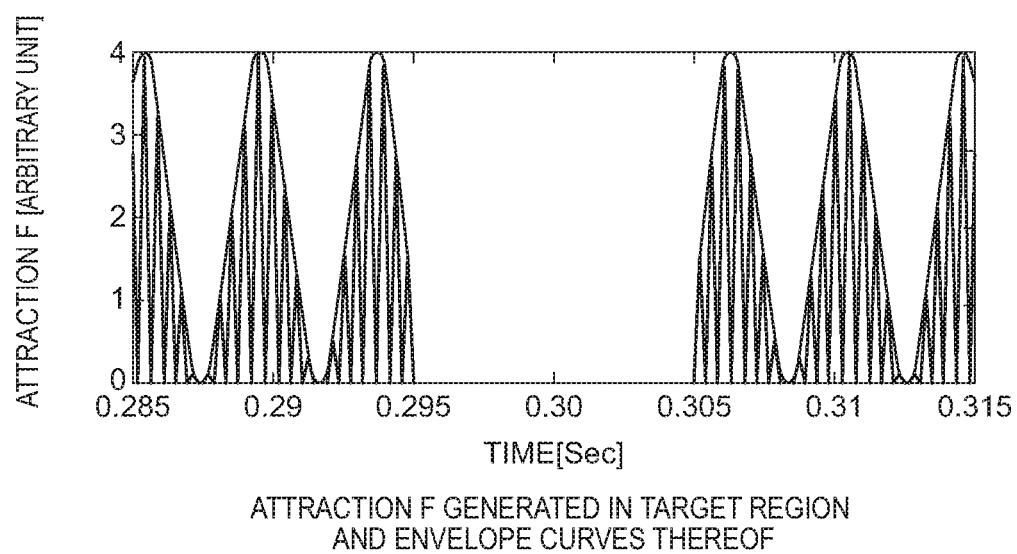
FIG. 14 is an explanatory chart showing the attraction F worked on a finger generated in a target region as a result of applying the voltage signals shown in FIG. 13A to FIG. 13C to the X-electrodes and the Y-electrodes which overlap with the target region in the tactile sense presentation device shown in FIG. 11 and FIG. 12.

FIG. 14 is an explanatory chart showing the attraction F working on a finger, which is generated in the target region 17 as a result of applying the voltage signals shown in FIG. 13A to 13C to the X-electrodes 12 and the Y-electrodes 13 which overlap with the target region 17 by the tactile sense presentation device 260 shown in FIG. 11 and FIG. 12. The attraction F can be acquired by using Expression 3 described above.

FIG. 14 shows the attraction F acquired by a calculation and envelope curves thereof. The frequencies of the envelope curves, i.e., the frequencies of the beat, are 240 Hz in the period of the time 0.285 to 0.295, 0 Hz in the period of the time 0.295 to 0.305, and 240 Hz in a period of the time 0.305 to 0.315.

In the period of the time 0.295 to 0.305, not only the frequency is zero but also the attraction F is zero. A case where the attraction F is zero is a case where the frequency $f_6$ of the voltage signal applied to the X-electrode 12 in the period of the time 0.295 to 0.305 is the same as the frequency $f_2$ of the Y-electrodes 13 and the phases are also equivalent. It is not necessarily essential for the phases of $f_6$ and $f_2$ to be equivalent.

When the surface of the tactile sense presentation device 260 is traced by a finger, a sense of texture is felt when the frequency of the attraction F is 240 Hz while a sense of texture is not felt when the frequency of the attraction F is 0 Hz.

Therefore, the tactile sense presentation device 260 can present a tactile sense that varies over the time in the target region 17. For example, through setting the frequency $f_2$ of the voltage signal applied to the Y-electrodes 13 as $f_2$=1240 Hz and changing the frequency $f_6$ of the voltage signal applied to the X-electrodes 12 to 1240 Hz by every 300 milliseconds for a period of 10 milliseconds by having 1000 Hz as the reference value, it is possible to present a pulsating sense of texture.

The advantage peculiar to the tactile sense presentation device 260 according to the fourth basic embodiment described above is that it is possible to present a tactile sense that varies over the time in the target region 17 without presenting a sense of texture and pulsation to the regions other than the target region 17.

That is, the tactile sense presentation device 260 changes the frequency $f_6$ of the voltage signal applied to the X-electrode 12 over the time for presenting a tactile sense that varies over the time in the target region 17. However, in the above-described case, the frequency $f_6$ is constantly 1000 Hz or more, so that a sense of texture is not generated and a sense of friction is constant to such an extent that it cannot be felt. Therefore, an unnecessary tactile sense is not presented on the X-electrodes outside the target region 17.

The attraction F same as that shown in FIG. 14 can also be generated under following conditions. First, the frequency of the signal voltage to be applied to the X-electrodes 12 is set as 1000 Hz in a period of 0.285 to 0.295, as 0 Hz in a period of time 0.295 to 0.305, and as 1000 Hz in a period of time 0.305 to 0.315. In the period of time 0.295 to 0.305 in this case, the signal voltage is set as a constant value of 0 V.

Meanwhile, the frequency of the signal voltage to be applied to the Y-electrodes 13 is set as 1240 Hz in a period of 0.285 to 0.295, as 0 Hz in a period of time 0.295 to 0.305, and as 1240 Hz in a period of time 0.305 to 0.315. In the period of time 0.295 to 0.305 in this case, the signal voltage is set as a constant value of 0 V.

That is, in the period of time 0.295 to 0.305, the signal voltage is 0 V and the frequency is 0 Hz in both for the X-electrodes 12 and the Y-electrodes 13. When a tactile sense presentation device 260 is driven under such condition, a pulsating sense of texture is presented to the target region 17. At the same time, a pulsating sense of texture is also presented on the electrodes not belonging to the target region 17, to which the voltage signal is applied, thereby presenting an originally unnecessary tactile sense. In this regards, the tactile sense presentation device 260 does not present an originally unnecessary tactile sense, so that it is advantageous.

The fact that the voltage signals applied to the X-electrodes 12 and the Y-electrodes 13 are not limited to 1000 Hz and 1240 Hz with the tactile sense presentation device 260 according to the fourth basic embodiment described above is evident also from the first to third basic embodiments described heretofore. The point is that the voltage signals to be applied to the X-electrodes 12 and the Y-electrodes 13 may simply be defined as follows.

That is, $f_6$ and $f_2$ are both 500 Hz or more, $f_6$ is set in such a manner that the absolute value of the difference between the both becomes larger than 10 Hz and less than 1000 Hz in the time where a sense of texture is desired to be presented to the target region 17, and $f_6$ is set in such a manner that the absolute value of the difference between the both becomes 10 Hz or less or larger than 1000 Hz in the time where a sense of texture is not to be presented to the target region 17. Such conditions may be satisfied.

Further, it is described in the above case to fix $f_2$ and to change $f_6$. However, existence of a sense of texture is determined according to the absolute value of the difference between the frequencies of $f_2$ and $f_6$. Thus, it is also possible to change $f_2$ and to fix $f_6$ or to change the both.

Fifth Basic Embodiment

In addition to the structure of the fourth basic embodiment described above, a fifth basic embodiment of the present invention is structured to change at least one frequency out of the first and second frequencies continuously according to the time within a range not less than 500 Hz.

With this structure, it is possible to present various kinds of tactile senses that can be more easily felt in addition to achieving the same effects as those of the first basic embodiment. This will be described in more details hereinafter.

Figure 15:
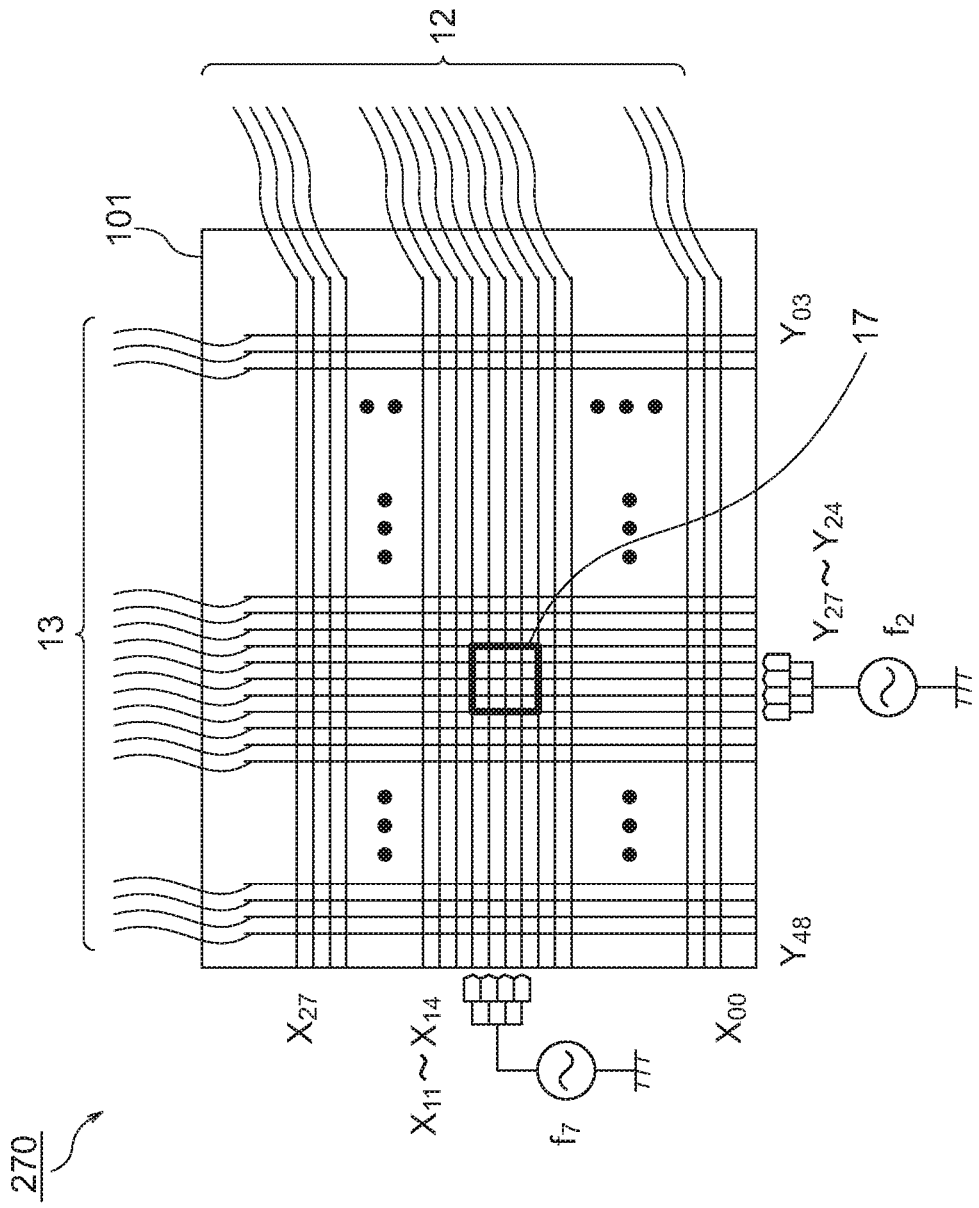
FIG. 15 is an explanatory chart showing the structure of a tactile sense presentation device according to a fifth basic embodiment of the present invention.

FIG. 15 is an explanatory chart showing the structure of a tactile sense presentation device 270 according to the fifth basic embodiment of the present invention. The tactile sense presentation device 270 has completely the same structure as that of the tactile sense presentation device 260 described above as the fourth basic embodiment. Only the voltage signals applied to the X-electrodes 12 and the Y-electrodes 13 are different.

That is, in the tactile sense presentation device 270, the supporting substrate 11, the X-electrodes 12, and the Y-electrodes 13 are the same as those of the first basic embodiment. Further, the X-electrode driving circuit 264, the Y-electrode driving circuit 265, and the control unit 266 are same as those of the fourth basic embodiment. The tactile sense presentation device 270 according to this embodiment shows another setting examples regarding the voltage signals applied to the X-electrodes 12 and the Y-electrodes 13 of the tactile sense presentation device 260 according to the fourth basic embodiment described above.

Figure 16A:
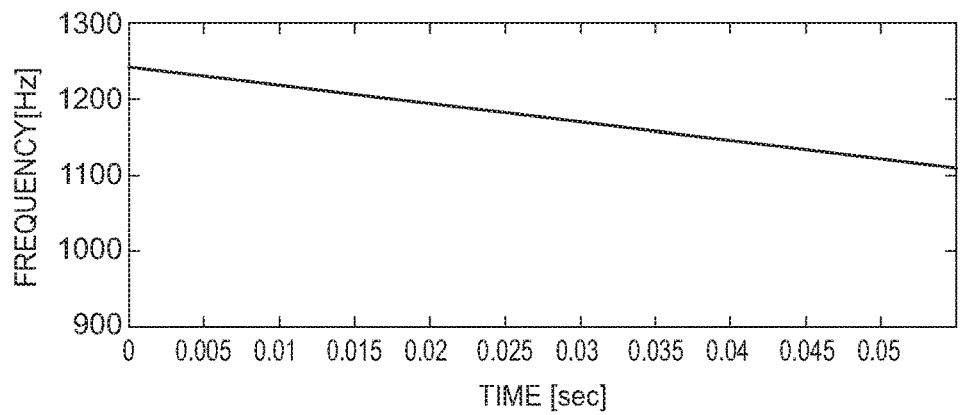
Figure 16B:
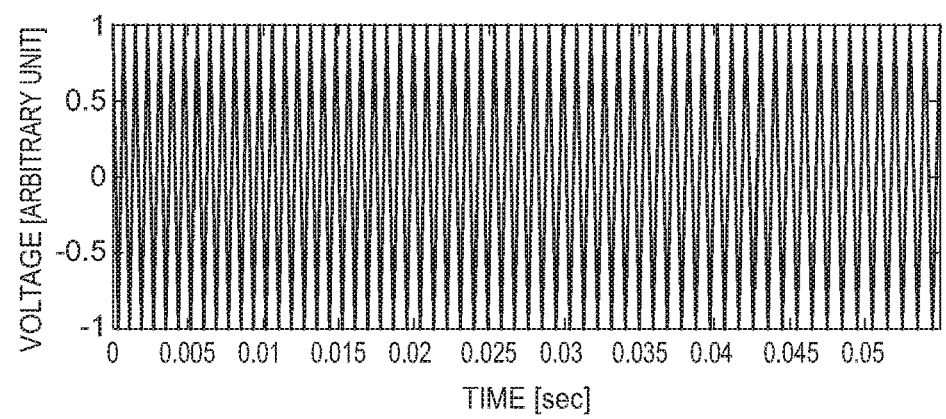
Figure 16C:
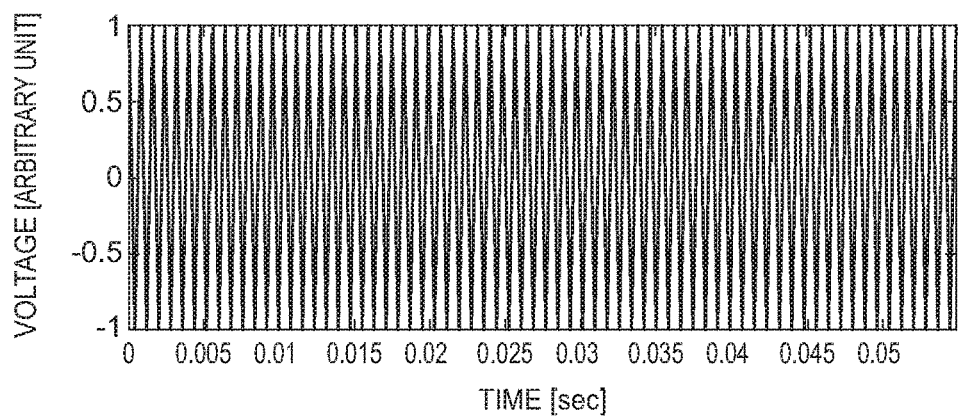

FIGS. 16A to 16C are explanatory charts showing voltage signals generated by the X-electrode driving circuit 264 and the Y-electrode driving circuit 265 in the tactile sense presentation device 270 shown in FIG. 15. The target region 17 to which a sense of texture is to be presented is a range of $X_{11}$ to $X_{14}$ for the X-electrodes 12 and a range of $Y_{24}$ to $Y_{27}$ for the Y-electrodes 13. The control unit 266 supplies control signals to the X-electrode driving circuit 264 and the Y-electrode driving circuit 265 based on the information regarding the target region 17 supplied from outside.

The X-electrode driving circuit 264 upon receiving the control signals applies a voltage signal of the frequency $f_7$ to the X-electrodes that overlap with the target region 17 among a plurality of X-electrodes 12 on a plan view and the Y-electrode driving circuit 265 applies a voltage signal of the frequency $f_2$ to the Y-electrodes that overlap with the target region 17 among a plurality of Y-electrodes 13 on a plan view.

FIG. 16A shows the frequency $f_7$ of the voltage signal generated by the X-electrode driving circuit 264 and applied to the X-electrodes 12. The frequency $f_7$ continuously changes in accordance with the time. The value thereof can be expressed as $f_7=1240-(120t/0.05)$, where t is the time.

FIG. 16B shows a waveform of the voltage signal generated by the X-electrode driving circuit 264 and applied to the X-electrodes 12. When the waveform is expressed with a numerical expression, the voltage of the voltage signal is $A \cos(2\pi f_7 t)$, where A is the amplitude. That is, regarding the voltage signal, there is no specific change in the voltage value while the frequency $f_7$ changes in accordance with the time.

FIG. 16C shows the frequency $f_2$ of the voltage signal generated by the Y-electrode driving circuit 265 and applied to the Y-electrodes 13. This $f_2$ is the same as the voltage signal generated by the Y-electrode driving circuit 265 according to the fourth basic embodiment shown in FIG. 13C. That is, $f_2=1240$ Hz regardless of the time.

Figure 17:
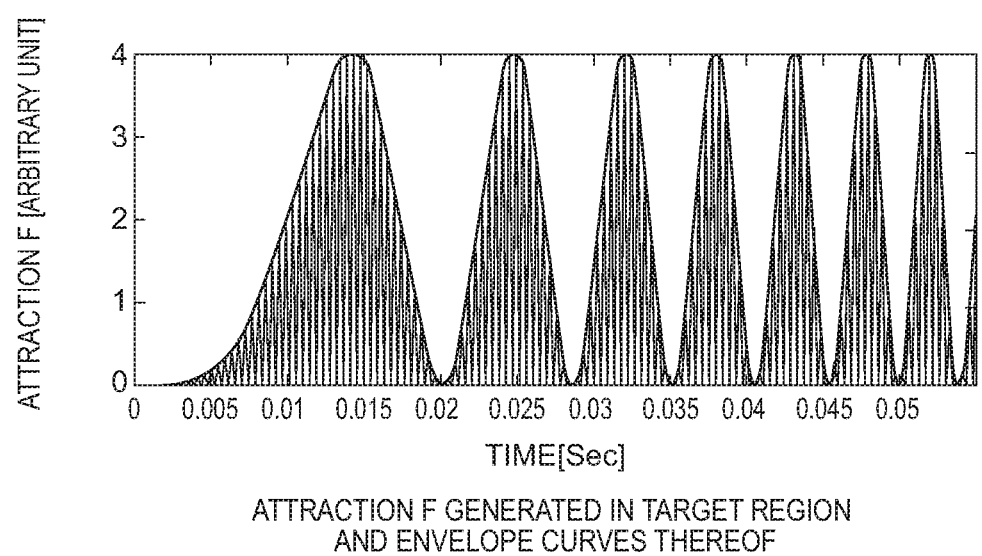
FIG. 17 is an explanatory chart showing the attraction F worked on a finger generated in a target region as a result of applying the voltage signals shown in FIG. 16A to FIG. 16C to the X-electrodes and the Y-electrodes which overlap with the target region in the tactile sense presentation device shown in FIG. 15.

FIG. 17 is an explanatory chart showing the attraction F working on a finger, which is generated in the target region 17 as a result of applying the voltage signals shown in FIGS. 16A to 16C to the X-electrodes 12 and the Y-electrodes 13 which overlap with the target region 17 by the tactile sense presentation device 270 shown in FIG. 15. The attraction F can be acquired by using Expression 3 described above.

FIG. 17 shows the attraction F acquired by a calculation and envelope curves thereof. The frequencies of the envelope curves, i.e., the frequencies of the beat, increase as the passage of the time t. The frequency at the time 0 is 0 Hz, and it is 120 Hz at the time 0.05.

Through continuously changing the frequency $f_7$ of the voltage signal applied to the X-electrodes 12 according to the time t, the attraction of various frequencies can be generated in the target region 17 and various senses of texture can be presented to the user. FIG. 16 shows a case of continuously decreasing the frequency $f_7$ according to the time t. Naturally, however, it is also possible to continuously increase the frequency according to the time t or to alternately repeat continuous decrease and increase. In the meantime, a sense of texture and an unnecessary tactile sense are not to be presented outside the target region 17.

The fact that the voltage signals applied to the X-electrodes 12 and the Y-electrodes 13 are not limited to 1000 Hz and 1240 Hz also with the tactile sense presentation device 270 according to the fifth basic embodiment described above is evident also from the first to third basic embodiments described heretofore. When it is desired to generate various senses of texture, the voltage signals to be applied to the X-electrodes 12 and the Y-electrodes 13 may simply be defined as follows.

$f_7$ and $f_2$ are both 500 Hz or more, $f_7$ may be changed in such a manner that the absolute value of the difference between the both becomes larger than 10 Hz and less than 1000 Hz in a case where a sense of texture is desired to be presented to the target region 17, and $f_7$ may be changed in such a manner that the absolute value of the difference between the both becomes 10 Hz or less or larger than 1000 Hz in a case where a sense of texture is not to be presented to the target region 17.

Further, through setting both $f_7$ and $f_2$ as 500 Hz or more and variously changing $f_7$ in a range with which the absolute value of the difference between the both becomes larger than 10 Hz and less than 1000 Hz, various senses of texture can be presented to the target region 17 and the presented sense of texture can be felt more easily (i.e., it is possible to make it conspicuous).

The features described in the fourth and fifth basic embodiments above can be used in combination with either one of or both of the second and third basic embodiments. Further, when an effective touch input is made on a specific target region, it is also possible to change a sense of texture to show that.

Effects Achieved by Basic Embodiments

The effects acquired by the five basic embodiments of the present invention described above will be summarized. First, with each of the basic embodiments of the present invention, the space for drawing around a plurality of independent wirings for each of the tactile presenting electrodes with the existing techniques becomes unnecessary, so that it is possible to provide a tactile sense presentation device of high spatial resolution.

The reason that the plurality of independent wirings become unnecessary is because the X-electrodes and the Y-electrodes having the function of presenting a tactile sense also function as the drawn wirings. Further, since a sense of texture is presented by using the beat effect between the X-electrodes and the Y-electrodes, a sense of texture is presented only in the region where the voltage signals between the X-electrodes and the Y-electrodes overlap with each other and a sense of texture is not presented only with one of the voltage signals applied to the X-electrodes or the Y-electrodes.

Next, with each of the basic embodiments of the present invention, a plurality of independent drawn wirings provided for each of the tactile sense presenting electrodes with the existing techniques becomes unnecessary. Therefore, it is possible to suppress deterioration in the display quality of the display device when the tactile sense presentation device is used by being superimposed on the display device.

Further, signals for presenting a sense of texture are also applied to the wirings connected towards each of the tactile sense presentation electrodes with the existing techniques, so that originally unnecessary sense of texture is presented to the regions where the wirings are drawn around. Each of the basic embodiments of the present invention makes it possible not to present "originally unnecessary sense of texture" to unrequired regions.

Further, with the second basic embodiment of the present invention, a different tactile sense can be presented only to a desired region while the tactile senses of the background on the tactile sense presenting surface are equivalent. Thus, the tactile sense presenting effect can be increased. The reason thereof is that the voltage signals are applied to the X-electrodes and the Y-electrodes which do not correspond to the target region in such a manner that a sense of texture is not presented and an equivalent sense of friction is presented to the region where it is not intended to present a sense of texture.

Further, with each of the basic embodiments of the present invention, a detailed tactile sense presentation pattern can be presented on the tactile sense presenting surface. The tactile sense presentation device of the present invention is for presenting a sense of texture by changing the friction between the finger and the tactile sense presentation device so that it is not necessary to mechanically oscillate the tactile sense presentation device for presenting a sense of texture. Thus, the use of the present invention makes it possible to clearly show the edges of the region to which a sense of texture is presented.

In other words, the tactile sense presentation device of the present invention exhibits such a feature that blurring of the edges of the region to which a sense of texture is to be presented is extremely small. When the tactile sense presentation device itself is mechanically oscillated, the oscillation is easily transmitted through a solid body. Thus, it is considered to be difficult to present a sense of texture to one point out of neighboring two points and not to present a sense of texture to the other one point.

In the meantime, it is possible with each of the basic embodiments of the present invention to generate the attraction by the beat only in the region where a prescribed X-electrode to which the voltage signal of the frequency $f_1$ is applied and a prescribed Y-electrode to which the voltage signal of the frequency $f_2$ is applied are neighboring to each other, i.e., only in the region where the X-electrode and the Y-electrode in the peripheral part of the intersection part between the prescribed X-electrode and the prescribed Y-electrode are neighboring to each other. Therefore, it is possible to achieve such a feature that a sense of texture is presented to one point out of neighboring two points and a sense of texture is not presented to the other one point.

Due to the combination of the effect of having small blurring and the effect of having high spatial resolution described above, each of the basic embodiments of the present invention can achieve the effect of making it possible to present a detailed tactile sense presentation pattern on the tactile presenting surface. As shown as the third basic embodiment, even when a plurality of target regions are designated, it is possible to present a clear sense of texture to each of those regions.

First Exemplary Embodiment—Supporting Substrate and Electrodes

The structures for more specifically implementing the first to fifth basic embodiments of the present invention described heretofore will be described hereinafter.

In addition to the structures of the first to fifth basic embodiments of the present invention, in a first exemplary embodiment of the present invention, X-electrodes 312 and Y-electrodes 313 are both formed by coupling a plurality of rhombic electrodes in a form like a string of beads via a connection parts, the X-electrodes and the Y-electrodes overlap with each other at the connection parts, and the rhombic parts of the X-electrodes and the Y-electrodes are neighboring to each other on a plan view.

Further, regarding either the X-electrodes or the Y-electrodes, a plurality of electrodes are connected by the connection parts that are formed integrally by identical material as those of a plurality of electrodes. Regarding the other one of the X-electrodes or the Y-electrodes, a bridge electrode is used for electrically connecting the part where a plurality of electrodes are disconnected. Further, a plurality of X-electrodes and a plurality of Y-electrodes are disposed in parallel to each other at a pitch smaller than 5 mm.

Not only making it possible to acquire the same effects as those of the first to fifth basic embodiments, this structure also makes it possible to present a sense of texture more strongly by generating stronger beat between the X-electrodes and the Y-electrodes.

This will be described in more details hereinafter.

Figure 18:
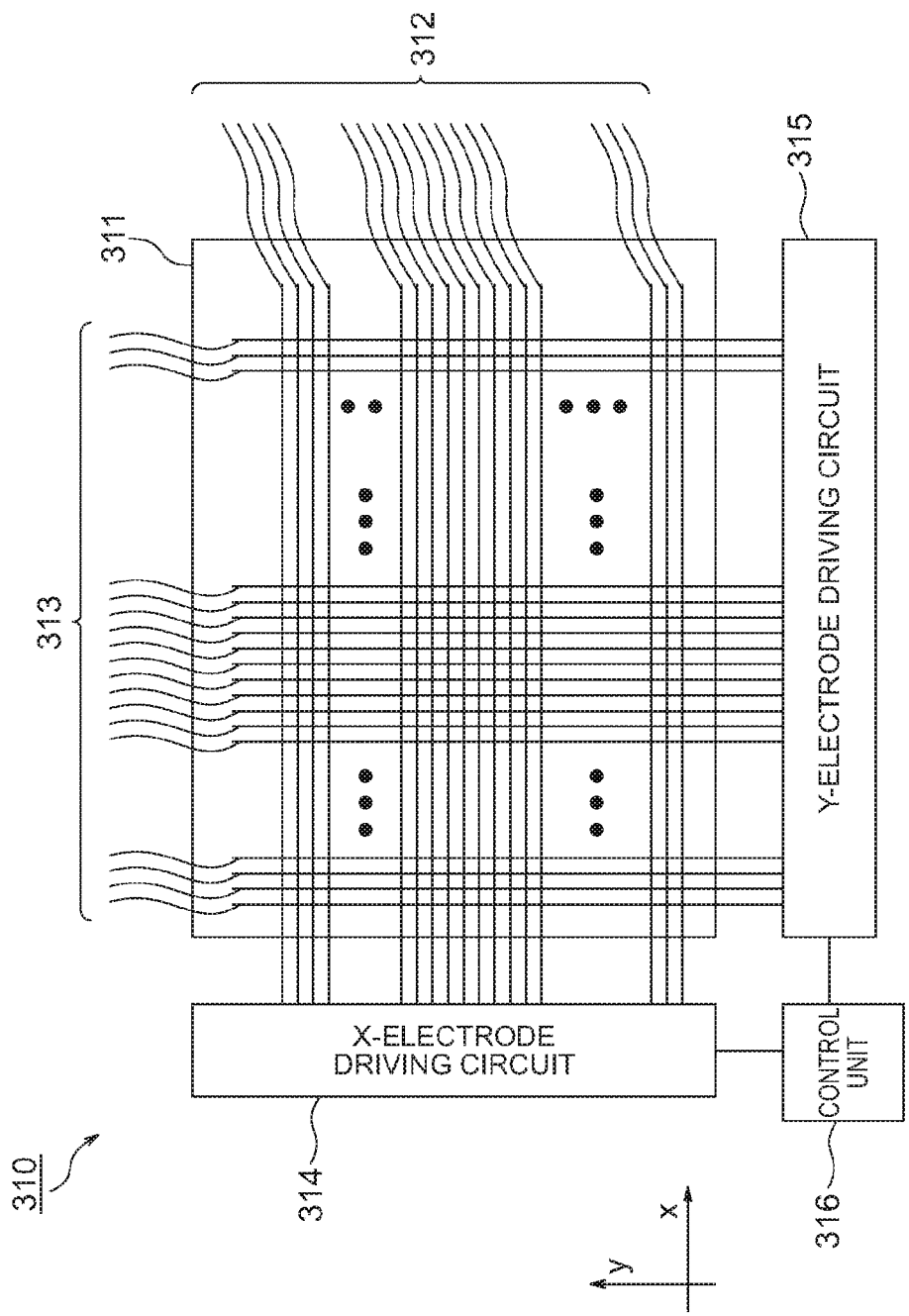
FIG. 18 is an explanatory chart showing the structure of a tactile sense presentation device according to a first exemplary embodiment of the present invention.

FIG. 18 is an explanatory chart showing the structure of a tactile sense presentation device 310 according to the first exemplary embodiment of the present invention. In the tactile sense presentation device 310, a plurality of X-electrodes 312 extended in the x direction on a plan type supporting substrate 311 and a plurality of Y-electrodes 313 extended in the y direction orthogonal to the X-electrodes 312 on the supporting substrate 311 are formed.

The X-electrodes 312 and the Y-electrodes 313 intersect with each other in the intersection parts thereof via an insulating film, and electric insulation between the both is maintained. Further, an insulating film is formed on the X-electrodes 312 and the Y-electrodes 313 for electrically insulating between the X-electrodes 312 and a finger and between the Y-electrodes 313 and a finger when a user touches the display surface of the tactile sense presentation device 310 by the finger from the above.

An X-electrode driving circuit 314 is connected to each of the X-electrodes 312, a Y-electrode driving circuit 315 is connected to each of the Y-electrodes 313, and the X-electrode driving circuit 314 and the Y-electrode driving circuit 315 are connected to a control unit 316. The control unit 316 controls the X-electrode driving circuit 314 and the Y-electrode driving circuit 315 based on the information regarding the region to which a sense of texture is to be presented.

Figure 19:
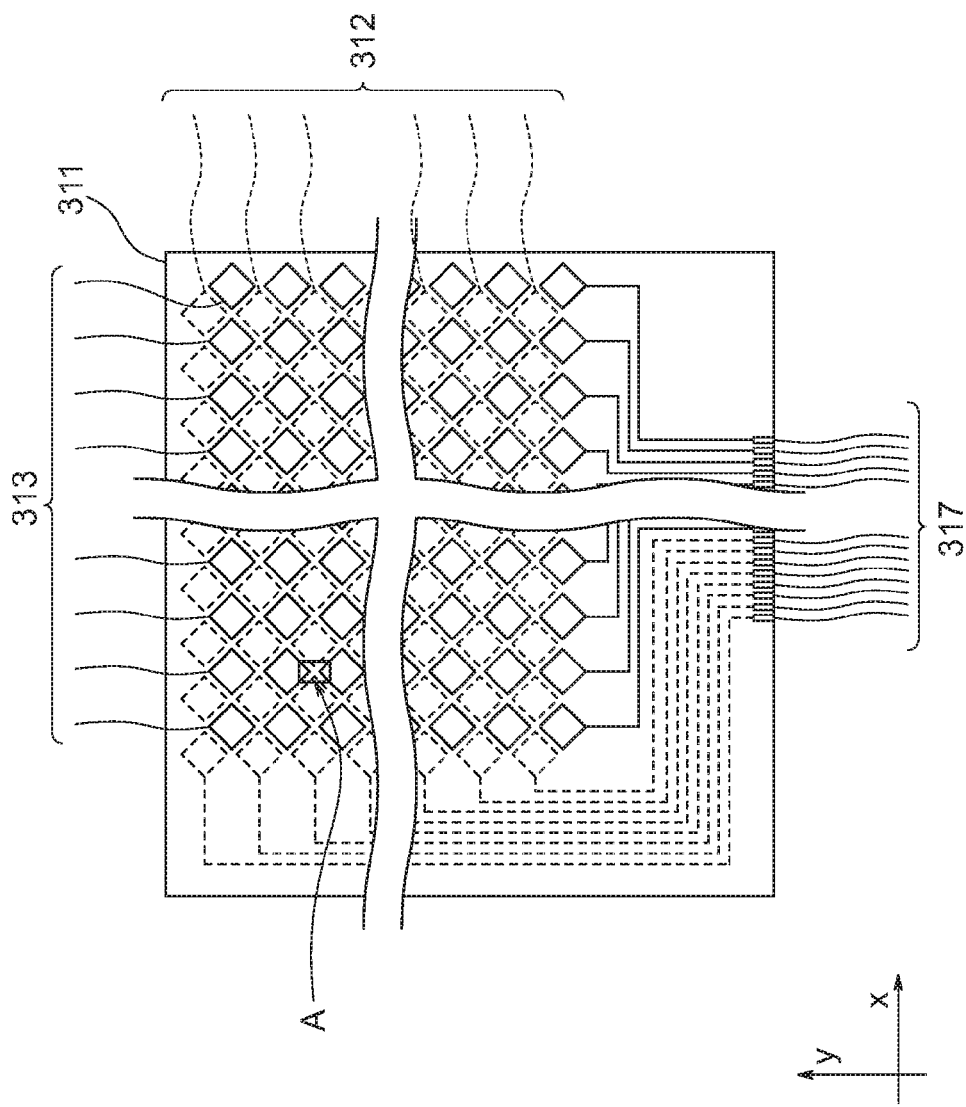
FIG. 19 is a plan view showing specific shapes of a supporting substrate, the X-electrode, and the Y-electrode of the tactile sense presentation device shown in FIG. 18.

FIG. 19 is a plan view showing specific shapes of the supporting substrate 311, the X-electrodes 312, and the Y-electrodes 313 of the tactile sense presentation device 310 shown in FIG. 18. In FIG. 19, the X-electrodes 312 and the wirings thereof are shown with dotted lines, while the Y-electrodes 313 and the wirings thereof are shown with solid lines.

The X-electrodes 312 are formed by coupling a plurality of rhombic electrodes via connection parts in a form like a string of beads. That is, a single X-electrode 312 is formed by electrically connecting rhombic electrodes neighboring to each other on the left and right sides via a connection part, and it is extended in the x direction. The X-electrodes 312 are disposed at a pitch of 2 mm in the y-axis direction. That is, the pitch between the X-electrodes 312 is 2 mm.

Similarly, the Y-electrodes 313 are formed by coupling a plurality of rhombic electrodes via connection parts in a form like a string of beads. That is, a single Y-electrode 313 is formed by electrically connecting rhombic electrodes neighboring to each other on the top and bottom sides via a connection part, and it is extended in the y direction. The Y-electrodes 313 are disposed at a pitch of 2 mm in the x-axis direction. That is, the pitch between the Y-electrodes 313 is 2 mm.

The X-electrodes 312 and the Y-electrodes 313 are formed in such a manner that the connection parts of the rhombic electrodes overlap with each other via the insulating film on a plan view. Further, the main parts of the rhombic parts of the X-electrodes 312 and those of the Y-electrodes 313 are formed not to overlap with each other. That is, the main part of the rhombic part of the X-electrode and that of the Y-electrode are neighboring to each other on a plan view.

Figure 20A:
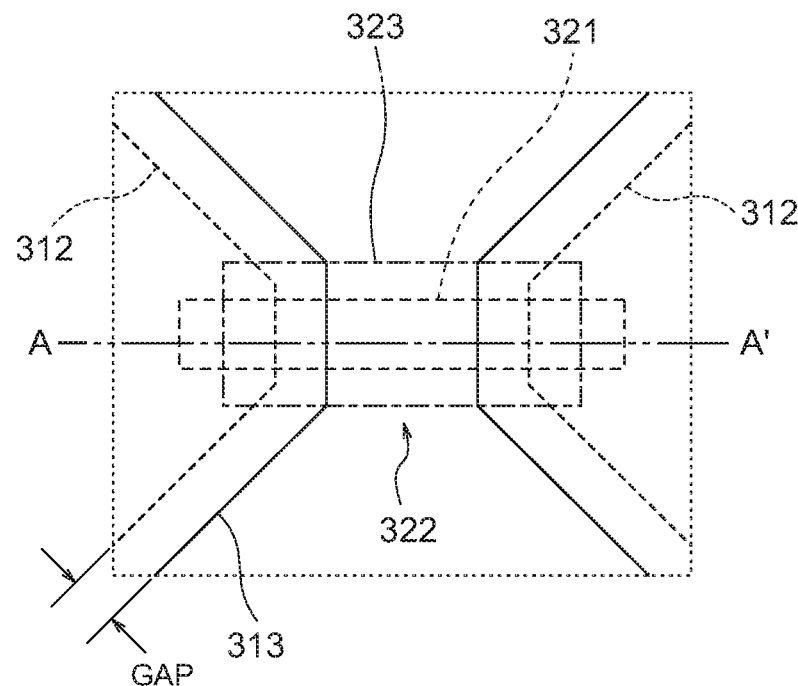
Figure 20B:
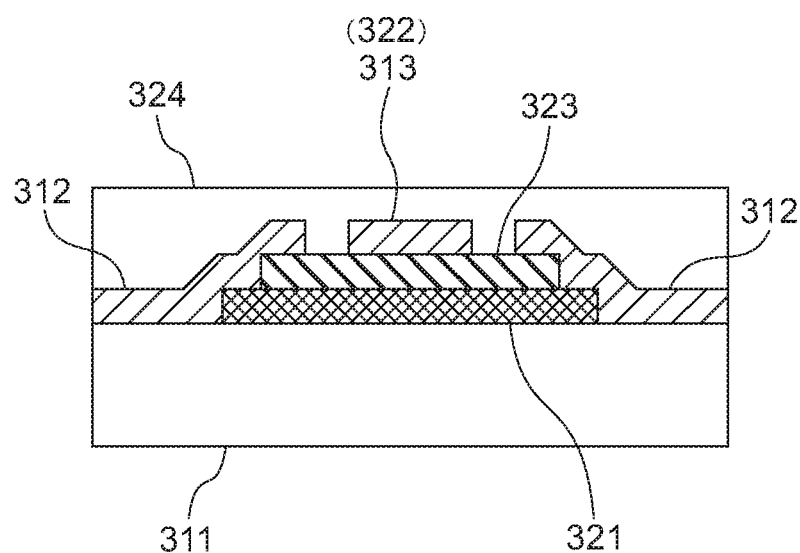

FIGS. 20A and 20B show enlarged explanatory charts of the structures of the connection parts of the X-electrode and the connection parts of the Y-electrode shown in FIG. 19. FIG. 20A is a plan view showing the connection part between the electrodes shown as a block A in FIG. 19, and FIG. 20B is a sectional view taken along a line A-A' of FIG. 20A.

The X-electrodes 312 are formed by mutually connecting rhombic electrodes on a straight line form via a bridge electrode 321. Further, the Y-electrodes 313 are also formed by mutually connecting rhombic electrodes on a straight line form via a connection part 322 that is formed with identical material. The bridge electrode 321 and the connection part 322 are insulated by an insulating film 323.

The sectional view structure of the connection part of the X-electrode 312 and the Y-electrode 313 as well as the manufacturing procedure will be described by referring to FIG. 20B. First, the bridge electrode 321 is formed by a transparent conductive film such as ITO (indium tin oxide) on the supporting substrate 311 that is a glass substrate.

Then, the insulating film 323 is formed with an organic material on the bridge electrode 321. Through forming it with an organic material, the film thickness of the insulating film 323 can be easily formed thick, and an originally unnecessary coupling capacitance formed in the intersection part between the X-electrode 312 and the Y-electrode 313 can be made small. The insulating film 323 is formed to cover the bridge electrode to insulate the connection part of the Y-electrode 313 and the bridge electrode 321 and not to cover the bridge electrode so that the bridge electrode 321 and the rhombic part of the X-electrode 312 come in contact with each other.

Then, the X-electrodes 312, the Y-electrode 313, the connection parts 322, other wirings, and terminals 317 are formed collectively by a transparent conductive film. At last, an insulating film 324 is deposited by an organic material, and a contact hole is formed in the terminals 317.

A plurality of terminals 317 formed in the supporting substrate 311 are connected to the X-electrodes 312 or the Y-electrodes 313 via the wirings. One end of a flexible printed circuit (FPC) is laminated to the terminals 317 via an anisotropic conductive film (ACF), and the other end of FPC is connected to the printed circuit board on which the X-electrode driving circuit 314 and the Y-electrode driving circuit 315 are mounted.

Through the steps described above, the tactile sense presentation device 310 in the structure shown in FIG. 19 and FIG. 20A can be formed.

The present invention provides the tactile sense presentation device which presents a tactile sense by a beat phenomenon generated by applying voltage signals of different frequencies from each other to the X-electrodes and the Y-electrodes. Thus, both of the static electric force between a finger of the user and the X-electrodes and the static electric force between the finger and the Y-electrodes need to work on the finger.

That is, when the X-electrodes 312 and the Y-electrodes 313 overlap with each other on a plan view, the electric field generated in one of the electrodes is shielded in the other electrode. Thus, it is better to suppress the overlap part between the electrodes to be small as much as possible, so that it is desired to form the X-electrodes 312 and the Y-electrodes 313 to be neighboring to each other and to narrow the space between the neighboring electrodes as much as possible.

The shape shown in FIG. 19 is an example of the shapes that can satisfy such condition. Through forming the X-electrodes 312 and the Y-electrodes 313 in such form, it is possible to reduce the overlapping part between the electrodes and to narrow the gap between the neighboring electrodes for presenting a tactile sense by allowing the static electric force to work on the finger efficiently.

The inventors of the present invention have verified by experiments that a tactile sense can be presented to the thenar but cannot be presented to the fingertip when the pitch of the electrodes is larger than 5 mm. The pitch of the X-electrodes 312 is set as 2 mm and the pitch of the Y-electrodes 313 is set as 2 mm in the exemplary embodiment, so that a tactile sense can be presented to the fingertip.

Further, the area of the part where the X-electrode 312 and the Y-electrode 313 overlap with each other is small, so that the load capacity when an alternate current voltage signal is applied to each electrode is small. Thus, it is possible to increase the scale of the tactile sense presentation device and to improve the spatial resolution of the tactile sense presentation device, so that induction of unnecessary voltages that may be caused by the capacitance coupling of the electrodes can be suppressed.

Further, in the shape shown in FIG. 19, a plurality of rhombic electrodes are provided over the supporting substrate. Thus, when an originally unnecessary pattern generated due to the shape of the electrodes is recognized by human beings, the boundary parts between the rhombic part of the X-electrodes 312 and the rhombic part of the Y-electrodes 313 is recognized as "oblique straight lines" over the entire surface of the tactile sense presentation device 310. In this regards, in the exemplary embodiment, the gap between the electrodes shown in FIG. 20A is set as about several μm to several tens of μm, so that there is almost no possibility that the boundary part is recognized by human beings. That is, the exemplary embodiment also can provide an effect of suppressing deterioration of the display quality of the display device even when the tactile sense presentation device 310 is used by being superimposed on the display device.

First Exemplary Embodiment—Other Structures of Electrodes

Note here that the structures of the X-electrodes 312 and the Y-electrodes 313 are not limited to those described in FIGS. 19 and 20. Hereinafter, other structures of the electrodes will be described.

For example, a following structure can be considered. That is, the X-electrodes are formed on a first supporting substrate by connecting rhombic electrodes via a connection part that is formed integrally with identical material as that of the rhombic electrodes. Similarly, the Y-electrodes are formed on a second supporting substrate by connecting rhombic electrodes via a connection part that is formed integrally with identical material as that of the rhombic electrodes. Then, the first supporting substrate and the second supporting substrate are laminated by using an optical adhesive agent, an optical adhesive sheet, or the like to form the tactile sense presentation device 310.

In that case, the surface on which the electrodes are formed may be laminated with each other by an optical adhesive agent or the like or the surfaces where the electrodes are not formed may be laminated with each other. Also, the surfaces where the electrodes are formed and the surfaces where the electrodes are not formed may be laminated with each other. In any of those structures, the X-electrodes and the Y-electrodes intersect with each other via the insulating film. In the case where surface on which the electrodes are formed are laminated with each other, an adhesive agent layer such as the optical adhesive agent or an organic film or an inorganic film formed on the electrodes after each of the electrodes are formed can be used as the insulating film. In the case where the surfaces where the electrodes are not formed are laminated with each other, the supporting substrate can be used as the insulating film.

First Exemplary Embodiment—X-Electrode/Y-Electrode Driving Circuit

Figure 21:
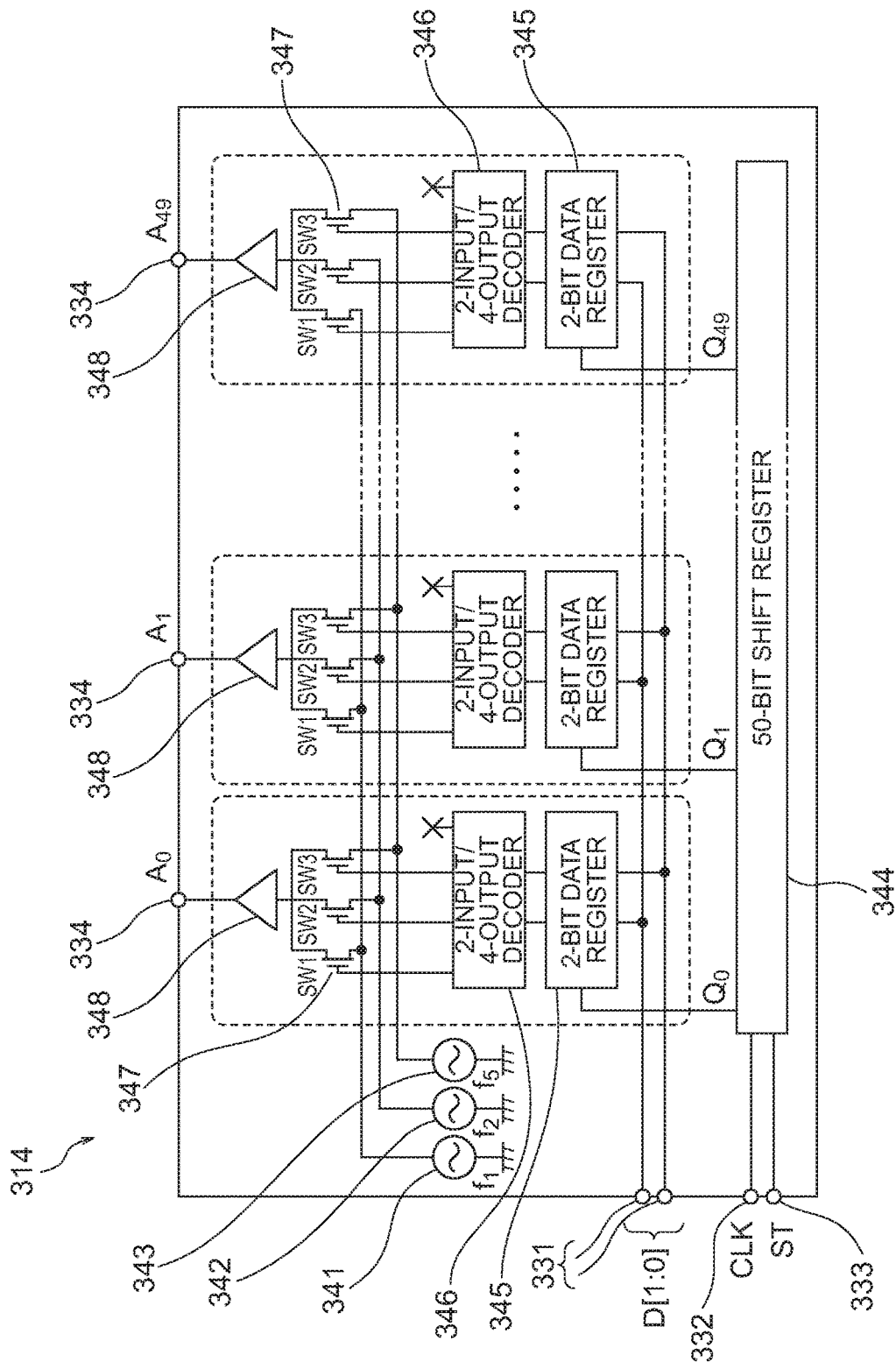
FIG. 21 is an explanatory chart showing a more detailed structure of an X-electrode driving circuit (a Y-electrode driving circuit) of the tactile sense presentation device shown in FIG. 18.

FIG. 21 is an explanatory chart showing a more detailed structure of the X-electrode driving circuit 314 of the tactile sense presentation device 310 shown in FIG. 18. The Y-electrode driving circuit 315 also has the same structure as that of the X-electrode driving circuit 314, so that only the structure of the X-electrode driving circuit 314 will be described herein.

The X-electrode driving circuit 314 includes a data input terminal 331, a clock input terminal 332, and a start pulse input terminal 333 as input terminals. Those input terminals are connected to the control unit 316, and receive control signals generated by the control unit 316.

As output terminals, the X-electrode driving circuit 314 includes a plurality of output terminals 334 which output voltage signals applied to the X-electrodes 312. In a case shown in FIG. 21, there are fifty output terminals 334, and those are referred to as $A_0$ to $A_{49}$, respectively.

Further, in addition to those input/output terminals, the X-electrode driving circuit 314 includes: an alternate current voltage generating unit 341 which generates an alternate current voltage of the frequency $f_1$; an alternate current voltage generating unit 342 which generates an alternate current voltage of the frequency $f_2$; and an alternate current voltage generating unit 343 which generates an alternate current voltage of the frequency $f_5$. The frequencies $f_1$, $f_2$, and $f_5$ are 1000 Hz, 1240 Hz, and 3000 Hz, respectively.

Further, the X-electrode driving circuit 314 includes a 50-bit shift register 344. The shift register 344 has fifty output terminals ($Q_0$ to $Q_{49}$), and each of those outputs is connected to a 2-bit data register 345. Each of the 2-bit data registers 345 is connected to the data input terminal 331 via a bus.

The output signals from each of the 2-bit data registers 345 are connected to a 2-input/4-output decoder 346. The 2-input/4-output decoder 346 takes the inputted 2-bit signal as an input, and outputs a high-level voltage signal to one of the four output terminals according to the inputted signal. There is one-on-one relation between the inputted 2-bit signal and the output terminal to which the high-level signal is outputted.

One of the output terminals from the 2-input/4-output decoder 346 is not used in the exemplary embodiment, and a gate electrode of a switch transistor 347 is connected to each of the remaining three output terminals. The switch transistors 347 connected to each of the three output terminals are referred to as SW1 to SW3.

The terminals on the output side of the switch transistors 347 are connected in common and connected as inputs of an amplifier 348. The terminals on the input side of SW1 to SW3 of the switch transistors 347 are connected to the output terminals of each of the alternate current voltage generating units 341 to 343. That is, alternate current voltages of each of the frequencies $f_1$, $f_2$, and $f_5$ are inputted to the terminals on the input sides of each of SW1 to SW3. The 2-input/4-output decoder 346 executes a function of selectively switching the alternate current voltage outputted to the amplifier 348 among those frequencies according to the output from the 2-bit data register 345.

Then, the alternate current voltage amplified by the amplifier 348 is outputted to each of the X-electrodes 312 from the output terminals 334 described above. That is, the X-electrode driving circuit 314 functions as a circuit which selects the alternate current voltage signal of the frequency $f_1$, $f_2$, or $f_5$ and outputs to the X-electrodes via the output terminals 334 according to the signal inputted via the data input terminal 331 from the control unit 316.

Figure 22:
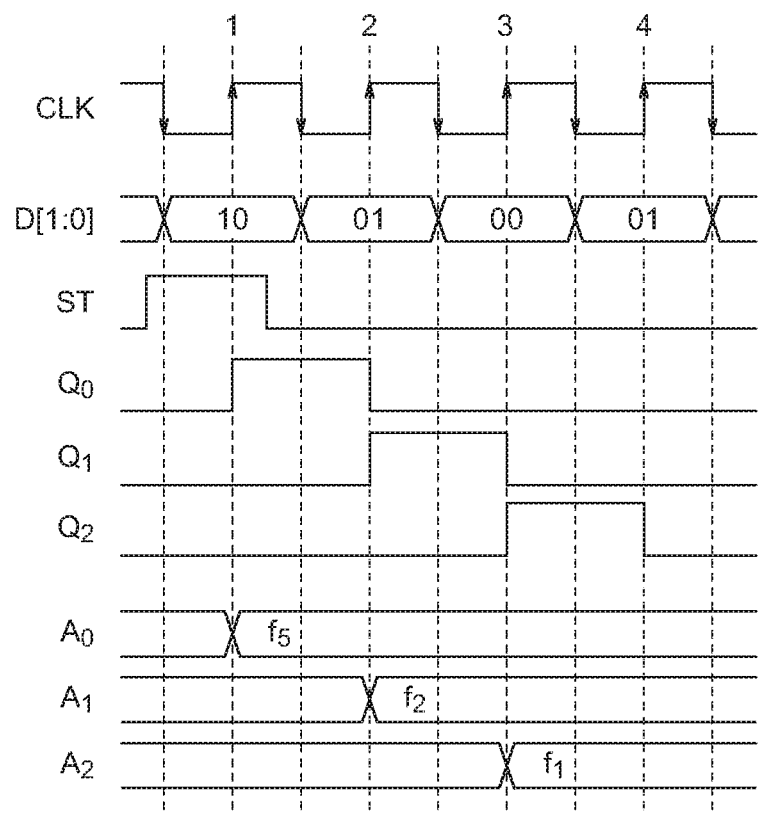
FIG. 22 is a time chart showing operations of the X-electrode driving circuit shown in FIG. 21.

FIG. 22 is a time chart showing actions of the X-electrode driving circuit 314 shown in FIG. 21. "CLK" is a clock waveform voltage inputted from the control unit 316 via the clock input terminal 332. "D[1:0]" is a 2-bit data signal inputted from the control unit 316 via the data input terminal 331. "ST" is a start pulse waveform voltage inputted from the control unit 316 via the start pulse input terminals 333.

"D[1:0]" inputted from the control unit 316 via the data input terminal 331 is expressed with a binary number, so that it can take four kinds of values "00", "01", "10", and "11".

The structure and the actions of the shift register 344 are widely known in general, so that detailed explanations are omitted. The shift register 344 latches the value of ST for every rise edge of CLK, and outputs it to the output terminal $Q_0$ of the shift register. The value of the output terminal $Q_0$ is outputted to $Q_1$ with a delay of one period of CLK. The value of the output terminal $Q_1$ is outputted to $Q_2$ with a delay of one period of CLK. In this manner, the shift register 344 outputs the pulse waveform voltage synchronized with the rise edge of CLK in order to the output terminals $Q_0$ to $Q_{49}$.

When the pulse waveform voltage is outputted to the output terminal of the shift register 344, the register value of the 2-bit register 345 is updated to the value of the data D[1:0] of that time by synchronizing with the rise edge, and outputted to the output terminal of the 2-bit data register 345.

Upon receiving the signal outputted to the terminal of the 2-bit data register 345, the 2-input/4-output decoder 346 turns on one of the switch transistor 347 out of SW1 to SW3. Accordingly, the alternate current voltage signal of the frequency $f_1$, $f_2$, or $f_5$ is outputted to the output terminal 334.

The X-electrode driving circuit 314 corresponds the frequency $f_1$ to the data D[1:0]=00, the frequency $f_2$ to the data D[1:0]=01, and the frequency $f_5$ to the data D[1:0]=10. Thus, the voltage signal whose frequency is $f_5$ is outputted to $A_0$ of the output terminal 334 at the time 1 shown in FIG. 22, the voltage signal whose frequency is $f_2$ is outputted to $A_1$ of the output terminal 334 at the time 2, and the voltage signal whose frequency is $f_1$ is outputted to $A_2$ of the output terminal 334 at the time 3. The amplitude of each of the voltage signals is 70 V. Note here that D[1:0]=11 is not used herein.

The frequency of the voltage signal outputted to the output terminal 334 does not change until the pulse waveform voltage is inputted next to the start pulse input terminal 333 and the register value of the 2-bit data register 345 is updated.

FIG. 22 shows $Q_0$ to $Q_2$ out of the output waveforms of fifty output terminals $Q_0$ to $Q_{49}$ of the shift register 344, and other output waveforms are not shown. Similarly, regarding the voltage signals, $A_0$ to $A_2$ out of the fifty output terminals 344 $A_0$ to $A_{49}$ of the X-electrode driving circuit 314, and other voltage signals are not shown.

The tactile sense presentation device 310 is constituted by forming twenty-eight X-electrodes 312 and forty-six Y-electrodes 313 on the supporting substrate 311. Regarding the X-electrode driving circuit 314, twenty-eight output terminals $A_0$ to $A_{27}$ out of the fifty output terminals 334 shown in FIG. 21 are connected electrically to each of the X-electrodes 312. Regarding the Y-electrode driving circuit 315, forty-six output terminals $A_0$ to $A_{45}$ out of the fifty output terminals 334 shown in FIG. 21 are connected electrically to each of the Y-electrodes 313.

The control unit 316 is constituted with a logic circuit, and outputs the control signal shown in FIG. 22 to the X-electrode driving circuit 314 and the Y-electrode driving circuit 315. This action can be achieved by a known technique, so that the detailed structure of the control unit 316 is not specifically described and it is not included in a scope of the appended claims of the present invention.

The X-electrode driving circuit 314 (the Y-electrode driving circuit 315) shown in FIG. 21 is intended to be used in the second basic embodiment described above. However, those can be also used in the first basic embodiment when the alternate current voltage generating unit 343 of the frequency $f_5$ is omitted. Further, by employing a structure in which four switch transistors are provided to one output terminal and one out of the four frequencies $f_1$ to $f_4$ is selected and outputted according to the value of D[1:0], those can be used also with the third basic embodiment.

With the first exemplary embodiment described above, it is possible to achieve an effect of presenting a sense of texture more strongly in addition to the effect acquired by each of the above-described basic embodiments.

The reason thereof is that more regions where a beat phenomenon occurs strongly are provided by employing the form in which: on a plan view, the X-electrodes are formed by coupling a plurality of rhombic electrodes in a form like a string of beads via a connection parts; the Y-electrodes are formed by coupling a plurality of rhombic electrodes in a form like a string of beads via a connection parts; the X-electrodes and the Y-electrodes overlap with each other at the connection parts; and the main parts of the rhombic parts of the X-electrodes and the Y-electrodes are neighboring to each other.

Further, it is also because the pitch between the X-electrodes and between the Y-electrodes is set to be smaller than 5 mm so as to efficiently stimulate Pacinian corpuscle that is one of the skin mechanoreceptors of human beings.

Further, it is also because such structure that makes it possible to satisfy conflicting demands for reducing the parasitic capacitance of the electrodes and reducing the gap between the X-electrodes and the Y-electrodes and to give a strong stimulation to the skin mechanoreceptor is achieved by forming the X-electrodes constituted by coupling a plurality of rhombic electrodes in a form like a string of beads via the connection parts and the Y-electrodes constituted by coupling a plurality of rhombic electrodes in a form like a string of beads via the connection points to have the equivalent pitches between the rhombic parts on the substrate.

As described above, the present invention is designed as the structure in which: each of the voltage signals of the first and second frequencies is applied to the X-electrodes and the Y-electrodes insulated from each other; and electric beat oscillation is generated in the target region by an absolute value of the difference between the first and second frequencies. Therefore, physical beat oscillation can be given to the finger of the user effectively, and the beat oscillation is not given to a part that is irrelevant to the target region.

As an exemplary advantage according to the invention, this makes it possible to provide the tactile sense presentation device, the electronic apparatus, and the tactile sense presentation method, which exhibit an excellent characteristic of making it possible to execute operations only by a tactile sense without looking at the hands by effectively presenting a tactile sense (a sense of texture) on the touch panel.

Second Exemplary Embodiment—Supporting Substrate and Electrodes

In addition to the structures of the first to fifth basic embodiments of the present invention, a second exemplary embodiment of the present invention is designed is such a manner that, on a plan view: the X-electrodes and the Y-electrodes are both formed by coupling a plurality of specific shape electrodes in a form like a string of beads via connection parts, the X-electrodes and the Y-electrodes overlap with each other in the connection parts, and the specific shape parts of the X-electrodes and the Y-electrodes are neighboring to each other; and the specific shape part of the X-electrodes, or, the Y-electrodes intersects with a first straight line which connects a first intersection part and a second intersection part among the intersection parts of arbitrary X-electrodes and arbitrary Y-electrodes described above and is not in parallel to the first and second directions or a second straight line which connects the first intersection part and a third intersection part among the arbitrary X-electrodes and the arbitrary Y-electrodes and is not in parallel to the first and second directions.

Not only making it possible to acquire the same effects as those of the first to fifth basic embodiments, this structure also makes it possible to present a sense of texture more strongly by transmitting still stronger beat generated between the X-electrodes and the Y-electrodes to the finger of the user.

This will be described in more details hereinafter.

Figure 23:
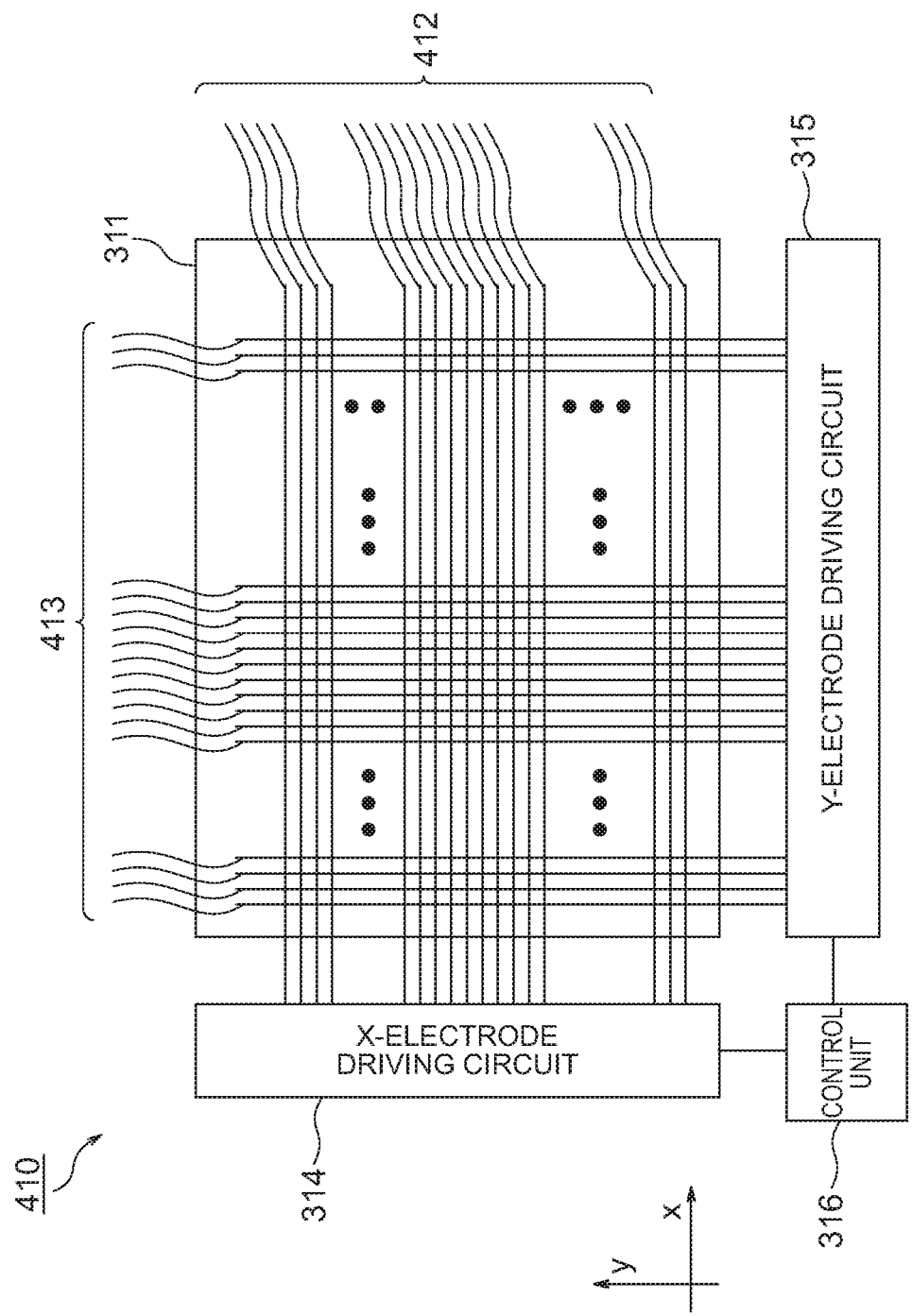
FIG. 23 is an explanatory chart showing the structure of a tactile sense presentation device according to a second exemplary embodiment of the preset invention.

FIG. 23 is an explanatory chart showing the structure of a tactile sense presentation device 410 according to the second exemplary embodiment of the present invention. In the tactile sense presentation device 410, a plurality of X-electrodes 412 extended in the x direction on a planar type supporting substrate 311 same as that of the first exemplary embodiment and a plurality of Y-electrodes 413 extended in the y direction orthogonal to the X-electrodes 412 on the supporting substrate 311 are formed.

The X-electrodes 412 and the Y-electrodes 413 intersect with each other in the intersection parts thereof via an insulating film, and electric insulation between the both is maintained. Further, an insulating film is formed on the X-electrodes 412 and the Y-electrodes 413 for electrically insulating between the X-electrodes 412 and a finger and between the Y-electrodes 413 and a finger when a user touches the display surface of the tactile sense presentation device 410 by the finger from the above.

An X-electrode driving circuit 314 same as that of the first exemplary embodiment is connected to each of the X-electrodes 412, and a Y-electrode driving circuit 315 same as that of the first exemplary embodiment is connected to each of the Y-electrodes 313. The X-electrode driving circuit 314 and the Y-electrode driving circuit 315 are connected to a control unit 316 same as that of the first exemplary embodiment. Explanations of the X-electrode driving circuit 314, the Y-electrode driving circuit 315, and the control unit 316 are omitted herein.

Figure 24:
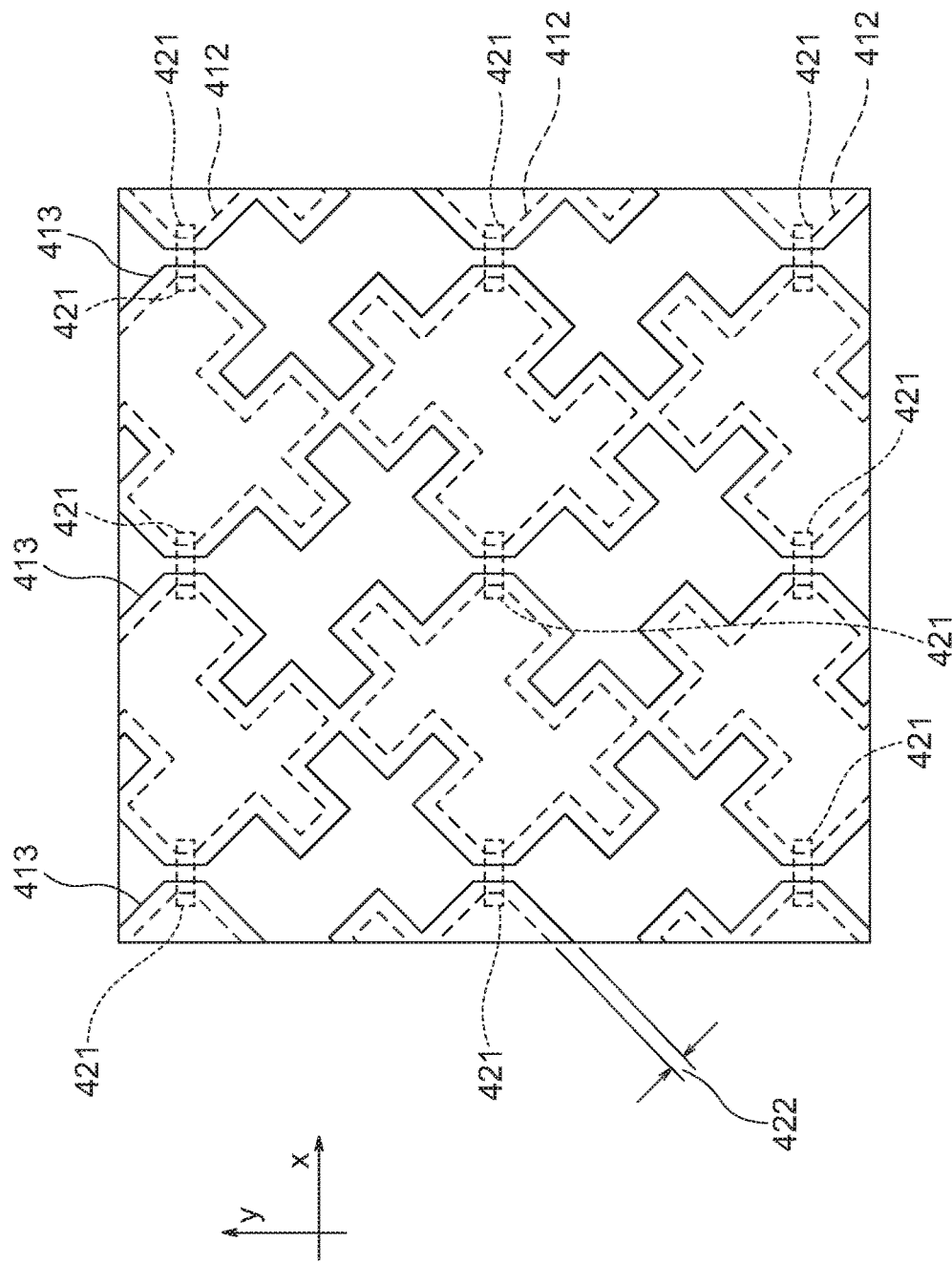
FIG. 24 is a plan view showing specific shapes of the X-electrode and the Y-electrode shown in FIG. 23.

FIG. 24 is a plan view showing specific shapes of the X-electrode driving circuit 412 and the Y-electrode driving circuit 413 shown in FIG. 23. In FIG. 24, the X-electrodes 412 are shown with dotted lines, and the Y-electrodes 413 are shown with solid lines, respectively.

The X-electrodes 412 are formed by coupling a plurality of prescribed shape electrodes via connection parts which are the bridge electrodes 421 in a form like a string of beads. The Y-electrodes 413 are formed by coupling a plurality of prescribed shape electrodes in a form like a string of beads via connection parts formed integrally by identical material as that of the Y-electrodes.

"Prescribed shape" herein is a shape in which the boundary part between the rhombic part of the X-electrode 412 and the rhombic part of the Y-electrode 413 neighboring to each other is changed to enter the inside of one of the rhombic shapes while taking the rhombic shape of the first exemplary embodiment described above as the base. The boundary part herein can also be referred to as a gap 422 with a prescribed width.

In the first exemplary embodiment, the boundary part between the rhombic electrode contained in the X-electrode 312 and the rhombic electrode contained in the Y-electrode 313 can be considered to exist at a position on a straight line that connects the intersection parts of the neighboring X-electrodes and Y-electrodes in a direction different from both the X direction and the Y direction, i.e., at a position on a straight line that connects neighboring intersection parts almost obliquely at 45-degree direction or −45-degree direction. Meanwhile, it is the feature of the second exemplary embodiment that the boundary part between the X-electrodes 412 and the Y-electrodes 413 is away from the position on the straight line in the obliquely 45-degree direction or −45-degree direction.

The tactile sense presentation device according to the present invention presents a tactile sense by a beat phenomenon generated by the voltage signal applied to the X-electrodes and the voltage signal applied to the Y-electrodes. Thus, the beat phenomenon appears strongly in the boundary parts between the X-electrodes and the Y-electrodes, so that it is desired to have many boundary parts in the region where the human body such as a fingertip and the tactile sense presentation device come in contact. That is, it is desirable to have long boundary lines for making it possible to present a stronger tactile sense.

Therefore, the second exemplary embodiment in which the boundary part between the rhombic part of the X-electrode 412 and the rhombic part of the Y-electrode 413 neighboring to each other enters inside of one of the rhombic parts exhibits such an effect that a stronger tactile sense can be presented compared to the case of the first exemplary embodiment.

Further, regarding the electrode shapes of the exemplary embodiment, the boundary part entered inside one of the rhombic parts does not exist on the straight line connecting between the neighboring connection parts of the X-electrodes 412 and the straight line connecting between the neighboring connection parts of the Y-electrodes 413. Since the electrodes are in such shape, it is possible to suppress increase in the resistance value between both ends of the X-electrodes and the resistance value between both ends of the Y-electrodes even in the case where the boundary part between the rhombic part of the X-electrode 12 and the rhombic part of the Y-electrode 413 neighboring to each other is formed to enter the inside of one of the rhombic parts.

Thereby, it is possible to suppress increase each time constant of the X-electrodes 412 and the Y-electrodes 413. This makes it possible to increase the dimension of the display surface of the tactile sense presentation device and to use voltage signals of still higher frequencies.

Figure 25:
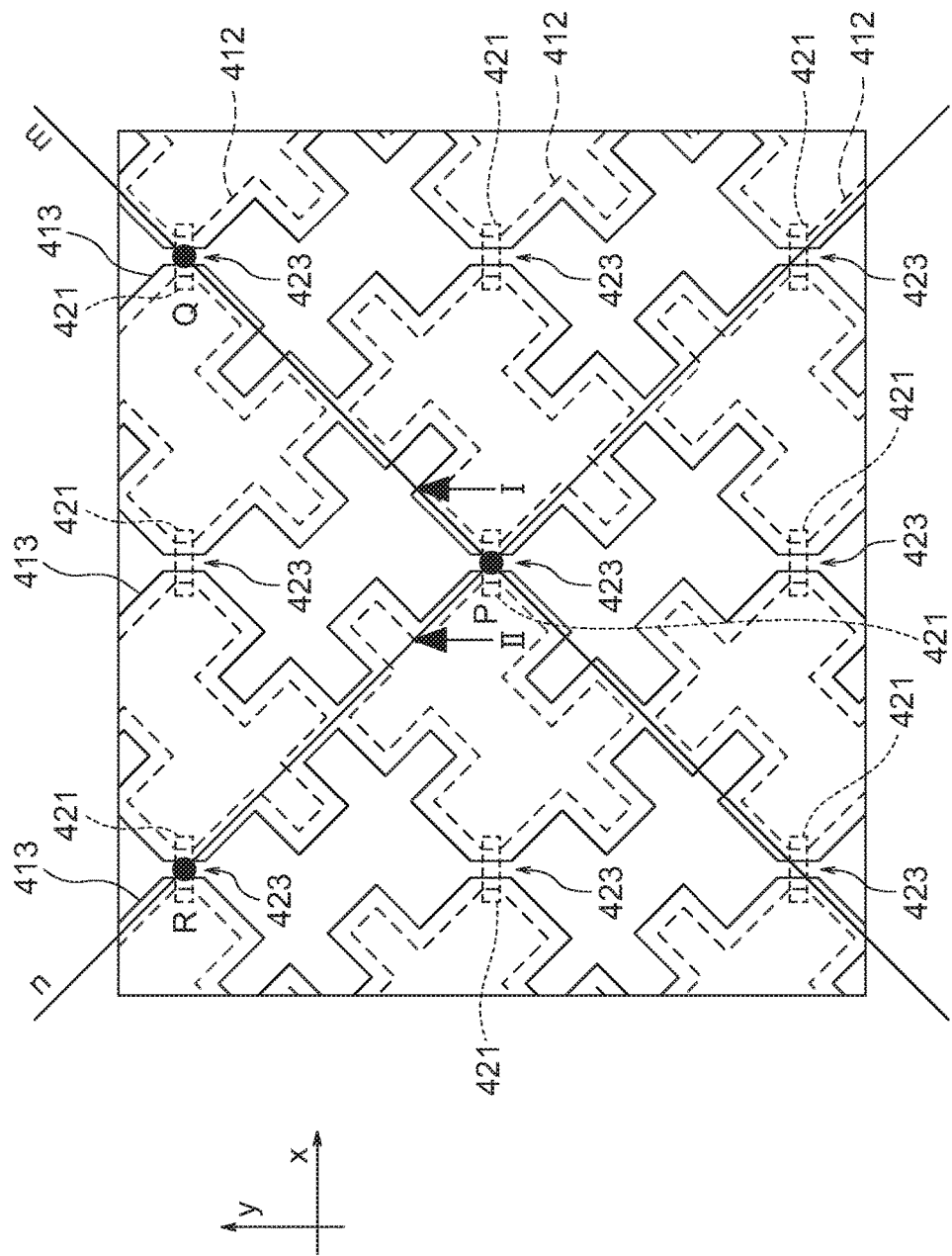
FIG. 25 is a plan view showing specific shapes of the X-electrode and the Y-electrode shown in FIG. 23 from a different point of view with respect to that of FIG. 24.

FIG. 25 is a plan view showing the specific shapes of the X-electrode 412 and the Y-electrode 413 shown in FIG. 23 in a different viewpoint from that of FIG. 24. In FIG. 25, the X-electrode 412 is shown with dotted lines and the Y-electrode 413 is shown with solid lines as in the case of FIG. 24.

The X-electrode 412 is formed by coupling a plurality of polygonal electrodes having twenty vertexes in a form like a string of beads via connection parts. There is one vertex in a part where the polygon comes in contact with the connection part, and the polygons are coupled via a bridge electrode 421. The Y-electrode 413 is formed by coupling a plurality of polygonal electrodes having twenty vertexes in a form like a string of beads via connection parts 423. The connection part 423 is formed integrally by identical material as that of the polygonal electrodes of the Y-electrodes 413.

The intersection part between the X-electrode 412 and the Y-electrode 413 is a logical product part of the figures of the bridge electrode 421 and the connection part 423. Nine pieces of such intersection parts are included in FIG. 25. Among those, the intersection part in the center of the drawing is shown as P. In the periphery of the intersection part P, there are eight intersection parts neighboring to P.

Considering straight lines passing through the intersection part P and one intersection part among the eight intersection parts neighboring to the intersection part P, there are two straight lines that are not in parallel to a first direction (x direction of an orthogonal coordinate system shown in the drawing) and in a second direction (y direction). Those are shown as straight lines m and n in FIG. 25. The straight line m passes through the intersection part P and the intersection part Q that is neighboring to the intersection part P in 45-degree direction from the intersection part P. The straight line n passes through the intersection part P and the intersection part Q that is neighboring to the intersection part P in 135-degree direction from the intersection part P.

At this time, the main part of the polygon of the X-electrode 412 or the main part of the polygon of the Y-electrode 413 intersects with the straight line m or the straight line n. For example, when moving towards the intersection part Q from the intersection part P on the straight line m, the main part of the polygon electrode constituting the Y-electrode 413 intersects with the straight line m. An arrow and a symbol I are shown in that part. Further, when moving towards the intersection part R from the intersection part P on the straight line n, the main part of the polygon electrode constituting the X-electrode 412 intersects with the straight line n. An arrow and a symbol II are shown in that part.

As described, it is the feature of this exemplary embodiment that the main part of the polygonal electrode constituting the X-electrode 412 or the main part of the polygonal electrode constituting the Y-electrode 413 intersects with the straight line m or the straight line n. With such feature, the boundary line between the X-electrodes 412 and the Y-electrodes 413 can be formed longer than the case of the first exemplary embodiment, so that a stronger tactile sense can be presented.

With the second exemplary embodiment described above, it is possible to achieve an effect of presenting a sense of texture more strongly in addition to the effect acquired by the first exemplary embodiment described above.

The reason is that, on a plan view, the exemplary embodiment employs the electrode shape in which the prescribed shape main part of the X-electrode or the Y-electrode intersects with the straight line m or the straight line n provided that the intersection part between an arbitrary X-electrode and an arbitrary Y-electrode in the center of the tactile sense presentation device is P, and the straight lines that are not in parallel to the first direction and the second direction among the straight lines passing through one of the intersections out of the intersection part P and the eight intersection parts neighboring to the intersection part P are the straight lines m and n.

This makes it possible to extend the boundary lines between the X-electrodes and the Y-electrodes longer and to stimulate more Pacinian corpuscles on the skin of the operator as a result. At the same time, it is also because increase in the resistance values of the electrodes is suppressed, increase in the time constant of the electrodes is suppressed, and deterioration in the voltages generated in the electrodes is suppressed by employing the electrode shape in which the boundary lines between the X-electrodes and the Y-electrodes do not exist on the straight line connecting between the intersection parts included in a single X-electrode or the straight line connecting between the intersection parts included in a single Y-electrode.

Third Exemplary Embodiment—Supporting Substrate and Electrodes

In addition to the structures of the first to fifth basic embodiments and the second exemplary embodiment of the present invention, a third exemplary embodiment of the present invention is designed is such a manner that, on a plan view: the X-electrodes are formed on the first supporting substrate by connecting the plurality of electrodes via connection parts formed integrally with identical material as a material of the plurality of electrodes; the Y-electrodes are formed on the second supporting substrate by connecting the plurality of electrodes via connection parts formed integrally with identical material as a material of the plurality of electrodes; and the first and second supporting substrates are adhered to each other by sandwiching an insulating film.

With this structure, it is also possible to increase the scale of the tactile sense presentation device and to improve the spatial resolution in addition to achieving the same effects as those of the first to fifth basic embodiments and the first and second exemplary embodiments of the present invention.

This will be described in more details hereinafter.

Figure 26:
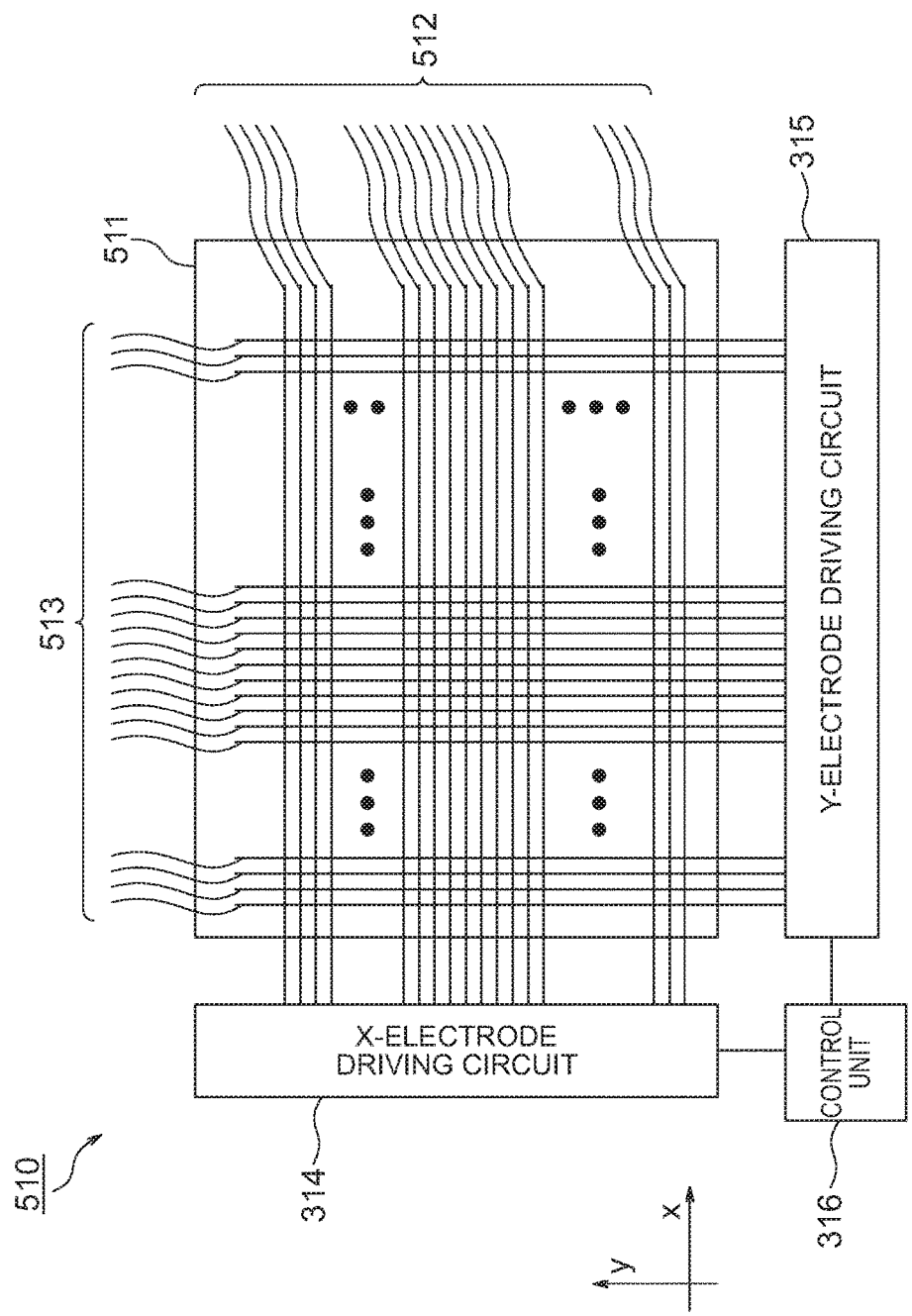
FIG. 26 is an explanatory chart showing the structure of a tactile sense presentation device according to a third exemplary embodiment of the preset invention.

FIG. 26 is an explanatory chart showing the structure of a tactile sense presentation device 510 according to the third exemplary embodiment of the present invention. A plurality of X-electrodes 512 extended in the x direction on a plan type supporting substrate 511 and a plurality of Y-electrodes 513 extended in the y direction orthogonal to the X-electrodes 512 on the supporting substrate 511 are formed.

The X-electrodes 512 and the Y-electrodes 513 intersect with each other in the intersection parts thereof via an insulating film, and electric insulation between the both is maintained. Further, an insulating film is formed on the X-electrodes 512 and the Y-electrodes 513 for electrically insulating between the X-electrodes 512 and a finger and between the Y-electrodes 513 and a finger when a user touches the display surface of the tactile sense presentation device 510 by the finger from the above.

An X-electrode driving circuit 314 same as that of the first exemplary embodiment is connected to each of the X-electrodes 512, and a Y-electrode driving circuit 315 same as that of the first exemplary embodiment is connected to each of the Y-electrodes 513. The X-electrode driving circuit 314 and the Y-electrode driving circuit 315 are connected to a control unit 316 same as that of the first exemplary embodiment. Explanations of the X-electrode driving circuit 314, the Y-electrode driving circuit 315, and the control unit 316 are omitted herein.

Regarding the shape of the X-electrode 512 and the Y-electrode 513 on a plan view, a plurality of rhombic electrodes are coupled in a form like a string of beads to be connected electrically and extended in the x direction or the y direction as in the case of the first exemplary embodiment shown in FIG. 19. Alternatively, it may be changed to the shape in which the boundary part between the rhombic part of the X-electrode and the rhombic part of the Y-electrode neighboring to each other enters inside one of the rhombic parts as in the case of the second exemplary embodiment.

Figure 27A:
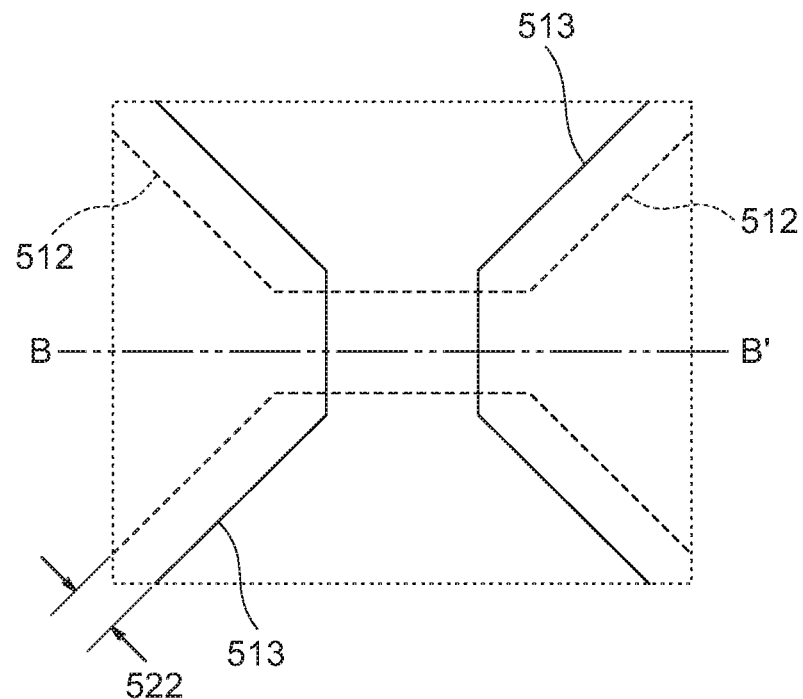
Figure 27B:
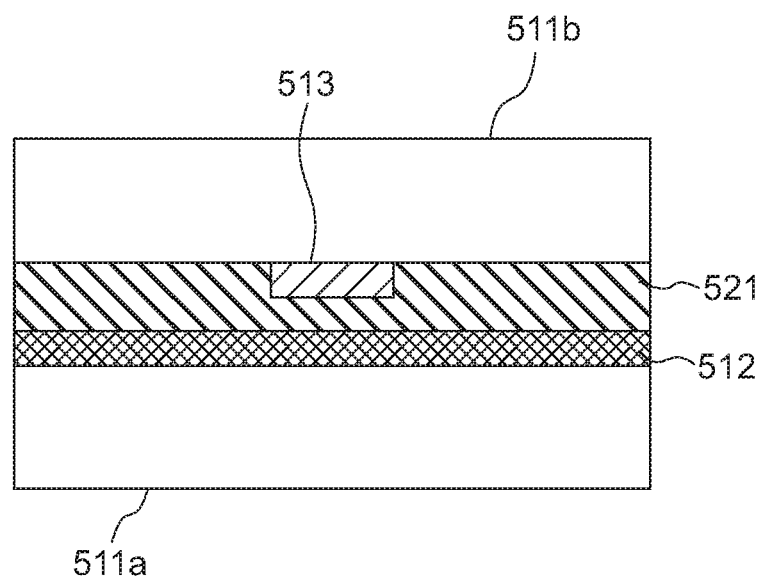

The difference between the third exemplary embodiment and the first to second exemplary embodiments is its sectional structure and manufacturing method. Those will be described hereinafter. FIGS. 27A and 27B are enlarged explanatory charts showing the structure of the connection part between the X-electrode 512 and the Y-electrode 513 of the tactile sense presentation device 510 shown in FIG. 26. FIG. 27A is a plan view showing the connection part between the X-electrode 512 and the Y-electrode 513, and FIG. 27B is a sectional view taken along a line B-B' of FIG. 27A.

In this exemplary embodiment, the supporting substrate 511 is divided into first and second supporting substrates 511a and 511b. First, the X-electrode 512 constituted by connecting the rhombic electrodes with a connection part formed integrally by using identical material as that of the electrodes is formed on the first supporting substrate 511*a*. Then, the Y-electrode 513 constituted by connecting the rhombic electrodes with a connection part formed integrally by using identical material as that of the electrodes is formed on the second supporting substrate 511*b*. Thereafter, the first and second supporting substrates 511*a* and 511*b* are adhered by sandwiching an insulating film 521 to form the tactile sense presentation device 510.

For the insulating film 521, an insulating optical adhesive agent can be used. This includes a function which adhesively laminates the first and second supporting substrates 511*a* and 511*b*, and a function which mutually insulates the X-electrode 512 and the Y-electrode 513.

As shown in FIG. 27A, the X-electrode 512 is formed by connecting the rhombic electrodes by the connection part formed integrally by using identical material as that of the electrode. Similarly, the Y-electrode 513 is formed by connecting the rhombic electrodes by the connection part formed integrally by using identical material as that of the electrode. In the tactile sense presentation device on a plan view, the X-electrode 512 and the Y-electrode 513 overlap with each other in the connection part, and the main parts of the rhombic parts of the X-electrode 512 and the Y-electrode 513 are neighboring to each other.

The sectional structure and the manufacturing steps of the tactile sense presentation device 510 will be described by using FIG. 27B. The first and second supporting substrates 511*a* and 511*b* are both glass substrates. First, the X-electrodes 512 are formed by ITO on the first supporting substrate 511*a*. At that time, wirings and terminals same as those shown in FIG. 19 are formed simultaneously by ITO.

Then, the Y-electrodes 513 are formed by ITO on the second supporting substrate 511*b*. At that time, wirings and terminals same as those shown in FIG. 19 are formed simultaneously by ITO. Subsequently, a flexible printed circuit is laminated to the terminals formed on the first and second supporting substrates 511*a* and 511*b*. Then, the surface where the X-electrodes 512 are formed and the surface where the Y-electrodes 513 are formed on the first and second supporting substrates 511*a* and 511*b* are laminated by using an optical adhesive agent. The X-electrodes 512 and the Y-electrodes 513 intersect with each other via the optical adhesive agent that functions as the insulating film 521.

Through employing the sectional structure, it becomes unnecessary to place the bridge electrodes. That is, minute patterning processing of the insulating film 521 becomes unnecessary, so that the thickness of the insulating film 521 can be made thicker easily within a range of several μm to several mm. As a result, the static capacity of the parallel flat plate capacitor formed in the intersection parts between the X-electrode 512 and the Y-electrode 513 overlap with each other can be made small, so that the load capacity of each of the electrodes can be made small. Therefore, the driving frequencies of the electrodes can be increased still more. This means to be able to increase the scale of the tactile sense presentation device or to improve the spatial resolution of the tactile sense presentation device.

Fourth Exemplary Embodiment—Supporting Substrate and Electrodes

In addition to the structures of the first to fifth basic embodiments and the second exemplary embodiment of the present invention, a fourth exemplary embodiment of the present invention is designed in such a manner that, on a plan view: the X-electrodes are formed on the supporting substrate by connecting the plurality of electrodes via connection parts formed integrally with identical material as a material of the plurality of electrodes; and the Y-electrodes are formed on the second supporting substrate by connecting the plurality of electrodes via connection parts formed integrally with identical material as a material of the plurality of electrodes by sandwiching an insulating film between with the X-electrodes.

With this structure, it is also possible to increase the scale of the tactile sense presentation device, to improve the spatial resolution, and to omit minute patterning processing in addition to achieving the same effects as those of the first to fifth basic embodiments and the first and second exemplary embodiments of the present invention.

This will be described in more details hereinafter.

FIG. 28 is an explanatory chart showing the structure of a tactile sense presentation device 560 according to the fourth exemplary embodiment of the present invention. A plurality of X-electrodes 562 extended in the x direction on a plan type supporting substrate 561 and a plurality of Y-electrodes 563 extended in the y direction orthogonal to the X-electrodes 562 on the supporting substrate 561 are formed.

An X-electrode driving circuit 314 same as that of the first exemplary embodiment is connected to each of the X-electrodes 562, and a Y-electrode driving circuit 315 same as that of the first exemplary embodiment is connected to each of the Y-electrodes 563. The X-electrode driving circuit 314 and the Y-electrode driving circuit 315 are connected to a control unit 316 same as that of the first exemplary embodiment. Explanations of the X-electrode driving circuit 314, the Y-electrode driving circuit 315, and the control unit 316 are omitted herein.

Figure 29A:
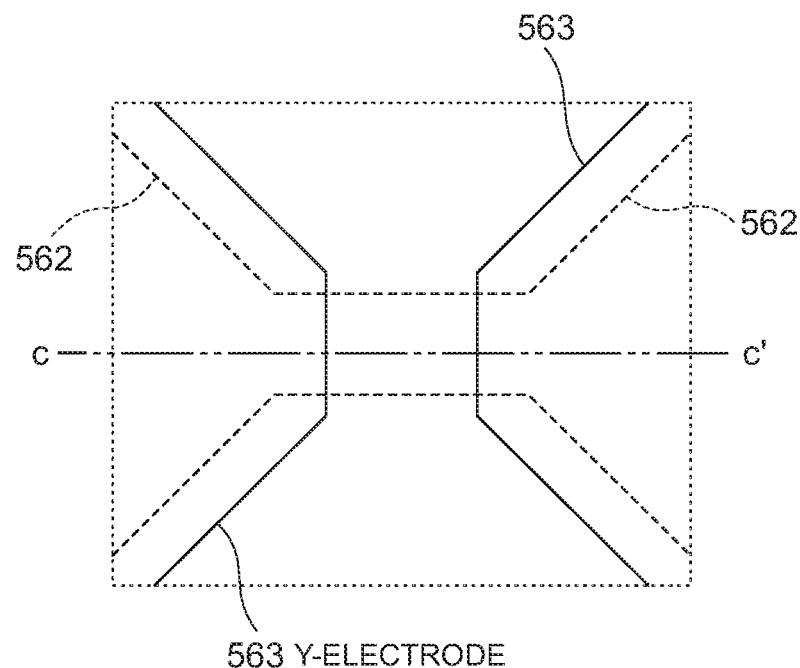
Figure 29B:
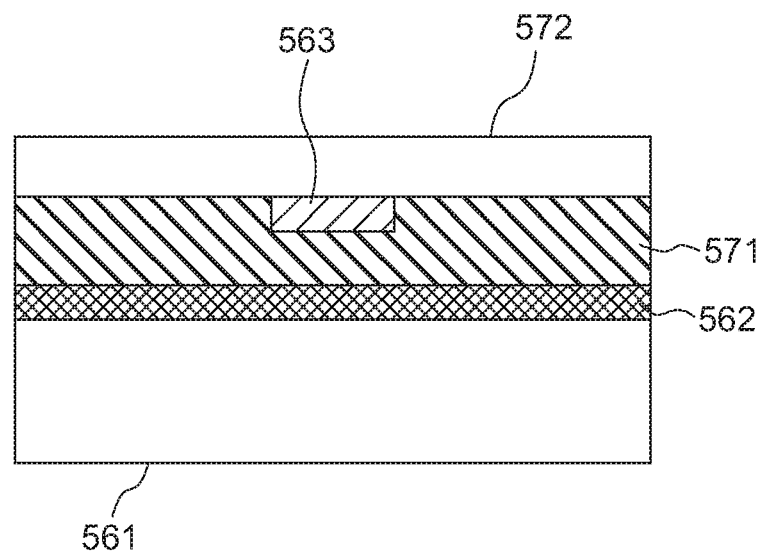

The difference between the fourth exemplary embodiment and the first to third exemplary embodiments is its sectional structure and manufacturing method. Those will be described hereinafter. FIGS. 29A and 29B are enlarged explanatory charts showing the structure of the connection part between the X-electrode 562 and the Y-electrode 563 of the tactile sense presentation device 560 shown in FIG. 28. FIG. 29A is a plan view showing the connection part between the X-electrode 562 and the Y-electrode 563, and FIG. 29B is a sectional view taken along a line C-C' of FIG. 29A.

As shown in FIG. 29A, the X-electrode 562 is formed by connecting the rhombic electrodes by the connection part formed integrally by using identical material as that of the electrode as in the case of the third exemplary embodiment. Similarly, the Y-electrode 563 is formed by connecting the rhombic electrodes by the connection part formed integrally by using identical material as that of the electrode. In the tactile sense presentation device on a plan view, the X-electrode 562 and the Y-electrode 563 overlap with each other in the connection part, and the main parts of the rhombic parts of the X-electrode 562 and the Y-electrode 563 are neighboring to each other.

Regarding the sectional structure of the tactile sense presentation device 560, as shown in FIG. 29B, the tactile sense presentation device according to this exemplary embodiment is formed by stacking the X-electrodes 562, an insulating film 571, the Y-electrodes 563, and an insulating film 572 in order on the supporting substrate 561. That is, the bridge electrodes are unnecessary with this exemplary embodiment.

Because the bridge electrodes are unnecessary, minute patterning processing of the insulating film 571 is not required. Thus, the thickness of the insulating film 571 can be made thicker easily within a range of several μm to several mm. As a result, the static capacity of the parallel flat plate capacitor formed in the intersection parts between the X-electrode 562 and the Y-electrode 563 overlapping with each other can be made small, so that the load capacity of each of the electrodes can be made small. Therefore, the driving frequencies of the electrodes can be increased still more. This means to be able to increase the scale of the tactile sense presentation device or to improve the spatial resolution of the tactile sense presentation device. Needless to say, there is also an incidental effect of making it possible to decrease the processing cost, which is achieved by omitting the minute patterning processing.

Applied Embodiment

Figure 30:
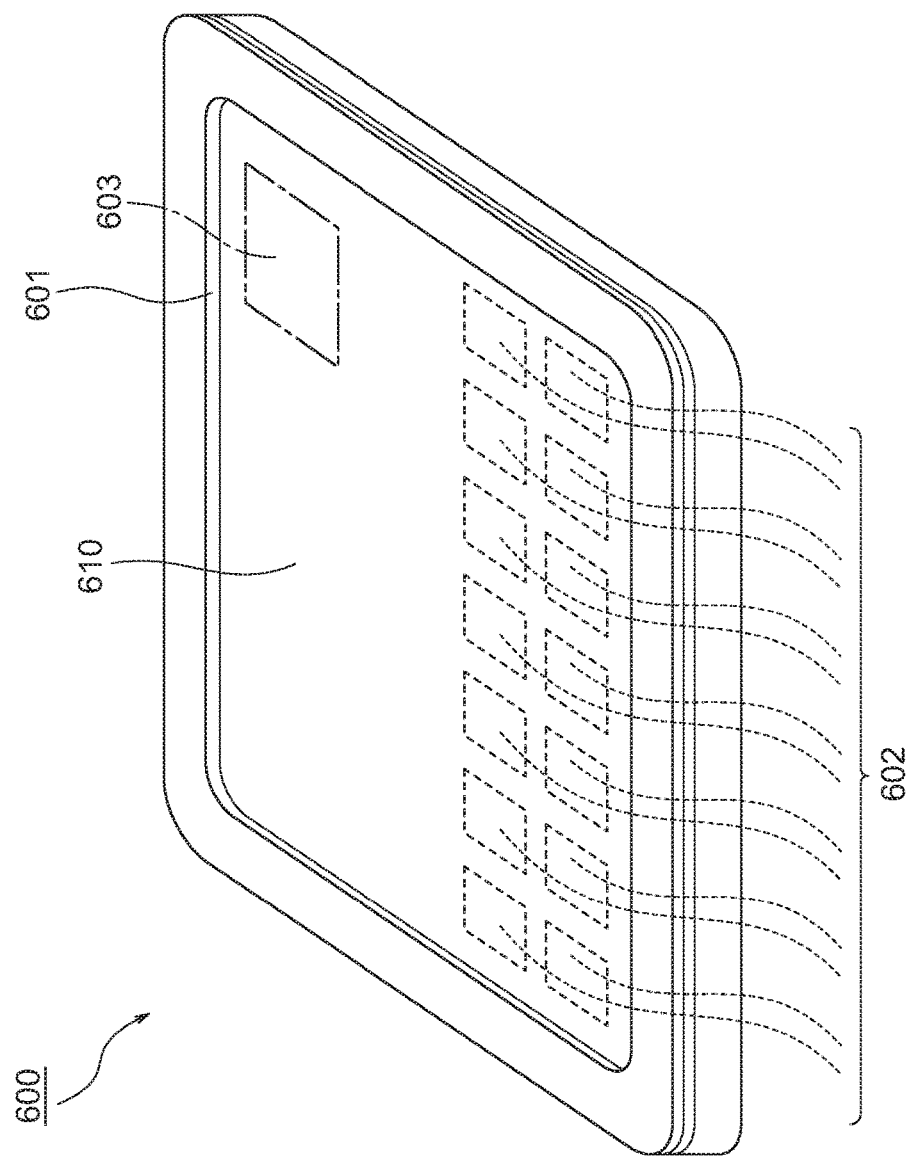
FIG. 30 is an explanatory chart showing the structure of an electronic apparatus according to an applied embodiment of the present invention.

FIG. 30 is an explanatory chart showing the structure of an electronic apparatus 600 according to an applied embodiment of the present invention. Specifically, the electronic apparatus 600 is a smartphone, a tablet type electronic book reader, a notebook type personal computer, or the like.

The electronic apparatus 600 includes a touch-panel type display device 601, and a tactile sense presentation device 610 corresponding to one of the first to fifth basic embodiments or the first to fourth exemplary embodiments described above is provided on the front face or the back face of the touch-panel type display device 601. When a static-capacitance type touch panel that is currently the mainstream is employed as the touch-panel type display device 601, the function thereof and the function of the tactile sense presentation device 610 cannot be achieved at the same time. Therefore, it is desirable to use an optical touch panel or the like.

With the electronic apparatus 600, the processing result acquired by a built-in processor 603 is displayed on the touch-panel type display device 601, and a user executes an operation input on the touch-panel type display device 601 according to the display. The electronic apparatus 600 may be of a type which does not include a built-in processor, with which the touch-panel type display device 601 displays processing result acquired by an external device (e.g., a desk-top type personal computer) and an operation input according to the display is returned to the external device.

A plurality of operation keys 602 are displayed on the touch-panel type display device 601, and the tactile sense presentation device 610 presents a plurality of individual senses of texture at positions corresponding to each of the operation keys 602 accordingly. The user can find the positions of the operation keys according to the senses of texture, so that the user can execute a key input without carefully looking at the operation keys. Therefore, it is possible to overcome the above-described issue of "smart-phoning while walking" and to overcome such issue that visually impaired users cannot use those electronic apparatuses.

Further, as described above, it is practically impossible with the technique depicted in Patent Document 1 described above to change the positions and number of the areas where a sense of texture is to be presented. Meanwhile, the present invention does not require rearrangement of the electrodes, and it is possible to flexibly change the positions and the numbers of the areas where a sense of texture is to be presented by simply changing the numbers of the electrodes to which the voltage is applied and changing the frequency thereof.

Figure 31:
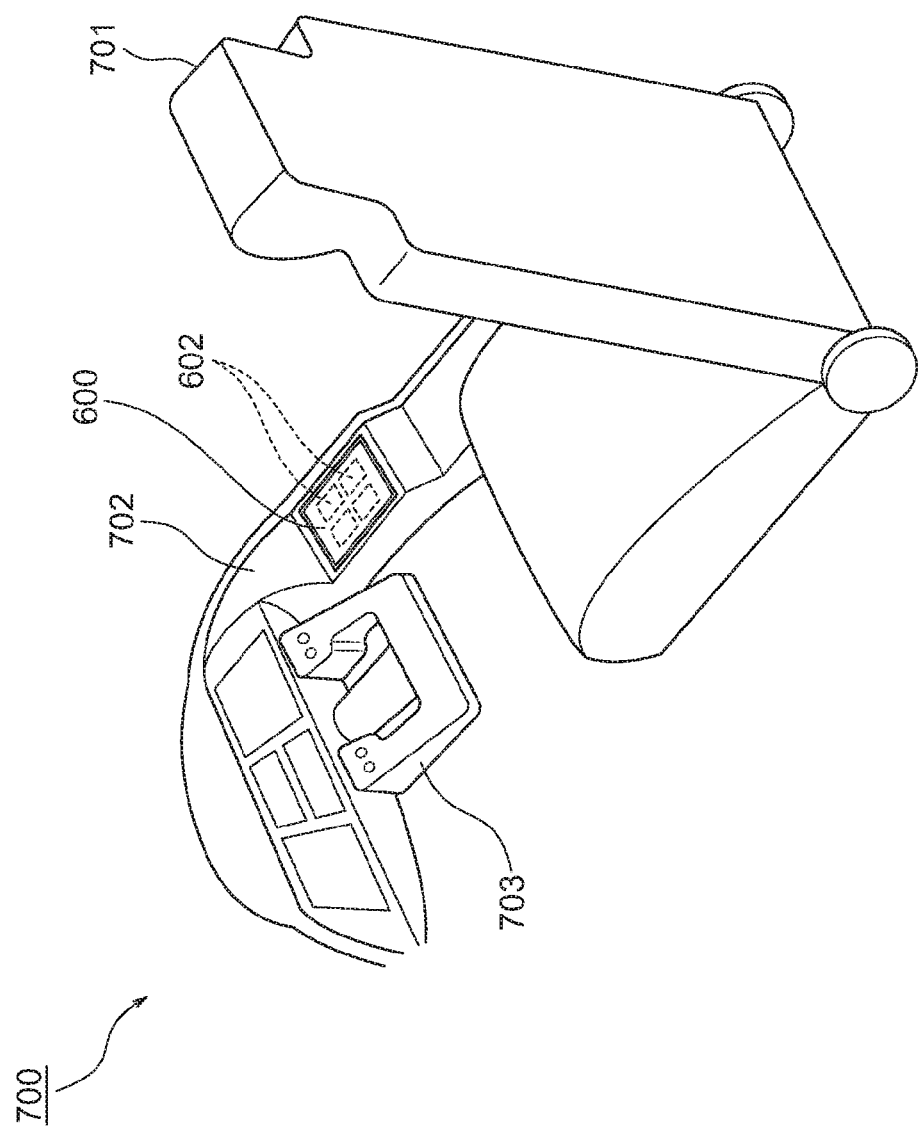
FIG. 31 is an explanatory chart showing the structure of a mobile unit according to an applied embodiment of the present invention.

Alternatively, the electronic apparatus 600 can also be used as a navigation device loaded on mobile units such as automobiles, bicycles, two-wheeled vehicles, airplanes, trains, and ships. FIG. 31 is an explanatory chart showing the structure of a mobile unit 700 according to the applied embodiment of the present invention. The mobile unit 700 includes: a driver's seat 701 where the user (driver) is seated; a dashboard 702 to which the electronic apparatus 600 shown in FIG. 30 is loaded as a navigation device; a steering mechanism 703 such as a steering wheel, an accelerator, and a brake; etc.

As in the case shown in FIG. 30, the electronic apparatus 600 presents a plurality of individual senses of texture at positions that correspond to the operation keys 602. The user can execute operation input according to the senses of texture. Further, it is also possible to present a sense of texture to a route displayed on a map according to the route information presented as a result of processing to make the display of the route conspicuous.

With the mobile unit 700, the user can operate the navigation device while concentrating on the execution of fulfilling the obligation of paying attention to the road ahead. Therefore, the user can continue safe driving.

While the present invention has been described by referring to the specific embodiments shown in the drawings, the present invention is not limited only to the embodiments shown in the drawings. Any known structures can be employed as long as the effects of the present invention can be achieved therewith.

The whole or part of the exemplary embodiments disclosed above can be described as, but not limited to, the following Supplementary Notes:
(Supplementary Note 1)
A tactile sense presentation device, including:
a supporting substrate; a plurality of X-electrodes extended in parallel to each other along a first direction on the supporting substrate; a plurality of Y-electrodes extended in parallel to each other along a second direction on the supporting substrate by being insulated from the X-electrodes; and a driving circuit which applies a first-frequency voltage signal to the X-electrode corresponding to information regarding a target region inputted from outside among the plurality of X-electrodes, and applies a second-frequency voltage signal to the Y-electrode corresponding to information regarding the target region inputted from outside among the plurality of Y-electrodes to generate electric beat oscillation in the target region by an absolute value of a difference between the first and second frequencies.
(Supplementary Note 2)
A tactile sense presentation device, including:
a supporting substrate; a plurality of X-electrodes extended in parallel to each other along a first direction on the supporting substrate; a plurality of Y-electrodes extended in parallel to each other along a second direction on the supporting substrate by being insulated from the X-electrodes; and a driving circuit which applies a first-frequency voltage signal to the X-electrode corresponding to information regarding a target region inputted from outside among the plurality of X-electrodes, and applies a second-frequency voltage signal to the Y-electrode corresponding to information regarding the target region inputted from outside among the plurality of Y-electrodes, wherein:
the first and second frequencies are both 500 Hz or more; and
there is a period where an absolute value of a difference between the first and second frequencies is larger than 10 Hz and less than 1000 Hz.

(Supplementary Note 3)

The tactile sense presentation device as depicted in Supplementary Note 2, wherein the driving circuit includes a function which grounds an electrode to which the first-frequency voltage signal is not applied among the plurality of X-electrodes and an electrode to which the second-frequency voltage signal is not applied among the plurality of Y-electrodes or applies a direct current voltage to such electrodes.

(Supplementary Note 4)

The tactile sense presentation device as depicted in Supplementary Note 2, wherein the driving circuit includes a function which applies a third-frequency voltage signal to an electrode to which the first-frequency voltage signal is not applied among the plurality of X-electrodes and to an electrode to which the second-frequency voltage signal is not applied among the plurality of Y-electrodes.

(Supplementary Note 5)

The tactile sense presentation device as depicted in Supplementary Note 4, wherein:

the third frequency is between 2.5 Hz and 5 Hz, both inclusive, or 500 Hz or more; and an absolute value of a difference between the third frequency and the first frequency and an absolute value of a difference between the third frequency and the second frequency are both 10 Hz or less or 1000 Hz or more.

(Supplementary Note 6)

The tactile sense presentation device as depicted in Supplementary Note 2, wherein the driving circuit includes a function which applies the first-frequency voltage signal to the X-electrodes corresponding to a first target region while applying the second-frequency voltage signal to the Y-electrodes corresponding to the first target region and, at the same time, applies a third-frequency voltage signal to the X-electrodes corresponding to a second target region while applying a fourth-frequency voltage signal to the Y-electrodes corresponding to the second target region.

(Supplementary Note 7)

The tactile sense presentation device as depicted in Supplementary Note 6, wherein:

the first to fourth frequencies are all 500 Hz or more;

an absolute value of a difference between the first and second frequencies and an absolute value of a difference between the third and fourth frequencies are both larger than 10 Hz and less than 1000 Hz; and an absolute value of a difference between the first and fourth frequencies and an absolute value of a difference between the second and third frequencies are both 10 Hz or less or 1000 Hz or more.

(Supplementary Note 8)

The tactile sense presentation device as depicted in Supplementary Note 2, wherein in a plurality of prescribed target regions, an absolute value of a difference of the frequencies of voltage signals applied by the driving circuit to the X-electrodes and the Y-electrodes contained in the target regions is larger than 10 Hz and less than 1000 Hz; and in intersection parts excluding the target regions, which are formed by the X-electrodes or the Y-electrodes constituting the target regions, an absolute value of a difference in the frequencies of the voltage signals applied to the X-electrodes and the Y-electrodes forming the intersection parts is 10 Hz or less or 1000 Hz or more.

(Supplementary Note 9)

The tactile sense presentation device as depicted in Supplementary Note 2, wherein:

on a plan view of the supporting substrate, the X-electrodes and the Y-electrodes are both formed by coupling a plurality of rhombic electrodes in a form like a string of beads via connection parts; the X-electrodes and the Y-electrodes overlap with each other in the connection parts; and the rhombic parts of the X-electrodes and the Y-electrodes are neighboring to each other.

(Supplementary Note 10)

The tactile sense presentation device as depicted in Supplementary Note 2, wherein:

on a plan view of the supporting substrate, the X-electrodes and the Y-electrodes are both formed by coupling a plurality of specific shape electrodes in a form like a string of beads via connection parts, the X-electrodes and the Y-electrodes overlap with each other in the connection parts, and the specific shape parts of the X-electrodes and the Y-electrodes are neighboring to each other; and the specific shape part of the X-electrodes or the Y-electrodes intersects with a first straight line which connects a first intersection part and a second intersection part among the intersection parts of arbitrary X-electrodes and arbitrary Y-electrodes described above and is not in parallel to the first and second directions or a second straight line which connects the first intersection part and a third intersection part among the intersection parts of arbitrary X-electrodes and arbitrary Y-electrodes and is not in parallel to the first and second directions.

(Supplementary Note 11)

The tactile sense presentation device as depicted in Supplementary Note 9, wherein:

on a plan view of the supporting substrate, either the X-electrodes or the Y-electrodes are formed by connecting the plurality of electrodes via connection parts formed integrally with identical material as a material of the plurality of electrodes; and the other ones of the X-electrodes and the Y-electrodes include bridge electrodes which electrically connect parts where the plurality of electrodes are disconnected.

(Supplementary Note 12)

The tactile sense presentation device as depicted in Supplementary Note 9 or 10, wherein:

on a plan view of the supporting substrate, the X-electrodes are formed on a first supporting substrate by connecting the plurality of electrodes via connection parts formed integrally with identical material as a material of the plurality of electrodes; the Y-electrodes are formed on a second supporting substrate by connecting the plurality of electrodes via connection parts formed integrally with identical material as a material of the plurality of electrodes; and the first and second supporting substrates are adhered to each other by sandwiching an insulating film.

(Supplementary Note 13)

The tactile sense presentation device as depicted in Supplementary Note 9 or 10, wherein:

on a plan view of the supporting substrate, the X-electrodes are formed on the supporting substrate by connecting the plurality of electrodes via connection parts formed integrally with identical material as a material of the plurality of electrodes; and the Y-electrodes are formed on the supporting substrate by connecting the plurality of electrodes via connection parts formed integrally with identical material as a material of the plurality of electrodes by sandwiching an insulating film between with the X-electrodes.

(Supplementary Note 14)
The tactile sense presentation device as depicted in Supplementary Note 2, wherein
the plurality of X-electrodes are disposed in parallel to each other at a pitch smaller than 5 mm,
the plurality of Y-electrodes are disposed in parallel to each other at a pitch smaller than 5 mm.

(Supplementary Note 15)
The tactile sense presentation device as depicted in Supplementary Note 2, wherein:
the driving circuit includes a function which applies the first-frequency voltage signal of 500 Hz or more to the X-electrodes corresponding to information regarding the target region inputted from outside among the plurality of X-electrodes and applies the second-frequency voltage signal of 500 Hz or more to the Y-electrodes corresponding to information regarding the target region among the plurality of Y-electrodes; and
changes at least one of the first and second frequencies chronologically within a range that is not lower than 500 Hz.

(Supplementary Note 16)
The tactile sense presentation device as depicted in Supplementary Note 15, including:
a first period where an absolute value of a difference between the first frequency and the second frequency is larger than 10 Hz and less than 1000 Hz; and
a second period where an absolute value of a difference between the first frequency and the second frequency is 10 Hz or less or 1000 Hz or more.

(Supplementary Note 17)
The tactile sense presentation device as depicted in Supplementary Note 16, wherein
the first period and the second period are set alternately.

(Supplementary Note 18)
The tactile sense presentation device as depicted in Supplementary Note 15, wherein
the driving circuit continuously changes at least one of the first and second frequencies in a range that is not lower than 500 Hz according to time.

(Supplementary Note 19)
An electronic apparatus, including:
a touch-panel type display device which displays a processing result executed by a processor provided therein and accepts an operation input which corresponds to the processing result; and
the tactile sense presentation device as depicted in any one of Supplementary Notes 1 to 14, which presents a sense of texture corresponding to the display of the processing result.

(Supplementary Note 20)
A mobile unit, including the electronic apparatus as depicted in Supplementary Note 19 loaded as an on-vehicle device.

(Supplementary Note 21)
A tactile sense presentation method used with a tactile sense presentation device which includes: a supporting substrate; a plurality of X-electrodes extended in parallel to each other along a first direction on the supporting substrate; and a plurality of Y-electrodes extended in parallel to each other along a second direction on the supporting substrate by being insulated from the X-electrodes, wherein:
a control unit gives information regarding a target region inputted from outside to a driving circuit; and
the driving circuit applies a first-frequency voltage signal to the X-electrodes corresponding to the target region; and applies a second-frequency voltage signal to the Y-electrodes corresponding to the target region to generate electric beat oscillation in the target region by an absolute value of a difference between the first and second frequencies.

INDUSTRIAL APPLICABILITY

The present invention can be utilized in various kinds of apparatuses of the fields where the display devices such as liquid crystals are used. Particularly, the present invention is suited for being used in the apparatuses that includes a touch-panel type display device. More specifically, typical apparatuses are smartphones, tablet terminals, note-type personal computers, and the like as described above. Other than those, the present invention can also be applied to game machines, music players, car navigation devices, and the like.

The present invention is suited for use for overcoming the issue of "executing operations while walking" when using those apparatuses, for implementing barrier-free use (enabling visually impaired users to use those electronic apparatuses), improving the operability through presenting a tactile sense according to the displayed content, and the like.

What is claimed is:
1. A tactile sense presentation device, comprising:
a supporting substrate;
a plurality of X-electrodes extended in parallel to each other along a first direction on the supporting substrate;
a plurality of Y-electrodes extended in parallel to each other along a second direction on the supporting substrate by being insulated from the X-electrodes; and
a driving circuit which applies a first-frequency voltage signal to the X-electrode corresponding to information regarding a target region inputted from outside among the plurality of X-electrodes, and applies a second-frequency voltage signal to the Y-electrode corresponding to information regarding the target region inputted from outside among the plurality of Y-electrodes, wherein:
at least one of the first and second frequencies is a value that alone does not present a tactile sensation,
there is a period where an absolute value of a difference between the first and second frequencies is larger than 10 Hz and less than 1000 Hz, and
the driving circuit includes a function which grounds an electrode to which the first-frequency voltage signal is not applied among the plurality of X-electrodes and an electrode to which the second-frequency voltage signal is not applied among the plurality of Y-electrodes or applies a direct current voltage to such electrodes.

2. The tactile sense presentation device of claim 1, wherein
on a plan view of the supporting substrate, the X-electrodes and the Y-electrodes are both formed by coupling a plurality of rhombic electrodes in a form like a string of beads via connection parts,
the X-electrodes and the Y-electrodes overlap with each other in the connection parts, and
the rhombic parts of the X-electrodes and the Y-electrodes are neighboring to each other.

3. A mobile unit, comprising:
an electronic apparatus loaded as an on-vehicle device, the electronic apparatus comprising:
a touch-panel type display device which displays a processing result executed by a processor provided therein and accepts an operation input which corresponds to the processing result; and the tactile sense presentation device as claimed in claim 1 that presents a tactile sensation corresponding to the display of the processing result.

4. A tactile sense presentation device, comprising:
a supporting substrate;
a plurality of X-electrodes extended in parallel to each other along a first direction on the supporting substrate;
a plurality of Y-electrodes extended in parallel to each other along a second direction on the supporting substrate by being insulated from the X-electrodes; and
a driving circuit which applies a first-frequency voltage signal to the X-electrode corresponding to information regarding a target region inputted from outside among the plurality of X-electrodes, and applies a second-frequency voltage signal to the Y-electrode corresponding to information regarding the target region inputted from outside among the plurality of Y-electrodes, wherein:
at least one of the first and second frequencies is a value that alone does not present a tactile sensation,
there is a period where an absolute value of a difference between the first and second frequencies is larger than 10 Hz and less than 1000 Hz,
in a plurality of prescribed target regions, an absolute value of a difference of the frequencies of voltage signals applied by the driving circuit to the X-electrodes and the Y-electrodes contained in the target regions is larger than 10 Hz and less than 1000 Hz, and
in intersection parts excluding the target regions, which are formed by the X-electrodes or the Y-electrodes constituting the target regions, an absolute value of a difference in the frequencies of the voltage signals applied to the X-electrodes and the Y-electrodes forming the intersection parts is 10 Hz or less or 1000 Hz or more.

5. A tactile sense presentation device, comprising:
a supporting substrate;
a plurality of X-electrodes extended in parallel to each other along a first direction on the supporting substrate;
a plurality of Y-electrodes extended in parallel to each other along a second direction on the supporting substrate by being insulated from the X-electrodes; and
a driving circuit which applies a first-frequency voltage signal to the X-electrode corresponding to information regarding a target region inputted from outside among the plurality of X-electrodes, and applies a second-frequency voltage signal to the Y-electrode corresponding to information regarding the target region inputted from outside among the plurality of Y-electrodes, wherein:
at least one of the first and second frequencies is a value that alone does not present a tactile sensation,
there is a period where an absolute value of a difference between the first and second frequencies is larger than 10 Hz and less than 1000 Hz,
the driving circuit includes a function which applies the first-frequency voltage signal to the X-electrodes corresponding to information regarding the target region inputted from outside among the plurality of X-electrodes and applies the second-frequency voltage signal to the Y-electrodes corresponding to information regarding the target region among the plurality of Y-electrodes, and changes at least one of the first and second frequencies chronologically within a range that is not lower than 500 Hz.

6. The tactile sense presentation device as claimed in claim 5, wherein there is a first period where an absolute value of a difference between the first frequency and the second frequency is larger than 10 Hz and less than 1000 Hz, and
there is a second period where an absolute value of a difference between the first frequency and the second frequency is 10 Hz or less or 1000 Hz or more.

7. The tactile sense presentation device as claimed in claim 6, wherein
the first period and the second period are set alternately.

8. The tactile sense presentation device as claimed in claim 5, wherein
the driving circuit continuously changes at least one of the first and second frequencies in a range that is not lower than 500 Hz according to time.

9. An electronic apparatus, comprising:
a touch-panel type display device which displays a processing result executed by a processor provided therein and accepts an operation input which corresponds to the processing result; and
the tactile sense presentation device as claimed in claim 1, which presents a tactile sensation corresponding to the display of the processing result.

10. A tactile sense presentation method comprising steps of:
providing a tactile sense presentation device, comprising:
a supporting substrate,
a plurality of X-electrodes extended in parallel to each other along a first direction on the supporting substrate,
a plurality of Y-electrodes extended in parallel to each other along a second direction on the supporting substrate by being insulated from the X-electrodes, and
a driving circuit which applies a first-frequency voltage signal to the X-electrode corresponding to information regarding a target region inputted from outside among the plurality of X-electrodes, and applies a second-frequency voltage signal to the Y-electrode corresponding to information regarding the target region inputted from outside among the plurality of Y-electrodes, wherein:
at least one of the first and second frequencies is a value that alone does not present a tactile sensation,
there is a period where an absolute value of a difference between the first and second frequencies is larger than 10 Hz and less than 1000 Hz, and
the driving circuit includes a function which grounds an electrode to which the first-frequency voltage signal is not applied among the plurality of X-electrodes and an electrode to which the second-frequency voltage signal is not applied among the plurality of Y-electrodes or applies a direct current voltage to such electrodes;
providing information by a control unit regarding a target region inputted from outside to a driving circuit; and
applying, by the driving circuit, a first-frequency voltage signal to the X-electrodes corresponding to the target region, and applying a second-frequency voltage signal to the Y-electrodes corresponding to the target region to generate electric beat oscillation in the target region by an absolute value of a difference between the first and second frequencies.

\* \* \* \* \*